United States Patent
Li

(10) Patent No.: US 10,292,186 B2
(45) Date of Patent: May 14, 2019

(54) METHOD, APPARATUS, AND SYSTEM FOR CONTROLLING LINK IN COOPERATIVE COMMUNICATION

(71) Applicant: Huawei Technologies Co., Ltd., Shenzhen (CN)

(72) Inventor: Hantao Li, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 370 days.

(21) Appl. No.: 15/148,834

(22) Filed: May 6, 2016

(65) Prior Publication Data
US 2016/0255664 A1 Sep. 1, 2016

Related U.S. Application Data

(63) Continuation of application No. PCT/CN2013/086593, filed on Nov. 6, 2013.

(51) Int. Cl.
*H04L 5/00* (2006.01)
*H04W 40/22* (2009.01)
(Continued)

(52) U.S. Cl.
CPC ........... *H04W 76/10* (2018.02); *H04L 5/0035* (2013.01); *H04W 76/15* (2018.02); *H04L 45/70* (2013.01);
(Continued)

(58) Field of Classification Search
CPC ..................... H04L 5/0035; H04W 76/02
See application file for complete search history.

(56) References Cited

U.S. PATENT DOCUMENTS

| | | | | |
|---|---|---|---|---|
| 2008/0274692 A1* | 11/2008 | Larsson | ............. | H04B 7/15592 455/24 |
| 2012/0230247 A1 | 9/2012 | Kwon et al. | | |
| 2013/0064213 A1* | 3/2013 | Park | ............. | H04W 76/14 370/329 |
| 2013/0322388 A1* | 12/2013 | Ahn | ............. | H04W 76/023 370/329 |

FOREIGN PATENT DOCUMENTS

| | | |
|---|---|---|
| CN | 101345675 A | 1/2009 |
| CN | 101394665 A | 3/2009 |

(Continued)

OTHER PUBLICATIONS

Li et al., "System Design for Multiple Users Cooperative Communication in LTE," IEEE 78th Vehicular Technology Conference, pp. 1-5, Institute of Electronics and Electrical Engineers, New York, New York, (Sep. 2-5, 2013).

(Continued)

*Primary Examiner* — Derrick W Ferris
*Assistant Examiner* — Farhad Ali
(74) *Attorney, Agent, or Firm* — Leydig, Voit & Mayer, Ltd.

(57) ABSTRACT

A method for controlling a link in cooperative communication includes: confirming that a beneficial user equipment and a pre-supportive user equipment have a capability of performing cooperative communication; separately sending a first-hop link setup request to the beneficial user equipment and the pre-supportive user equipment, so that the beneficial user equipment and the pre-supportive user equipment establish first-hop physical links according to the first-hop link setup request; separately receiving initial measurement information that is sent by the pre-supportive user equipment and/or the beneficial user equipment after the pre-supportive user equipment and/or the beneficial user equipment performs initial measurement on the first-hop physical link; according to the initial measurement information, selecting a supportive user equipment of the beneficial user (Continued)

equipment from the pre-supportive user equipment or selecting a beneficial user equipment that is supported by the supportive user equipment.

14 Claims, 14 Drawing Sheets

(51) Int. Cl.
    *H04W 76/10* (2018.01)
    *H04W 76/15* (2018.01)
    *H04W 84/12* (2009.01)
    *H04W 88/04* (2009.01)
    *H04W 88/06* (2009.01)
    *H04L 12/721* (2013.01)

(52) U.S. Cl.
    CPC ............ *H04W 40/22* (2013.01); *H04W 84/12* (2013.01); *H04W 88/04* (2013.01); *H04W 88/06* (2013.01)

(56) References Cited

FOREIGN PATENT DOCUMENTS

| | | |
|---|---|---|
| CN | 103188706 A | 7/2013 |
| JP | 2013506377 A | 2/2013 |
| JP | 2013527683 A | 6/2013 |
| WO | 2011040763 A2 | 4/2011 |
| WO | 2011130543 A1 | 10/2011 |
| WO | 2012091418 A2 | 7/2012 |

OTHER PUBLICATIONS

Raghothaman et al.,"System Architecture for a Cellular Network with Cooperative Mobile Relay," 2011 IEEE VTC FALL, Institute of Electrical and Electronics Engineers, New York, New York (2011).

* cited by examiner

METHOD, APPARATUS, AND SYSTEM FOR CONTROLLING LINK IN COOPERATIVE COMMUNICATION

CROSS-REFERENCE TO RELATED APPLICATIONS

This application is a continuation of International Patent Application No. PCT/CN2013/086593, filed on Nov. 6, 2013, which is hereby incorporated by reference in its entirety.

TECHNICAL FIELD

The present invention relates to the field of communications technologies, and in particular, to a method, an apparatus, and a system for controlling a link in cooperative communication.

BACKGROUND

With the rapid development of mobile communications technologies, mobile communications systems of multiple standards have emerged, for example, a Global System for Mobile communications (GSM) network, a General Packet Radio Service (GPRS) network, a Wideband Code Division Multiple Access (WCDMA) network, a Time Division-Synchronous Code Division Multiple Access (TD-SCDMA) network, and a Worldwide Interoperability for Microwave Access (WiMAX) network. In addition to voice communication services, generally, these mobile communications systems also provide data communication services. Therefore, users may use the data communication services provided by these mobile communications systems to upload and download various data.

In multiple users cooperative communication, mutual support may be performed between a terminal and another terminal by using a device to device (D2D) technology, such as a Wireless Fidelity (WiFi) based WiFi Direct technology based on. For example, data that is sent by an evolved base station (eNB) to a certain terminal may be first sent to another terminal near the terminal, and then forwarded to a final destination terminal by using a technology of short-range communication between terminals, and in this way, a terminal with a best channel condition may be selected from several terminals to deliver data, so as to improve a data rate of cell-edge user by using a multi-user diversity gain, and further improve the spectrum utilization efficiency. For ease of description, a final destination terminal may be referred to as a beneficial user equipment (B-UE), and another terminal near the beneficial user equipment is referred to as a supportive user equipment (S-UE).

In the process of researching and practicing the prior art, the inventor of the present invention finds that, in the prior art, a related technology for controlling a cooperative communication link on a network side does not exist, which consequently causes low transmission efficiency and poor communication quality during cooperative communication.

SUMMARY

Embodiments of the present invention provide a method, an apparatus, and a system for controlling a link in cooperative communication, which can control a cooperative communication link via a network side, to improve transmission efficiency and communication quality of cooperative communication.

According to a first aspect, an embodiment of the present invention provides a method for controlling a link in cooperative communication, including:

confirming that a beneficial user equipment and a pre-supportive user equipment have a capability of performing cooperative communication;

separately sending a first-hop link setup request to the beneficial user equipment and the pre-supportive user equipment, so that the beneficial user equipment and the pre-supportive user equipment establish first-hop physical links according to the first-hop link setup request;

separately receiving initial measurement information sent by the pre-supportive user equipment and/or the beneficial user equipment, where the initial measurement information is sent after initial measurement is performed on the first-hop physical link;

when there is one beneficial user equipment and there is at least one pre-supportive user equipment, selecting a supportive user equipment of the beneficial user equipment from the pre-supportive user equipment according to the initial measurement information; or when there is at least one beneficial user equipment and there is one pre-supportive user equipment, using the pre-supportive user equipment as a supportive user equipment, and selecting, according to the initial measurement information, a beneficial user equipment that is supported by the supportive user equipment;

establishing, based on a first-hop physical link between the beneficial user equipment and the supportive user equipment, a support link;

separately receiving link measurement information of the support link reported by the beneficial user equipment and/or the supportive user equipment, where the link measurement information is obtained by the beneficial user equipment and/or the supportive user equipment by performing measurement on the support link; and controlling the support link according to the link measurement information.

In a first possible implementation manner, with reference to the first aspect, the establishing, based on a first-hop physical link between the beneficial user equipment and the supportive user equipment, a support link includes:

performing transmission configuration on the first-hop physical link between the beneficial user equipment and the supportive user equipment, so as to establish the support link.

In a second possible implementation manner, with reference to the first possible implementation manner of the first aspect, before the separately sending a first-hop link setup request to the beneficial user equipment and the pre-supportive user equipment, the method further includes:

when there is one beneficial user equipment and there is at least one pre-supportive user equipment, selecting a pre-supportive user set for the beneficial user equipment, where the pre-supportive user set includes at least one pre-supportive user equipment; or when there is at least one beneficial user equipment and there is one pre-supportive user equipment, selecting a beneficial user set for the pre-supportive user equipment, where the beneficial user set includes at least one beneficial user equipment.

In a third possible implementation manner, with reference to the second possible implementation manner of the first aspect, the selecting a pre-supportive user set for the beneficial user equipment includes: obtaining air interface information of a mobile cellular network of each user; selecting, according to the air interface information of the mobile cellular network, a terminal that meets a preset condition; and adding the terminal to the pre-supportive user set of the beneficial user equipment; and the selecting a beneficial user set for the pre-supportive user equipment includes: obtaining air interface information of a mobile cellular network of each user; selecting, according to the air interface information of the mobile cellular network, a terminal that meets a preset condition; and adding the terminal to the beneficial user set of the pre-supportive user equipment.

In a fourth possible implementation manner, with reference to any one of the first to the third possible implementation manners of the first aspect, the separately sending a first-hop link setup request to the beneficial user equipment and the pre-supportive user equipment, so that the beneficial user equipment and the pre-supportive user equipment establish first-hop physical links according to the first-hop link setup request, includes:

sending a first-hop link setup request to the beneficial user equipment, so that the beneficial user equipment enables a WiFi direct (WiFi Direct) link/access point (AP, Access Point) according to the first-hop link setup request;

receiving a first-hop link setup response returned by the beneficial user equipment, where the first-hop link setup response returned by the beneficial user equipment carries information about the enabled WiFi direct link/access point, and an Internet Protocol (IP, Internet Protocol) address and a WiFi IP address of the beneficial user equipment;

sending, to the pre-supportive user equipment, a first-hop link setup request that carries the information about the enabled WiFi direct link/access point, so that the pre-supportive user equipment accesses, according to the first-hop link setup request, the WiFi direct link/access point enabled by the beneficial user equipment; and receiving a first-hop link setup response returned by the pre-supportive user equipment, where the first-hop link setup response returned by the pre-supportive user equipment carries a rate and a received signal strength indicator (RSSI, Received Signal Strength Indication) of the accessed WiFi direct link/access point.

In a fifth possible implementation manner, with reference to the fourth possible implementation manner of the first aspect, the performing transmission configuration on the first-hop physical link between the beneficial user equipment and the supportive user equipment includes:

sending a first link configuration request to the beneficial user equipment, where the first link configuration request includes IP tunnel information of a downlink (Down Link) of the beneficial user equipment, IP tunnel information of an uplink (Up Link) of the beneficial user equipment, and a routing rule of the beneficial user equipment;

receiving a first link configuration response that is returned by the beneficial user equipment after the beneficial user equipment performs transmission configuration on the first-hop physical link between the beneficial user equipment and the supportive user equipment according to the first link configuration request;

sending a second link configuration request to the supportive user equipment, where the second link configuration request includes a routing rule of a downlink of the supportive user equipment, IP tunnel information of the downlink of the supportive user equipment, a routing rule of an uplink of the supportive user equipment, and IP tunnel information of the uplink of the supportive user equipment; and receiving a second link configuration response that is returned by the supportive user equipment after the supportive user equipment performs transmission configuration on the first-hop physical link between the beneficial user equipment and the supportive user equipment according to the second link configuration request.

In a sixth possible implementation manner, with reference to the fourth possible implementation manner of the first aspect, the performing transmission configuration on the first-hop physical link between the beneficial user equipment and the supportive user equipment includes:

sending a third link configuration request to the beneficial user equipment, where the third link configuration request includes a routing rule of the beneficial user equipment;

receiving a third link configuration response that is returned by the beneficial user equipment after the beneficial user equipment performs transmission configuration on the first-hop physical link between the beneficial user equipment and the supportive user equipment according to the third link configuration request;

sending a fourth link configuration request to the supportive user equipment, where the fourth link configuration request includes a routing rule of a downlink of the supportive user equipment, and a routing rule of an uplink of the supportive user equipment; and receiving a fourth link configuration response that is returned by the supportive user equipment after the supportive user equipment performs transmission configuration on the first-hop physical link between the beneficial user equipment and the supportive user equipment according to the fourth link configuration request.

In a seventh possible implementation manner, with reference to the first aspect and any one of the first to the third possible implementation manners of the first aspect, the separately sending a first-hop link setup request to the beneficial user equipment and the pre-supportive user equipment, so that the beneficial user equipment and the pre-supportive user equipment establish first-hop physical links according to the first-hop link setup request, includes:

sending a first-hop link setup request to the pre-supportive user equipment, so that the pre-supportive user equipment enables a WiFi direct link/access point according to the first-hop link setup request;

receiving a first-hop link setup response returned by the pre-supportive user equipment, where the first-hop link setup response returned by the pre-supportive user equipment carries information about the enabled WiFi direct link/access point, and a cellular IP address and a WiFi IP address of the pre-supportive user equipment;

sending, to the beneficial user equipment, a first-hop link setup request that carries the information about the enabled WiFi direct link/access point, so that the beneficial user equipment accesses, according to the first-hop link setup request, the WiFi direct link/access point enabled by the pre-supportive user equipment; and receiving a first-hop link setup response returned by the beneficial user equipment, where the first-hop link setup response returned by the beneficial user equipment carries a rate and a received signal strength indicator of the accessed WiFi direct link/access point.

In an eighth possible implementation manner, with reference to the first aspect and any one of the first to the third possible implementation manners of the first aspect, the separately sending a first-hop link setup request to the beneficial user equipment and the pre-supportive user equipment, so that the beneficial user equipment and the pre-supportive user equipment establish first-hop physical links according to the first-hop link setup request, includes:

sending a query message about a WiFi direct link/access point to the pre-supportive user equipment;

receiving a query response returned by the pre-supportive user equipment, where the query response carries information about an enabled WiFi direct link/access point, and a cellular IP address and a WiFi IP address of the pre-supportive user equipment;

sending, to the beneficial user equipment, a first-hop link setup request that carries the information about the enabled WiFi direct link/access point, so that the beneficial user equipment accesses, according to the first-hop link setup request, the WiFi direct link/access point enabled by the pre-supportive user equipment; and;

receiving a first-hop link setup response returned by the beneficial user equipment, where the first-hop link setup response returned by the beneficial user equipment carries a rate and a received signal strength indicator of the accessed WiFi direct link/access point.

In a ninth possible implementation manner, with reference to the first aspect and any one of the first to the third possible implementation manners of the first aspect, the separately receiving initial measurement information sent by the pre-supportive user equipment and/or the beneficial user equipment includes:

separately receiving link information of the first-hop physical link reported by the pre-supportive user equipment and/or the beneficial user equipment, where the link information includes a transmission rate and/or channel quality;

the selecting a supportive user equipment of the beneficial user equipment from the pre-supportive user equipment according to the initial measurement information includes: selecting, from the pre-supportive user equipment according to the link information, a terminal meeting a preset condition as the supportive user equipment of the beneficial user equipment; and the selecting, according to the initial measurement information, a beneficial user equipment that is supported by the supportive user equipment includes: selecting, according to the link information, the beneficial user equipment that is supported by the supportive user equipment.

In a tenth possible implementation manner, with reference to the first aspect and any one of the first to the third possible implementation manners of the first aspect, the separately receiving link measurement information of the support link reported by the beneficial user equipment and/or the supportive user equipment includes:

separately receiving measurement rate information and/or received signal strength indicator information of a cooperative link periodically reported by the beneficial user equipment and/or the supportive user equipment; and/or separately receiving WiFi signal quality information that is reported by the beneficial user equipment and/or the supportive user equipment in an event-based manner.

In an eleventh possible implementation manner, with reference to the first aspect and any one of the first to the third possible implementation manners of the first aspect, before the separately receiving link measurement information of the support link reported by the beneficial user equipment and/or the supportive user equipment, the method further includes:

performing independent configuration on a link measurement manner of the support link; or performing configuration on a link measurement manner when the initial measurement is performed on the first-hop physical link, so that the beneficial user equipment and the supportive user equipment perform measurement on the support link according to the link measurement manner.

In a twelfth possible implementation manner, with reference to the first aspect and any one of the first to the third possible implementation manners of the first aspect, after the performing transmission configuration on the first-hop physical link between the beneficial user equipment and the supportive user equipment, so as to establish a support link, the method further includes:

using the support link to transfer a data packet, where the data packet undergoes Internet Protocol tunnel encapsulation that is performed according to first-hop Internet Protocol information of the support link by the beneficial user equipment or the supportive user equipment; or a downlink data packet undergoes Internet Protocol tunnel encapsulation that is performed according to first-hop Internet Protocol information of the support link by a base station at the time of offloading.

In a thirteenth possible implementation manner, with reference to the first aspect and any one of the first to the third possible implementation manners of the first aspect, the controlling the support link according to the link measurement information includes:

if the link measurement information indicates that a supportive user equipment exits, releasing a support link corresponding to the supportive user equipment that exits from a supportive user set; and if the link measurement information indicates that cooperative communication is complete, and all supportive user equipments have released corresponding support links, releasing a support link corresponding to the beneficial user equipment.

According to a second aspect, an embodiment of the present invention further provides a method for controlling a link in cooperative communication, including:

receiving, by a terminal, a first-hop link setup request sent by a base station;

establishing, by the terminal, a first-hop physical link according to the first-hop link setup request;

performing, by the terminal, initial measurement on the first-hop physical link, and sending the initial measurement information to the base station, where the initial measurement information is used, when the terminal includes one beneficial user equipment and at least one pre-supportive user equipment, by the base station to select a supportive user equipment of the beneficial user equipment from the pre-supportive user equipment according to the initial measurement information; or the initial measurement information is used, when the terminal includes at least one beneficial user equipment and one pre-supportive user equipment, by the base station to use the pre-supportive user equipment as a supportive user equipment, and select, according to the initial measurement information, a beneficial user equipment that needs to be supported by the supportive user equipment;

establishing, by the terminal, a support link based on the first-hop physical link;

performing, by the terminal, measurement on the support link to obtain link measurement information; and sending, by the terminal, the link measurement information to the base station, so that the base station controls the support link according to the link measurement information.

In a first possible implementation manner, with reference to the second aspect, the establishing, by the terminal, a support link based on the first-hop physical link includes:

receiving, by the terminal, transmission configuration that is performed by the base station on the first-hop physical link, so as to establish the support link.

In a second possible implementation manner, with reference to the first possible implementation manner of the second aspect, if the terminal is a beneficial user equipment, the receiving, by a terminal, a first-hop link setup request sent by a base station includes:

receiving, by the beneficial user equipment, the first-hop link setup request sent by the base station; and the establishing, by the terminal, a first-hop physical link according to the first-hop link setup request is specifically: enabling, by the beneficial user equipment, a WiFi direct link/access point according to the first-hop link setup request, and returning a first-hop link setup response to the base station, so as to establish the first-hop physical link, where the first-hop link setup response carries information about the enabled WiFi direct link/access point, and a cellular IP address and a WiFi IP address of the beneficial user equipment.

In a third possible implementation manner, with reference to the second possible implementation manner of the second aspect, the receiving, by the terminal, transmission configuration that is performed by the base station on the first-hop physical link, so as to establish the support link, includes:

receiving, by the beneficial user equipment, a first link configuration request sent by the base station, where the first link configuration request includes IP tunnel information of a downlink of the beneficial user equipment, IP tunnel information of an uplink of the beneficial user equipment, and a routing rule of the beneficial user equipment; and returning, by the beneficial user equipment, a first link configuration response to the base station after performing transmission configuration on the first-hop physical link according to the first link configuration request, so as to establish the support link.

In a fourth possible implementation manner, with reference to the second possible implementation manner of the second aspect, the receiving, by the terminal, transmission configuration that is performed by the base station on the first-hop physical link, so as to establish the support link, includes:

receiving, by the beneficial user equipment, a third link configuration request sent by the base station, where the third link configuration request includes a routing rule of the beneficial user equipment; and returning, by the beneficial user equipment, a third link configuration response to the base station after performing transmission configuration on the first-hop physical link according to the third link configuration request, so as to establish the support link.

In a fifth possible implementation manner, with reference to the first possible implementation manner of the second aspect, if the terminal is a supportive user equipment, the receiving, by a terminal, a first-hop link setup request sent by a base station includes:

receiving, by the supportive user equipment, a first-hop link setup request that carries information about an enabled WiFi direct link/access point and is sent by the base station; and the establishing, by the terminal, a first-hop physical link according to the first-hop link setup request is specifically: accessing, by the supportive user equipment according to the first-hop link setup request, a WiFi direct link/access point enabled by the beneficial user equipment, and returning a first-hop link setup response to the base station, so as to establish the first-hop physical link, where the first-hop link setup response carries a rate and a received signal strength indicator of the accessed WiFi direct link/access point.

In a sixth possible implementation manner, with reference to the fifth possible implementation manner of the second aspect, the receiving, by the terminal, transmission configuration that is performed by the base station on the first-hop physical link, so as to establish the support link, includes:

receiving, by the supportive user equipment, a second link configuration request sent by the base station, where the second link configuration request includes a routing rule of a downlink of the supportive user equipment, IP tunnel information of the downlink of the supportive user equipment, a routing rule of an uplink of the supportive user equipment, and IP tunnel information of the uplink of the supportive user equipment; and returning, by the supportive user equipment, a second link configuration response to the base station after performing transmission configuration on the first-hop physical link according to the second link configuration request, so as to establish the support link.

In a seventh possible implementation manner, with reference to the fifth possible implementation manner of the second aspect, the receiving, by the terminal, transmission configuration that is performed by the base station on the first-hop physical link, so as to establish the support link, includes:

receiving, by the supportive user equipment, a fourth link configuration request sent by the base station, where the fourth link configuration request includes a routing rule of a downlink of the supportive user equipment, and a routing rule of an uplink of the supportive user equipment; and returning, by the supportive user equipment, a fourth link configuration response to the base station after performing transmission configuration on the first-hop physical link according to the fourth link configuration request, so as to establish the support link.

In an eighth possible implementation manner, with reference to the second aspect, if the terminal is a supportive user equipment, the receiving, by a terminal, a first-hop link setup request sent by a base station includes:

receiving, by the supportive user equipment, a query message that is about a WiFi direct link/access point and sent by the base station; and the establishing, by the terminal, a first-hop physical link according to the first-hop link setup request includes: returning, by the supportive user equipment, a query response to the base station, so as to establish the first-hop physical link, where the query response carries information about an enabled WiFi direct link/access point, and a cellular IP address and a WiFi IP address of the pre-supportive user equipment.

In a ninth possible implementation manner, with reference to the second aspect, if the terminal is a beneficial user equipment, the receiving, by a terminal, a first-hop link setup request sent by a base station includes:

receiving, by the beneficial user equipment, a first-hop link setup request that carries information about an enabled WiFi direct link/access point and is sent by the base station; and the establishing, by the terminal, a first-hop physical link according to the first-hop link setup request includes: accessing, by the beneficial user equipment according to the first-hop link setup request, a WiFi direct link/access point enabled by the pre-supportive user equipment, and returning a first-hop link setup response to the base station, so as to establish the first-hop physical link, where the first-hop link setup response that is returned by the beneficial user equipment carries a rate and a received signal strength indicator of the accessed WiFi direct link/access point.

In a tenth possible implementation manner, with reference to the second aspect and any one of the first to the ninth possible implementation manners of the second aspect, the sending, by the terminal, the link measurement information to the base station includes:

periodically reporting, by the terminal, measurement rate information and received signal strength indicator information of a cooperative link to the base station; and/or reporting, by the terminal, WiFi signal quality information to the base station in an event-based manner.

In an eleventh possible implementation manner, with reference to the second aspect and any one of the first to the ninth possible implementation manners of the second aspect, the performing, by the terminal, measurement on the support link to obtain link measurement information includes:

receiving independent configuration that is performed on a link measurement manner of the support link by the base station, or receiving configuration that is performed on a link measurement manner by the base station when the initial measurement is performed on the first-hop physical link, and performing measurement on the support link according to the link measurement manner, so as to obtain the link measurement information.

In a twelfth possible implementation manner, with reference to the second aspect and any one of the first to the ninth possible implementation manners of the second aspect, after the receiving, by the terminal, transmission configuration that is performed by the base station on the first-hop physical link, so as to establish the support link, the method further includes:

performing, by the terminal, Internet Protocol tunnel encapsulation on a data packet according to first-hop Internet Protocol information of the support link, and using the support to transfer the encapsulated data packet; or using, by the terminal, the support link to receive a data packet that is obtained by the base station by performing Internet Protocol tunnel encapsulation according to first-hop Internet Protocol information of the support link and delivered by the base station.

According to a third aspect, an embodiment of the present invention further provides a base station, including a confirming unit, a transceiver unit, a selecting unit, an establishing unit, and a control unit, where:

the confirming unit is configured to confirm that a beneficial user equipment and a pre-supportive user equipment have a capability of performing cooperative communication;

the transceiver unit is configured to: after the confirming unit confirms that the beneficial user equipment and the pre-supportive user equipment have a capability of performing cooperative communication; separately send a first-hop link setup request to the beneficial user equipment and the pre-supportive user equipment, so that the beneficial user equipment and the pre-supportive user equipment establish first-hop physical links according to the first-hop link setup request; and separately receive initial measurement information sent by the pre-supportive user equipment and/or the beneficial user equipment, where the initial measurement information is sent after initial measurement is performed on the first-hop physical link;

the selecting unit is configured to: when there is one beneficial user equipment and there is at least one pre-supportive user equipment, select a supportive user equipment of the beneficial user equipment from the pre-supportive user equipment according to the initial measurement information; or when there is at least one beneficial user equipment and there is one pre-supportive user equipment, use the pre-supportive user equipment as a supportive user equipment, and select, according to the initial measurement information, a beneficial user equipment that is supported by the supportive user equipment;

the establishing unit is configured to establish, based on a first-hop physical link between the beneficial user equipment and the supportive user equipment, a support link;

the transceiver unit is further configured to separately receive link measurement information of the support link reported by the beneficial user equipment and/or the supportive user equipment, where the link measurement information is obtained by the beneficial user equipment and/or the supportive user equipment by performing measurement on the support link; and the control unit is configured to control the support link according to the link measurement information.

In a first possible implementation manner, with reference to the third aspect, the establishing unit is specifically configured to perform transmission configuration on the first-hop physical link between the beneficial user equipment and the supportive user equipment, so as to establish the support link.

In a second possible implementation manner, with reference to the first possible implementation manner of the third aspect, the base station further includes a user set selecting unit, where the user set selecting unit is configured to: when there is one beneficial user equipment and there is at least one pre-supportive user equipment, select a pre-supportive user set for the beneficial user equipment, where the pre-supportive user set includes at least one pre-supportive user equipment; or the user set selecting unit is configured to: when there is at least one beneficial user equipment and there is one pre-supportive user equipment, select a beneficial user set for the pre-supportive user equipment, where the beneficial user set includes at least one beneficial user equipment.

In a third possible implementation manner, with reference to the second possible implementation manner of the third aspect, the user set selecting unit is specifically configured to obtain air interface information of a mobile cellular network of each user; select, according to the air interface information of the mobile cellular network, a terminal that meets a preset condition; and add the terminal to the pre-supportive user set of the beneficial user equipment; or the user set selecting unit is specifically configured to obtain air interface information of a mobile cellular network of each user; select, according to the air interface information of the mobile cellular network, a terminal that meets a preset condition; and add the terminal to the beneficial user set of the pre-supportive user equipment.

In a fourth possible implementation manner, with reference to any one of the first to the fourth possible implementation manners of the third aspect, the transceiver unit is specifically configured to:

send a first-hop link setup request to the beneficial user equipment, so that the beneficial user equipment enables a WiFi direct link/access point according to the first-hop link setup request;

receive a first-hop link setup response returned by the beneficial user equipment, where the first-hop link setup response returned by the beneficial user equipment carries information about the enabled WiFi direct link/access point, and a cellular IP address and a WiFi IP address of the beneficial user equipment;

send, to the pre-supportive user equipment, a first-hop link setup request that carries the information about the enabled WiFi direct link/access point, so that the pre-supportive user equipment accesses, according to the first-hop link setup request, the WiFi direct link/access point enabled by the beneficial user equipment; and receive a first-hop link setup response returned by the pre-supportive user equipment, where the first-hop link setup response returned by the pre-supportive user equipment carries a rate and a received signal strength indicator of the accessed WiFi direct link/access point.

In a fifth possible implementation manner, with reference to the fourth possible implementation manner of the third aspect, the establishing unit is specifically configured to send a first link configuration request to the beneficial user equipment, where the first link configuration request includes IP tunnel information of a downlink of the beneficial user equipment, IP tunnel information of an uplink of the beneficial user equipment, and a routing rule of the beneficial user equipment; receive a first link configuration response that is returned by the beneficial user equipment after the beneficial user equipment performs transmission configuration on the first-hop physical link between the beneficial user equipment and the supportive user equipment according to the first link configuration request; send a second link configuration request to the supportive user equipment, where the second link configuration request includes a routing rule of a downlink of the supportive user equipment, IP tunnel information of the downlink of the supportive user equipment, a routing rule of an uplink of the supportive user equipment, and IP tunnel information of the uplink of the supportive user equipment; and receive a second link configuration response that is returned by the supportive user equipment after the supportive user equipment performs transmission configuration on the first-hop physical link between the beneficial user equipment and the supportive user equipment according to the second link configuration request.

In a sixth possible implementation manner, with reference to the fourth possible implementation manner of the third aspect, the establishing unit is configured to send a third link configuration request to the beneficial user equipment, where the third link configuration request includes a routing rule of the beneficial user equipment; receive a third link configuration response that is returned by the beneficial user equipment after the beneficial user equipment performs transmission configuration on the first-hop physical link between the beneficial user equipment and the supportive user equipment according to the third link configuration request; send a fourth link configuration request to the supportive user equipment, where the fourth link configuration request includes a routing rule of a downlink of the supportive user equipment, and a routing rule of an uplink of the supportive user equipment; and receive a fourth link configuration response that is returned by the supportive user equipment after the supportive user equipment performs transmission configuration on the first-hop physical link between the beneficial user equipment and the supportive user equipment according to the fourth link configuration request.

In a seventh possible implementation manner, with reference to the third aspect and any one of the first to the third possible implementation manners of the third aspect, the transceiver unit is specifically configured to:

send a first-hop link setup request to the pre-supportive user equipment, so that the pre-supportive user equipment enables a WiFi direct link/access point according to the first-hop link setup request;

receive a first-hop link setup response returned by the pre-supportive user equipment, where the first-hop link setup response returned by the pre-supportive user equipment carries information about the enabled WiFi direct link/access point, and a cellular IP address and a WiFi IP address of the pre-supportive user equipment;

send, to the beneficial user equipment, a first-hop link setup request that carries the information about the enabled WiFi direct link/access point, so that the beneficial user equipment accesses, according to the first-hop link setup request, the WiFi direct link/access point enabled by the pre-supportive user equipment; and;

receive a first-hop link setup response returned by the beneficial user equipment, where the first-hop link setup response returned by the beneficial user equipment carries a rate and a received signal strength indicator of the accessed WiFi direct link/access point.

In an eighth possible implementation manner, with reference to the third aspect and any one of the first to the third possible implementation manners of the third aspect, the transceiver unit is specifically configured to:

send a query message about a WiFi direct link/access point to the pre-supportive user equipment;

receive a query response returned by the pre-supportive user equipment, where the query response carries information about an enabled WiFi direct link/access point, and a cellular IP address and a WiFi IP address of the pre-supportive user equipment;

send, to the beneficial user equipment, a first-hop link setup request that carries the information about the enabled WiFi direct link/access point, so that the beneficial user equipment accesses, according to the first-hop link setup request, the WiFi direct link/access point enabled by the pre-supportive user equipment; and;

receive a first-hop link setup response returned by the beneficial user equipment, where the first-hop link setup response returned by the beneficial user equipment carries a rate and a received signal strength indicator of the accessed WiFi direct link/access point.

In a ninth possible implementation manner, with reference to the third aspect and any one of the first to the third possible implementation manners of the third aspect, the selecting unit is specifically configured to obtain link information of the first-hop physical link, where the link information includes a transmission rate and/or channel quality; and select, from the pre-supportive user equipment according to the link information, a terminal meeting a preset condition as the supportive user equipment of the beneficial user equipment; or select, according to the link information, the beneficial user equipment that is supported by the supportive user equipment.

In a tenth possible implementation manner, with reference to the third aspect and any one of the first to the third possible implementation manners of the third aspect, the transceiver unit is specifically configured to separately receive measurement rate information and/or received signal strength indicator information of a cooperative link periodically reported by the beneficial user equipment and/or the supportive user equipment; and/or, the transceiver unit is specifically configured to separately receive WiFi signal quality information that is reported by the beneficial user equipment and/or the supportive user equipment in an event-based manner.

In an eleventh possible implementation manner, with reference to the third aspect and any one of the first to the third possible implementation manners of the third aspect, the base station further includes a configuring unit, where:

the configuring unit is configured to perform independent configuration on a link measurement manner of the support link, or perform configuration on a link measurement manner when the initial measurement is performed on the first-hop physical link, so that the beneficial user equipment and the supportive user equipment perform measurement on the support link according to the link measurement manner.

In the ninth possible implementation manner, with reference to the third aspect and any one of the first to the third possible implementation manners of the third aspect, the base station further includes a transmitting unit, where:

the transmitting unit is configured to use the support link to transfer a data packet, where the data packet undergoes Internet Protocol tunnel encapsulation that is performed according to first-hop Internet Protocol information of the support link by the beneficial user equipment or the supportive user equipment; or a downlink data packet undergoes Internet Protocol tunnel encapsulation that is performed according to first-hop Internet Protocol information of the support link by the base station at the time of offloading.

In a twelfth possible implementation manner, with reference to the third aspect and any one of the first to the third possible implementation manners of the third aspect, the control unit is specifically configured to: if the link measurement information indicates that a supportive user equipment exits, release a support link corresponding to the supportive user equipment that exits from a supportive user set; and if the link measurement information indicates that cooperative communication is complete, and all supportive user equipments have released corresponding support links, release a support link corresponding to the beneficial user equipment.

According to a fourth aspect, an embodiment of the present invention further provides a terminal, including a receiving unit, a physical link establishing unit, a physical link measuring unit, a support link establishing unit, a support link measuring unit, and a sending unit, where:

the receiving unit is configured to receive a first-hop link setup request sent by a base station;

the physical link establishing unit is configured to establish a first-hop physical link according to the first-hop link setup request that is received by the receiving unit;

the physical link measuring unit is configured to perform initial measurement on the first-hop physical link established by the physical link establishing unit, and send the initial measurement information to the base station, where the initial measurement information is used, when the terminal includes one beneficial user equipment and at least one pre-supportive user equipment, by the base station to select a supportive user equipment of the beneficial user equipment from the pre-supportive user equipment according to the initial measurement information; or the initial measurement information is used, when the terminal includes at least one beneficial user equipment and one pre-supportive user equipment, by the base station to use the pre-supportive user equipment as a supportive user equipment, and select, according to the initial measurement information, a beneficial user equipment that needs to be supported by the supportive user equipment;

the support link establishing unit is configured to establish a support link based on the first-hop physical link;

the measuring unit is configured to perform measurement on the support link to obtain link measurement information; and the sending unit is configured to send the link measurement information to the base station, so that the base station controls the support link according to the link measurement information.

In a first possible implementation manner, with reference to the fourth aspect, the support link establishing unit is specifically configured to receive transmission configuration that is performed by the base station on the first-hop physical link, so as to establish the support link.

In a second possible implementation manner, with reference to the first possible implementation manner of the fourth aspect, the receiving unit is specifically configured to: when the terminal is a beneficial user equipment, receive the first-hop link setup request sent by the base station; and the physical link establishing unit is specifically configured to enable a WiFi direct link/access point according to the first-hop link setup request, and return a first-hop link setup response to the base station, so as to establish the first-hop physical link, where the first-hop link setup response carries information about the enabled WiFi direct link/access point, and a cellular IP address and a WiFi IP address of the beneficial user equipment.

In a third possible implementation manner, with reference to the second possible implementation manner of the fourth aspect, the support link establishing unit is specifically configured to receive a first link configuration request sent by the base station, where the first link configuration request includes IP tunnel information of a downlink of the beneficial user equipment, IP tunnel information of an uplink of the beneficial user equipment, and a routing rule of the beneficial user equipment; and return a first link configuration response to the base station after performing transmission configuration on the first-hop physical link according to the first link configuration request, so as to establish the support link.

In a fourth possible implementation manner, with reference to the second possible implementation manner of the fourth aspect, the support link establishing unit is specifically configured to receive a third link configuration request sent by the base station, where the third link configuration request includes a routing rule of the beneficial user equipment; and return a third link configuration response to the base station after performing transmission configuration on the first-hop physical link according to the third link configuration request, so as to establish the support link.

In a fifth possible implementation manner, with reference to the first possible implementation manner of the fourth aspect, the receiving unit is specifically configured to: when the terminal is a supportive user equipment, receive a first-hop link setup request that carries information about an enabled WiFi direct link/access point and is sent by the base station; and the physical link establishing unit is specifically configured to access, according to the first-hop link setup request, a WiFi direct link/access point enabled by the beneficial user equipment, and return a first-hop link setup response to the base station, so as to establish the first-hop physical link, where the first-hop link setup response carries a rate and a received signal strength indicator of the accessed WiFi direct link/access point.

In a sixth possible implementation manner, with reference to the fifth possible implementation manner of the fourth aspect, the support link establishing unit is specifically configured to receive a second link configuration request sent by the base station, where the second link configuration request includes a routing rule of a downlink of the supportive user equipment, IP tunnel information of the downlink of the supportive user equipment, a routing rule of an uplink of the supportive user equipment, and IP tunnel information of the uplink of the supportive user equipment; and return a second link configuration response to the base station after performing transmission configuration on the first-hop physical link according to the second link configuration request, so as to establish the support link.

In a seventh possible implementation manner, with reference to the fourth possible implementation manner of the fourth aspect, the support link establishing unit is specifically configured to receive a fourth link configuration request sent by the base station, where the fourth link configuration request includes a routing rule of a downlink of the supportive user equipment, and a routing rule of an uplink of the supportive user equipment; and return a fourth link configuration response to the base station after performing transmission configuration on the first-hop physical link according to the fourth link configuration request, so as to establish the support link.

In an eighth possible implementation manner, with reference to the fourth aspect, the receiving unit is specifically configured to: when the terminal is a supportive user equipment, receive a query message that is about a WiFi direct link/access point and sent by the base station; and the physical link establishing unit is specifically configured to return a query response to the base station, so as to establish the first-hop physical link, where the query response carries information about an enabled WiFi direct link/access point, and a cellular IP address and a WiFi IP address of the pre-supportive user equipment.

In a ninth possible implementation manner, with reference to the fourth aspect, the receiving unit is specifically configured to: when the terminal is a supportive user equipment, receive a first-hop link setup request that carries information about an enabled WiFi direct link/access point and is sent by the base station; and the physical link establishing unit is specifically configured to access, according to the first-hop link setup request, a WiFi direct link/access point enabled by the pre-supportive user equipment, and return a first-hop link setup response to the base station, so as to establish the first-hop physical link, where the first-hop link setup response returned by the beneficial user equipment carries a rate and a received signal strength indicator of the accessed WiFi direct link/access point.

In a tenth possible implementation manner, with reference to the fourth aspect and any one of the first to the ninth possible implementation manners of the fourth aspect, the sending unit is specifically configured to periodically report measurement rate information and received signal strength indicator information of a cooperative link to the base station; and/or report WiFi signal quality information to the base station in an event-based manner.

In an eleventh possible implementation manner, with reference to the fourth aspect and any one of the first to the ninth possible implementation manners of the fourth aspect, the terminal may further include a transmitting unit, where the transmitting unit is configured to perform Internet Protocol tunnel encapsulation on a data packet according to first-hop Internet Protocol information of the support link, and use the support to transfer the encapsulated data packet; or the transmitting unit is configured to use the support link to receive a data packet that is obtained by the base station by performing Internet Protocol tunnel encapsulation according to first-hop Internet Protocol information of the support link and delivered by the base station.

According to a fifth aspect, an embodiment of the present invention further provides a communications system, including any base station provided in the embodiments of the present invention and any terminal provided in the embodiments of the present invention.

According to a sixth aspect, an embodiment of the present invention further provides a base station, including a processor, a transceiver device, and a memory configured to store data, where the transceiver device is configured to: under control of the processor, separately send a first-hop link setup request to a beneficial user equipment and a pre-supportive user equipment, so that the beneficial user equipment and the pre-supportive user equipment establish first-hop physical links according to the first-hop link setup request; and separately receive link measurement information of the support link reported by the beneficial user equipment and/or a supportive user equipment, where the link measurement information is obtained by the beneficial user equipment and/or the supportive user equipment by performing measurement on the support link; and the processor is configured to confirm that the beneficial user equipment and the pre-supportive user equipment have a capability of performing cooperative communication; control the transceiver device to separately send the first-hop link setup request to the beneficial user equipment and the pre-supportive user equipment, so that the beneficial user equipment and the pre-supportive user equipment establish the first-hop physical links according to the first-hop link setup request; separately receive initial measurement information that is sent by the pre-supportive user equipment and/or the beneficial user equipment after the pre-supportive user equipment and/or the beneficial user equipment performs initial measurement on the first-hop physical link; when there is one beneficial user equipment and there is at least one pre-supportive user equipment, select a supportive user equipment of the beneficial user equipment from the pre-supportive user equipment according to the initial measurement information; or when there is at least one beneficial user equipment and there is one pre-supportive user equipment, use the pre-supportive user equipment as the supportive user equipment, and select, according to the initial measurement information, a beneficial user equipment that is supported by the supportive user equipment; establish, based on a first-hop physical link between the beneficial user equipment and the supportive user equipment, the support link; and control the support link according to the link measurement information that is received by the transceiver device.

According to a seventh aspect, an embodiment of the present invention further provides a terminal, including a processor, a transceiver device, and a memory configured to store data, where the transceiver device is configured to receive a first-hop link setup request sent by a base station, and under control of the processor, send initial measurement information to the base station and send the link measurement information to the base station, where the initial measurement information is used, when the terminal includes one beneficial user equipment and at least one pre-supportive user equipment, by the base station to select a supportive user equipment of the beneficial user equipment from the pre-supportive user equipment according to the initial measurement information; or the initial measurement information is used, when the terminal includes at least one beneficial user equipment and one pre-supportive user equipment, by the base station to use the pre-supportive user equipment as a supportive user equipment, and select, according to the initial measurement information, a beneficial user equipment that needs to be supported by the supportive user equipment; and the processor is configured to establish a first-hop physical link according to the first-hop link setup request that is received by the transceiver device; perform initial measurement on the first-hop physical link, control the transceiver device to send the initial measurement information to the base station, and establish a support link based on the first-hop physical link; perform measurement on the support link to obtain link measurement information; and control the transceiver device to send the link measurement information to the base station, so that the base station controls the support link according to the link measurement information.

In the embodiments of the present invention, it is confirmed that a beneficial user equipment and a pre-supportive user equipment have a capability of performing cooperative communication; a first-hop link setup request is separately sent to the beneficial user equipment and the pre-supportive user equipment, so that the beneficial user equipment and the pre-supportive user equipment establish first-hop physical links according to the first-hop link setup request; and initial measurement information that is sent by the pre-supportive user equipment and/or the beneficial user equipment after the pre-supportive user equipment and/or the beneficial user equipment performs initial measurement on the first-hop physical link is separately received; when there is one beneficial user equipment and there is at least one pre-supportive user equipment, a supportive user equipment of the beneficial user equipment is selected from the pre-supportive user equipment according to the initial measurement information; or when there is at least one beneficial user equipment and there is one pre-supportive user equipment, the pre-supportive user equipment is used as a supportive user equipment, and a beneficial user equipment that is supported by the supportive user equipment is selected according to the initial measurement information; then a support link is established based on a first-hop physical link between the beneficial user equipment and the supportive user equipment; link measurement information of the support link reported by the beneficial user equipment and the supportive user equipment after the beneficial user equipment and the supportive user equipment perform measurement on the support link is received; and the support link is controlled according to the link measurement information, thereby achieving an objective of performing control and management on a link in cooperative communication, and improving the transmission efficiency and communication quality of cooperative communication.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person skilled in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person skilled in the art based on the embodiments of the present invention without creative efforts shall fall within the protection scope of the present invention.

The embodiments of the present invention provide a method, an apparatus, and a system for controlling a link in cooperative communication. The following separately provides detailed descriptions.

Embodiment 1

This embodiment is described from a perspective of a base station, where the base station may be specifically a device, such as an evolved base station (eNB) or another transmitting station.

A method for controlling a link in cooperative communication includes: confirming that a beneficial user equipment and a pre-supportive user equipment have a capability of performing cooperative communication; separately sending a first-hop link setup request to the beneficial user equipment and the pre-supportive user equipment, so that the beneficial user equipment and the pre-supportive user equipment establish first-hop physical links according to the first-hop link setup request; and separately receiving initial measurement information that is sent by the pre-supportive user equipment and/or the beneficial user equipment after the pre-supportive user equipment and/or the beneficial user equipment performs initial measurement on the first-hop physical link; when there is one beneficial user equipment and there is at least one pre-supportive user equipment, selecting a supportive user equipment of the beneficial user equipment from the pre-supportive user equipment according to the initial measurement information; or when there is at least one beneficial user equipment and there is one pre-supportive user equipment, using the pre-supportive user equipment as a supportive user equipment, and selecting, according to the initial measurement information, a beneficial user equipment that is supported by the supportive user equipment; establishing, based on a first-hop physical link between the beneficial user equipment and the supportive user equipment, a support link; separately receiving link measurement information of the support link reported by the beneficial user equipment and/or the supportive user equipment, where the link measurement information is obtained by the beneficial user equipment and/or the supportive user equipment by performing measurement on the support link; and controlling the support link according to the link measurement information.

Figure 1A:
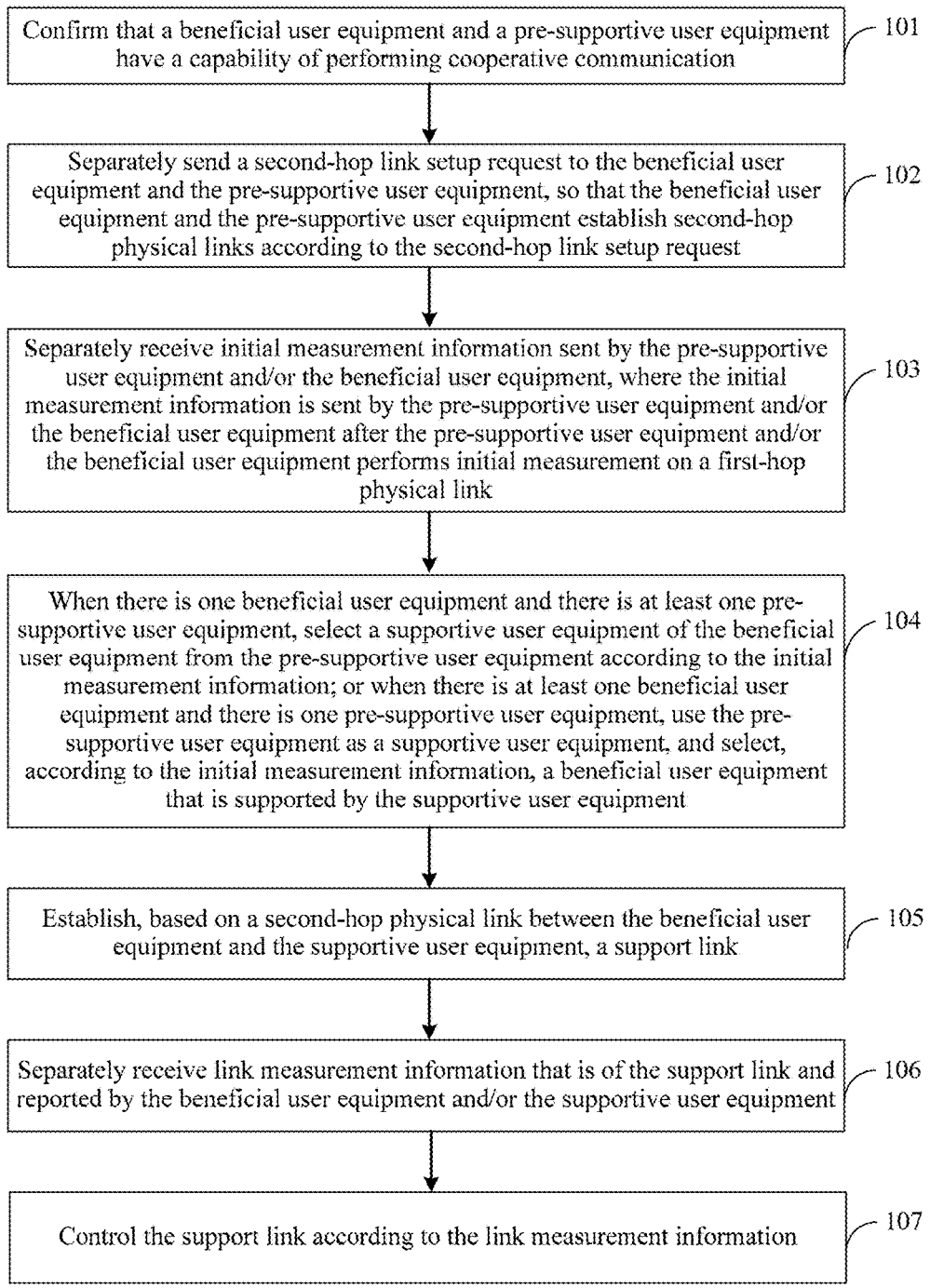
FIG. 1a is a flowchart of a method for controlling a link in cooperative communication according to an embodiment of the present invention.

As shown in FIG. 1a, a specific process may be as follows:

101. Confirm that a beneficial user equipment and a pre-supportive user equipment have a capability of performing cooperative communication.

The capability of performing cooperative communication refers to whether the beneficial user equipment and the pre-supportive user equipment can perform cooperative communication. That is, the pre-supportive user equipment can assist the beneficial user equipment to perform communication.

Whether the beneficial user equipment and the pre-supportive user equipment have a cooperative communication capability may be determined according to neighbor relationship information. The neighbor relationship information may include that: one beneficial user equipment corresponds to a plurality of pre-supportive user equipments, or a plurality of beneficial user equipments corresponds to one pre-supportive user equipment.

102. Separately send a first-hop link setup request (for example MUCC Pairing Second Hop Setup Request) to the beneficial user equipment and the pre-supportive user equipment, so that the beneficial user equipment and the pre-supportive user equipment establish first-hop physical links according to the first-hop link setup request.

Figure 1B:
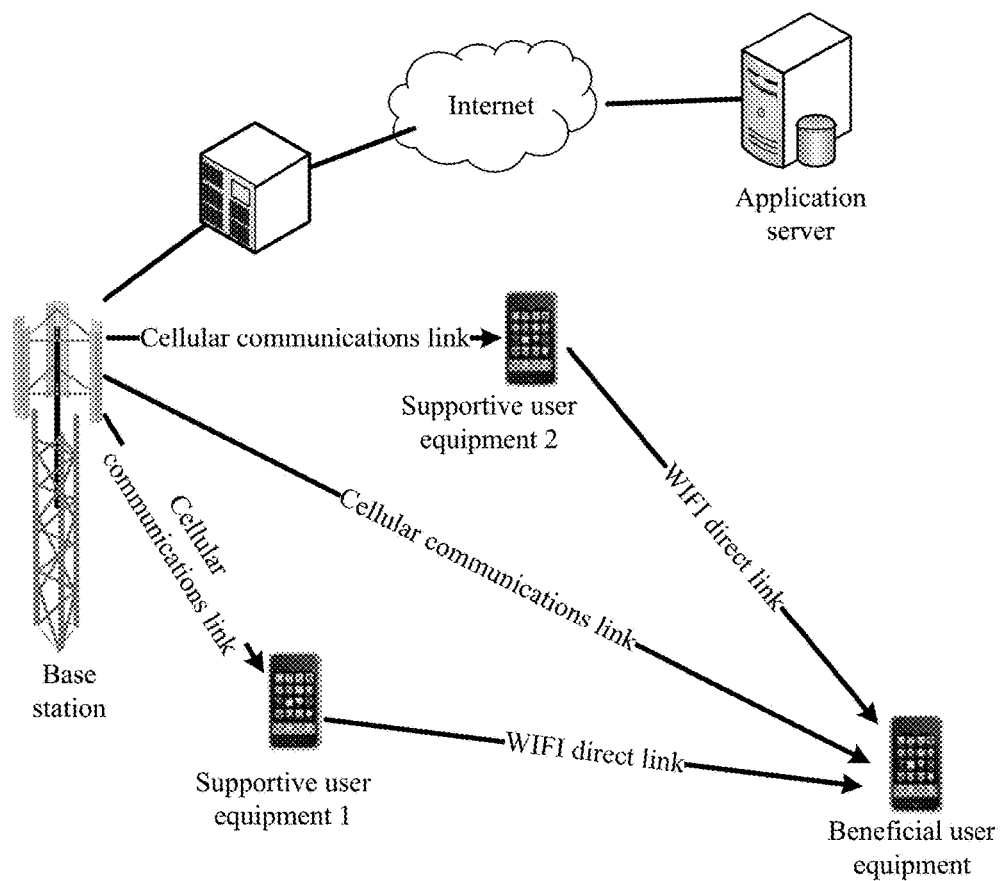
FIG. 1b is a schematic diagram of a scenario of cooperative communication according to an embodiment of the present invention.

In cooperative communication, in addition to an originally established cellular link between a base station and a terminal, a direct link also needs to be established between terminals, for example, a direct link between a beneficial user equipment and a supportive user equipment, or a direct link between a beneficial user equipment and a pre-supportive user equipment, or the like. For ease of description, in the embodiment of the present invention, a direct link between terminals is referred to as a first hop. Therefore, the first-hop link setup request refers to a link setup request that is used to indicate "establishing a direct link between terminals". The direct link may be a WiFi direct link, or may be another wireless direct link. For ease of description, in the embodiment of the present invention, the WiFi direct link is mainly used as an example for description. For example, referring to FIG. 1b, links between a base station and a supportive user equipment 1, between the base station and a supportive user equipment 2, and between the base station and a beneficial user equipment are referred to as cellular communication links. A link between the supportive user equipment 1 and the beneficial user equipment, and a link between the supportive user equipment 2 and the beneficial user equipment are referred to as WiFi direct links. A link for reaching the beneficial user equipment by using the supportive user equipment 1 or the supportive user equipment 2 by the base station is referred to as a support link, that is, the support link may include a cellular communications link and a WiFi direct link.

The first-hop link setup request may be specifically in a plurality of message forms, and the first-hop link setup request may carry a different indication message according to a different target terminal, for example, if a beneficial user equipment needs to be used as an access point, information instructing the beneficial user equipment "to enable a WiFi direct link/access point" may be carried in a first-hop link setup request that is sent to the beneficial user equipment, and information instructing a pre-supportive user equipment "to access the WiFi direct link/access point enabled by the beneficial user equipment" is carried in a first-hop link setup request that is sent to the pre-supportive user equipment; conversely, if a supportive user equipment needs to be used as an access point, information instructing a pre-supportive user equipment "to enable a WiFi direct link/access point" may be carried in a first-hop link setup request that is sent to the pre-supportive user equipment, and information instructing a beneficial user equipment "to access the WiFi direct link/access point enabled by the pre-supportive user equipment" is carried in a first-hop link setup request that is sent to the beneficial user equipment; and so on. That is, the step of "separately sending a first-hop link setup request to the beneficial user equipment and the pre-supportive user equipment, so that the beneficial user equipment and the pre-supportive user equipment establish first-hop physical links according to the first-hop link setup request (namely, step 102)" may be specifically as follows:

(1) In a scenario in which a beneficial user equipment is used as an access point:

send a first-hop link setup request to the beneficial user equipment, so that the beneficial user equipment enables a WiFi direct link/access point according to the first-hop link setup request;

receive a first-hop link setup response (for example MUCC Pairing Second Hop Setup Response) returned by the beneficial user equipment, where the first-hop link setup response returned by the beneficial user equipment may carry information, such as information about the enabled WiFi direct link/access point (for example, information such as an identifier and authentication key of the enabled WiFi), and a cellular IP address and a WiFi IP address of the beneficial user equipment;

send, to the pre-supportive user equipment, a first-hop link setup request that carries the information about the enabled WiFi direct link/access point, so that the pre-supportive user equipment accesses, according to the first-hop link setup request, the WiFi direct link/access point enabled by the beneficial user equipment; and receive a first-hop link setup response returned by the pre-supportive user equipment, where the first-hop link setup response returned by the pre-supportive user equipment may carry information, such as a rate and a received signal strength indicator (RSSI, Received Signal Strength Indication) of the accessed WiFi direct link/access point.

(2) In a scenario in which a supportive user equipment is used as an access point:

This scenario may be mainly classified into two cases: One case is that a WiFi direct link/access point is not enabled, and the other case is that a WiFi direct link/access point is enabled, which may be specifically as follows:

A. In the case in which a WiFi direct link/access point of a pre-supportive user equipment is not enabled:

send a first-hop link setup request to the pre-supportive user equipment, so that the pre-supportive user equipment may enable a WiFi direct link/access point according to the first-hop link setup request;

receive a first-hop link setup response returned by the pre-supportive user equipment, where the first-hop link setup response returned by the pre-supportive user equipment may carry information, such as information about the enabled WiFi direct link/access point (for example, information such as an identifier and authentication key of the enabled WiFi), and a cellular IP address and a WiFi IP address of the pre-supportive user equipment;

send, to a beneficial user equipment, a first-hop link setup request that carries the information about the enabled WiFi direct link/access point, so that the beneficial user equipment may access, according to the first-hop link setup request, the WiFi direct link/access point enabled by the pre-supportive user equipment; and;

receive a first-hop link setup response returned by the beneficial user equipment, where the first-hop link setup response returned by the beneficial user equipment may carry information, such as a rate and a received signal strength indicator of the accessed WiFi direct link/access point.

B. In the case in which a WiFi direct link/access point of a pre-supportive user equipment is enabled:

send a query message about a WiFi direct link/access point to a pre-supportive user equipment;

receive a query response returned by the pre-supportive user equipment, where the query response may carry information, such as information about an enabled WiFi direct link/access point (for example, information such as an identifier and authentication key of the enabled WiFi), and a cellular IP address and a WiFi IP address of the pre-supportive user equipment;

send, to a beneficial user equipment, a first-hop link setup request that carries the information about the enabled WiFi direct link/access point and the like, so that the beneficial user equipment may access, according to the first-hop link setup request, the WiFi direct link/access point enabled by the pre-supportive user equipment; and;

receive a first-hop link setup response returned by the beneficial user equipment, where the first-hop link setup response returned by the beneficial user equipment may carry information, such as a rate and a received signal strength indicator of the accessed WiFi direct link/access point.

The pre-supportive user equipment refers to a terminal that possibly becomes a supportive user equipment of the beneficial user equipment, that is, a candidate terminal of the supportive user equipment. Therefore, when there is one beneficial user equipment and there is at least one pre-supportive user equipment, before the step of "separately sending a first-hop link setup request to the beneficial user equipment and the pre-supportive user equipment", a pre-supportive user set may be further selected for the beneficial user equipment, so that an appropriate terminal may be further selected as the supportive user equipment from the pre-supportive user set subsequently, that is, before the step of "separately sending a first-hop link setup request to the beneficial user equipment and the pre-supportive user equipment", the method for controlling a link in cooperative communication may further include:

selecting a pre-supportive user set for the beneficial user equipment, where the pre-supportive user set may include at least one pre-supportive user equipment, which, for example, may be specifically as follows:

obtaining air interface information of a mobile cellular network of each user, selecting, according to the air interface information of the mobile cellular network, terminals that meet a preset condition, and adding these terminals that meet the preset condition to the pre-supportive user set of the beneficial user equipment.

Similarly, when there is at least one beneficial user equipment and there is one pre-supportive user equipment, a beneficial user set may also be selected for the pre-supportive user equipment, where the beneficial user set includes at least one beneficial user equipment, which, for example, may be specifically as follows:

obtaining air interface information of a mobile cellular network of each user;

selecting, according to the air interface information of the mobile cellular network, a terminal that meets a preset condition; and adding the terminal to the beneficial user set of the pre-supportive user equipment.

The "preset condition" may be set according to an actual application requirement, which is described herein.

103. Separately receive initial measurement information sent by the pre-supportive user equipment and/or the beneficial user equipment, where the initial measurement information is sent by the pre-supportive user equipment and/or the beneficial user equipment after the pre-supportive user equipment and/or the beneficial user equipment performs initial measurement on the first-hop physical link.

For example, 103 may be specifically: separately receiving link information of the first-hop physical link reported by the pre-supportive user equipment and/or the beneficial user equipment.

104. When there is one beneficial user equipment and there is at least one pre-supportive user equipment, select a supportive user equipment of the beneficial user equipment from the pre-supportive user equipment according to the initial measurement information; or when there is at least one beneficial user equipment and there is one pre-supportive user equipment, use the pre-supportive user equipment as a supportive user equipment, and select, according to the initial measurement information, a beneficial user equipment that is supported by the supportive user equipment, which, for example, may be specifically as follows:

selecting, from the pre-supportive user equipment according to the link information received in step 103, a terminal meeting a preset condition as the supportive user equipment of the beneficial user equipment; or, selecting, according to the link information, a beneficial user equipment that is supported by the supportive user equipment.

For example, if the pre-supportive user set has been selected for the beneficial user equipment in step 102, a terminal that meets a preset condition may be selected as the supportive user equipment of the beneficial user equipment from the pre-supportive user set according to the link information.

For another example, if the beneficial user set has been selected for the beneficial user equipment in step 102, a terminal that meets a preset condition may be selected, from the beneficial user set according to the link information, as the beneficial user equipment that is supported by the supportive user equipment.

The link information of the physical link may include information, such as a transmission rate and/or channel quality.

105. Establish, based on a first-hop physical link between the beneficial user equipment and the supportive user equipment, a support link.

For example, transmission configuration may be specifically performed on the first-hop physical link between the beneficial user equipment and the supportive user equipment, so as to establish the support link.

The transmission configuration may include configuration that is performed on a tunnel, a route, and the like, where tunnel configuration is optional, and whether the tunnel configuration is performed may be specifically determined according to an actual application requirement. For example, if first-hop Internet Protocol tunnel encapsulation is mainly performed on a data packet by a network side such as the base station, tunnel configuration may not be performed, and if first-hop Internet Protocol tunnel encapsulation is performed on a data packet by a beneficial user equipment/supportive user equipment, tunnel configuration may be performed, which may be specifically as follows:

(1) First scenario: Tunnel and route configuration is performed.

In this scenario, configuration may be divided into two aspects: configuration on the beneficial user equipment and configuration on the supportive user equipment, which may be specifically as follows:

A. Configuration on the Beneficial User Equipment:

A link configuration request is sent to the beneficial user equipment. For ease of description, in the embodiment of the present invention, the link configuration request sent to the beneficial user equipment is referred to as a first link configuration request, where the first link configuration request may include IP tunnel information of a downlink (Down Link) of the beneficial user equipment, IP tunnel information of an uplink (Up Link) of the beneficial user equipment, and a routing rule of the beneficial user equipment.

A link configuration response that is returned by the beneficial user equipment after the beneficial user equipment performs transmission configuration on the first-hop physical link between the beneficial user equipment and the supportive user equipment according to the first link configuration request is received. For ease of description, in the embodiment of the present invention, the link configuration response returned by the beneficial user equipment is referred to as a first link configuration response.

The beneficial user equipment may perform transmission configuration on the support link according to the first link configuration request by using a plurality of methods, which, for example, may be specifically as follows:

a. Perform configuration on an IP tunnel parsing manner of the downlink according to the IP tunnel information of the downlink of the beneficial user equipment.

b. Perform configuration on an IP tunnel encapsulation manner of the uplink according to the IP tunnel information of the uplink of the beneficial user equipment.

c. Perform configuration on a route submitting manner of a WiFi direct link/access point for an upper-layer application according to the routing rule of the beneficial user equipment.

It should be noted that, if a plurality of supportive user equipments exists, the first link configuration request may simultaneously carry a plurality of sets of configuration information of the supportive user equipments, for example, carry information such as WiFi IP addresses of the plurality of supportive user equipments.

B. Configuration on the Supportive User Equipment:

A link configuration request is sent to the supportive user equipment. For ease of description, in the embodiment of the present invention, the link configuration request sent to the supportive user equipment is referred to as a second link configuration request, where the second link configuration request may include a routing rule of a downlink of the supportive user equipment, IP tunnel information of the downlink of the supportive user equipment, a routing rule of an uplink of the supportive user equipment, and IP tunnel information of the uplink of the supportive user equipment, and the like.

A link configuration response that is returned by the supportive user equipment after the supportive user equipment performs transmission configuration on the first-hop physical link between the beneficial user equipment and the supportive user equipment according to the second link configuration request is received. For ease of description, in the embodiment of the present invention, the link configuration response returned by the supportive user equipment is referred to as a second link configuration response.

The supportive user equipment may perform transmission configuration on the support link according to the second link configuration request by using a plurality of methods, which, for example, may be specifically as follows:

a. Perform configuration on a route forwarding manner of the downlink according to the routing rule of the downlink of the supportive user equipment.

b. Perform configuration on an IP tunnel encapsulation manner of the downlink according to the IP tunnel information of the downlink of the supportive user equipment.

c. Perform configuration on a route forwarding manner of the uplink according to the routing rule of the uplink of the supportive user equipment.

d. Perform configuration on an IP tunnel parsing manner of the uplink according to the IP tunnel information of the uplink of the supportive user equipment.

It should be noted that, if a plurality of supportive user equipments exists, these supportive user equipments may be configured one by one, or these supportive user equipments may be configured concurrently.

(2) Second scenario: Only route configuration is performed, and tunnel configuration is not performed.

In this scenario, configuration may be divided into two aspects: configuration on the beneficial user equipment and configuration on the supportive user equipment, which may be specifically as follows:

A. Configuration on the Beneficial User Equipment:

A link configuration request is sent to the beneficial user equipment. For ease of description, in the embodiment of the present invention, the link configuration request sent to the beneficial user equipment is referred to as a third link configuration request, where the third link configuration request may include a routing rule of the beneficial user equipment.

A link configuration response that is returned by the beneficial user equipment after the beneficial user equipment performs transmission configuration on the first-hop physical link between the beneficial user equipment and the supportive user equipment according to the third link configuration request is received. For ease of description, in the embodiment of the present invention, the link configuration response returned by the beneficial user equipment is referred to as a third link configuration response.

The beneficial user equipment may perform transmission configuration on the support link according to the first link configuration request by using a plurality of methods, which, for example, may be specifically as follows:

Perform configuration on a route submitting manner of a WiFi direct link/access point for an upper-layer application according to the routing rule of the beneficial user equipment.

It should be noted that, if a plurality of supportive user equipments exists, the first link configuration request may simultaneously carry a plurality of sets of configuration information of the supportive user equipments.

B. Configuration on the Supportive User Equipment:

A link configuration request is sent to the supportive user equipment. For ease of description, in the embodiment of the present invention, the link configuration request sent to the supportive user equipment is referred to as a fourth link configuration request, where the fourth link configuration request may include information, such as a routing rule of a downlink of the supportive user equipment, and a routing rule of an uplink of the supportive user equipment.

A link configuration response that is returned by the supportive user equipment after the supportive user equipment performs transmission configuration on the first-hop physical link between the beneficial user equipment and the supportive user equipment according to the fourth link configuration request is received. For ease of description, in the embodiment of the present invention, the link configuration response returned by the supportive user equipment is referred to as a fourth link configuration response.

The supportive user equipment may perform transmission configuration on the support link according to the second link configuration request by using a plurality of methods, which, for example, may be specifically as follows:

a. Perform configuration on a route forwarding manner of the downlink according to the routing rule of the downlink of the supportive user equipment.

b. Perform configuration on a route forwarding manner of the uplink according to the routing rule of the uplink of the supportive user equipment.

It should be noted that, if a plurality of supportive user equipments exists, these supportive user equipments may be configured one by one, or these supportive user equipments may be configured concurrently.

In addition, after the step of "establishing, based on a first-hop physical link between the beneficial user equipment and the supportive user equipment, a support link (namely, step 103)", a configured support link may be further used to transfer a data packet. IP tunnel encapsulation may be performed on the data packet (including an uplink data packet and a downlink data packet) by the beneficial user equipment or the supportive user equipment according to first-hop IP information of the support link; or IP tunnel encapsulation may also be performed on a downlink data packet by the base station according to first-hop IP information of the support link at the time of offloading, which is described herein.

It should be noted that, in the embodiment of the present invention, an IP tunnel is mainly used as an example for description. It should be understood that it is not limited to the IP tunnel and another tunneling technology may also be used, and an implementation method thereof is similar to that of the IP tunnel, which is not repeatedly described herein.

106. Separately receive link measurement information of the support link reported by the beneficial user equipment and/or the supportive user equipment.

The link measurement information of the support link (hereinafter referred to as link measurement information) is obtained by the beneficial user equipment and/or the supportive user equipment by separately performing measurement on the support link, where a manner of reporting the link measurement information may be periodic reporting, or may be event-based reporting, which, for example, may be specifically as follows:

separately receiving measurement rate information and/or received signal strength indicator information of a cooperative link periodically reported by the beneficial user equipment and/or the supportive user equipment; and/or separately receiving WiFi signal quality information that is reported by the beneficial user equipment and/or the supportive user equipment in an event-based manner.

A link measurement manner may be configured during initial measurement, or may be independently configured after initial measurement, that is, before the step of "separately receiving link measurement information of the support link reported by the beneficial user equipment and the supportive user equipment", the method for controlling a link in cooperative communication may further include:

performing independent configuration on a link measurement manner of the support link; or performing configuration on a link measurement manner when the initial measurement is performed on the first-hop physical link, so that the beneficial user equipment and the supportive user equipment perform measurement on the support link according to the link measurement manner.

107. Control the support link according to the link measurement information. For example, 107 may be specifically as follows:

(1) If the link measurement information indicates that a supportive user equipment exits from a user set, release a support link corresponding to the supportive user equipment that exits from the user set, where the releasing includes deleting a route, deleting a tunnel, disabling WiFi, and the like.

(2) If the link measurement information indicates that cooperative communication is complete, and all supportive user equipments have released corresponding support links, release a support link corresponding to the beneficial user equipment, where the releasing includes deleting a route, deleting a tunnel, disabling a WiFi direct link/access point, and the like.

It can be known from the foregoing that, in this embodiment, when it is confirmed that a beneficial user equipment and a pre-supportive user equipment have a capability of performing cooperative communication, a first-hop link setup request is separately sent to the beneficial user equipment and the pre-supportive user equipment, so that the beneficial user equipment and the pre-supportive user equipment establish first-hop physical links according to the first-hop link setup request; initial measurement information that is sent by the pre-supportive user equipment and/or the beneficial user equipment after the pre-supportive user equipment and/or the beneficial user equipment performs initial measurement on the first-hop physical link is separately received; when there is one beneficial user equipment and there is at least one pre-supportive user equipment, a supportive user equipment of the beneficial user equipment is selected from the pre-supportive user equipment according to the initial measurement information; or when there is at least one beneficial user equipment and there is one pre-supportive user equipment, the pre-supportive user equipment is used as a supportive user equipment, and a beneficial user equipment that is supported by the supportive user equipment is selected according to the initial measurement information; a support link is established based on a first-hop physical link between the beneficial user equipment and the supportive user equipment; link measurement information of the support link reported by the beneficial user equipment and the supportive user equipment after the beneficial user equipment and the supportive user equipment perform measurement on the support link is received; and the support link is controlled according to the link measurement information, thereby achieving an objective of performing control and management on a link in cooperative communication, and improving the transmission efficiency and communication quality of cooperative communication.

In addition, in a scenario in which a supportive user equipment is used as an access point, because one supportive user equipment can simultaneously support a plurality of beneficial user equipments, a utilization rate of a network resource can be further improved, and network capacity is greatly improved.

Embodiment 2

This embodiment is described from a perspective of a terminal, where the terminal may be used as a supportive user equipment, or may be used as a beneficial user equipment. The terminal may be specifically a device, such as a mobile phone, a tablet computer, or a personal computer (PC, Personal Computer), and when used as a supportive user equipment, may also be an existing device such as an E5 (Equipment 5, equipment), for example, a device such as a wireless access device (CPE, Customer Premise Equipment) for receiving WiFi, an E5, a portable broadband wireless access device (MIFI, mobile Wi-Fi hotspot), or a more powerful super E5 (Super E5).

A method for controlling a link in cooperative communication includes: receiving, by a terminal, a first-hop link setup request sent by a base station; establishing, by the terminal, a first-hop physical link according to the first-hop link setup request; establishing, by the terminal, a support link based on the first-hop physical link; performing, by the terminal, measurement on the support link to obtain link measurement information; and sending, by the terminal, the link measurement information to the base station, so that the base station controls the support link according to the link measurement information.

Figure 2:
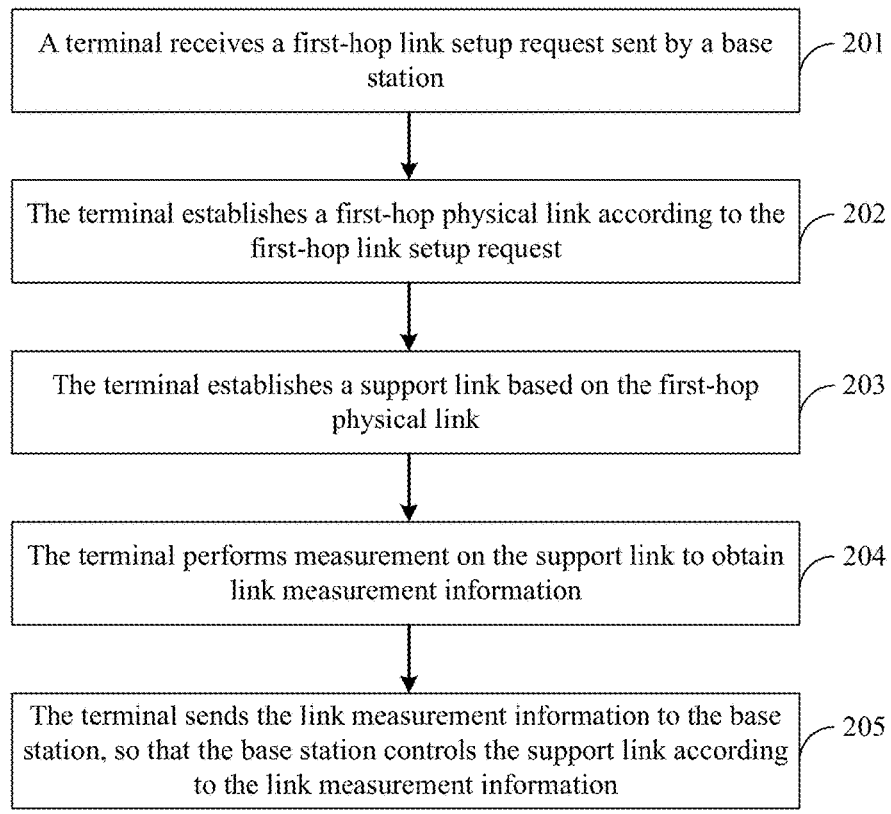
FIG. 2 is another flowchart of a method for controlling a link in cooperative communication according to an embodiment of the present invention.

As shown in FIG. 2, a specific process may be as follows:
201. A terminal receives a first-hop link setup request sent by a base station.

In cooperative communication, in addition to an originally established cellular link between a base station and a terminal, a direct link also needs to be established between terminals, for example, a direct link between a beneficial user equipment and a supportive user equipment, or a direct link between a beneficial user equipment and a pre-supportive user equipment, or the like. For ease of description, in the embodiment of the present invention, a direct link between terminals is referred to as a first hop. Therefore, the first-hop link setup request refers to a link setup request that is used to indicate "establishing a direct link between terminals".

The first-hop link setup request may be specifically in a plurality of message forms, for example, may be a query message. The first-hop link setup request may carry a different indication message according to a different role that the terminal plays, for example, in a scenario in which a beneficial user equipment is used as an access point, if the terminal is used as the beneficial user equipment, information instructing the beneficial user equipment "to enable a WiFi direct link/access point" may be carried in the first-hop link setup request, and if the terminal is used as a supportive user equipment, information instructing a pre-supportive user equipment "to access the WiFi direct link/access point enabled by the beneficial user equipment" may be carried in the first-hop link setup request; conversely, in a scenario in which a supportive user equipment is used as an access point, if the terminal is used as the supportive user equipment, information instructing a pre-supportive user equipment "to enable a WiFi direct link/access point" may be carried in the first-hop link setup request, and if the terminal is used as a beneficial user equipment, information instructing the beneficial user equipment "to access the WiFi direct link/access point enabled by the pre-supportive user equipment" may be carried in the first-hop link setup request; and so on. That is, according to a different specific scenario, the step that "a terminal receives a first-hop link setup request sent by a base station (namely, step 201)" may be specifically executed in any one of the following manners:

(1) In a scenario in which a beneficial user equipment is used as an access point:

A. If the terminal is used as the beneficial user equipment, the step that "a terminal receives a first-hop link setup request sent by a base station" may include:

receiving, by the beneficial user equipment, the first-hop link setup request sent by the base station, where the first-hop link setup request carries information instructing the beneficial user equipment to enable a WiFi direct link/access point, and the like.

B. If the terminal is used as a supportive user equipment, the step that "a terminal receives a first-hop link setup request sent by a base station" may include:

receiving, by the supportive user equipment, the first-hop link setup request sent by the base station, where the first-hop link setup request carries information about an enabled WiFi direct link/access point.

(2) In a scenario in which a supportive user equipment is used as an access point:

A. If the terminal is used as a supportive user equipment, the step that "a terminal receives a first-hop link setup request sent by a base station" may include:

receiving, by the supportive user equipment, a query message that is about a WiFi direct link/access point and sent by the base station; or receiving, by the supportive user equipment, the first-hop link setup request sent by the base station, where the first-hop link setup request carries information instructing the supportive user equipment to enable a WiFi direct link/access point, and the like.

B. If the terminal is used as a beneficial user equipment, the step that "a terminal receives a first-hop link setup request sent by a base station" may include:

receiving, by the beneficial user equipment, the first-hop link setup request sent by the base station, where the first-hop link setup request carries information, such as information about an enabled WiFi direct link/access point.

202. The terminal establishes a first-hop physical link according to the first-hop link setup request, which, for example, may be specifically as follows:

(1) In a scenario in which a beneficial user equipment is used as an access point:

A. If the terminal is used as the beneficial user equipment, the beneficial user equipment enables a WiFi direct link/access point according to the first-hop link setup request, and returns a first-hop link setup response to the base station, so as to establish the first-hop physical link.

The first-hop link setup response carries information, such as information about the enabled WiFi direct link/access point, and a cellular IP address and a WiFi IP address of the beneficial user equipment.

B. If the terminal is used as a supportive user equipment, the supportive user equipment accesses, according to the first-hop link setup request, a WiFi direct link/access point enabled by the beneficial user equipment, and returns a first-hop link setup response to the base station, so as to establish the first-hop physical link.

The first-hop link setup response carries information, such as a rate and a received signal strength indicator of the accessed WiFi direct link/access point.

(2) In a scenario in which a supportive user equipment is used as an access point:

A. If the terminal is used as the supportive user equipment, and if the supportive user equipment receives a query message about a WiFi direct link/access point, the supportive user equipment returns a query response to the base station, so as to establish the first-hop physical link, where the query response carries information, such as information about an enabled WiFi direct link/access point, and a cellular IP address and a WiFi IP address of a pre-supportive user equipment; or if the supportive user equipment receives a first-hop link setup request that carries information instructing the supportive user equipment to enable a WiFi direct link/access point, and the like, the supportive user equipment returns a first-hop link setup response to the base station, so as to establish the first-hop physical link, where the first-hop link setup response carries information, such as information about an enabled WiFi direct link/access point, and a cellular IP address and a WiFi IP address of a pre-supportive user equipment.

B. If the terminal is used as a beneficial user equipment, the beneficial user equipment accesses, according to the first-hop link setup request, a WiFi direct link/access point enabled by a pre-supportive user equipment, and returns a first-hop link setup response to the base station, so as to establish the first-hop physical link.

The first-hop link setup response returned by the beneficial user equipment carries information, such as a rate and a received signal strength indicator of the accessed WiFi direct link/access point.

203. The terminal establishes a support link based on the first-hop physical link.

For example, the terminal may specifically receive transmission configuration that is performed by the base station on the first-hop physical link, so as to establish the support link.

The transmission configuration may include configuration that is performed on a tunnel, a route, and the like, where tunnel configuration is optional, and whether the tunnel configuration is performed may be specifically determined according to an actual application requirement. For example, if first-hop Internet Protocol tunnel encapsulation is mainly performed on a data packet by a network side such as the base station, tunnel configuration may not be performed, and if first-hop Internet Protocol tunnel encapsulation is performed on a data packet by a beneficial user equipment/supportive user equipment, tunnel configuration may be performed, which may be specifically as follows:

(1) First scenario: Tunnel and route configuration is performed.

In this scenario, transmission configuration may differ according to a different role that the terminal plays, which may be specifically as follows:

A. Configuration on the Beneficial User Equipment:

The beneficial user equipment receives a first link configuration request sent by the base station, where the first link configuration request may include information, such as IP tunnel information of a downlink of the beneficial user equipment, IP tunnel information of an uplink of the beneficial user equipment, and a routing rule of the beneficial user equipment.

The beneficial user equipment returns a first link configuration response to the base station after performing transmission configuration on the first-hop physical link according to the first link configuration request, so as to establish the support link.

The beneficial user equipment may perform transmission configuration on the support link according to the first link configuration request by using a plurality of methods, which, for example, may be specifically as follows:

a. Perform configuration on an IP tunnel parsing manner of the downlink according to the IP tunnel information of the downlink of the beneficial user equipment.

b. Perform configuration on an IP tunnel encapsulation manner of the uplink according to the IP tunnel information of the uplink of the beneficial user equipment.

c. Perform configuration on a route submitting manner of a WiFi direct link/access point for an upper-layer application according to the routing rule of the beneficial user equipment.

It should be noted that, if a plurality of supportive user equipments exists, the first link configuration request may simultaneously carry a plurality of sets of configuration information of the supportive user equipments, for example, carry information such as WiFi IP addresses of the plurality of supportive user equipments.

B. Configuration on the Supportive User Equipment:

The supportive user equipment receives a second link configuration request sent by the base station, where the second link configuration request includes a routing rule of a downlink of the supportive user equipment, IP tunnel information of the downlink of the supportive user equipment, a routing rule of an uplink of the supportive user equipment, and IP tunnel information of the uplink of the supportive user equipment.

The supportive user equipment returns a second link configuration response to the base station after performing transmission configuration on the first-hop physical link according to the second link configuration request, so as to establish the support link.

The supportive user equipment may perform transmission configuration on the support link according to the second link configuration request by using a plurality of methods, which, for example, may be specifically as follows:

a. Perform configuration on a route forwarding manner of the downlink according to the routing rule of the downlink of the supportive user equipment.

b. Perform configuration on an IP tunnel encapsulation manner of the downlink according to the IP tunnel information of the downlink of the supportive user equipment.

c. Perform configuration on a route forwarding manner of the uplink according to the routing rule of the uplink of the supportive user equipment.

d. Perform configuration on an IP tunnel parsing manner of the uplink according to the IP tunnel information of the uplink of the supportive user equipment.

It should be noted that, if a plurality of supportive user equipments exists, these supportive user equipments may be configured one by one, or these supportive user equipments may be configured concurrently.

(2) Second scenario: Only route configuration is performed, and tunnel configuration is not performed.

A. Configuration on the Beneficial User Equipment:

The beneficial user equipment receives a third link configuration request sent by the base station, where the third link configuration request may include information, such as a routing rule of the beneficial user equipment.

The beneficial user equipment returns a third link configuration response to the base station after performing transmission configuration on the first-hop physical link according to the third link configuration request, so as to establish the support link.

The beneficial user equipment may perform transmission configuration on the support link according to the first link configuration request by using a plurality of methods, which, for example, may be specifically as follows:

Perform configuration on a route submitting manner of a WiFi direct link/access point for an upper-layer application according to the routing rule of the beneficial user equipment.

It should be noted that, if a plurality of supportive user equipments exists, the first link configuration request may simultaneously carry a plurality of sets of configuration information of the supportive user equipments.

B. Configuration on the Supportive User Equipment:

The supportive user equipment receives a fourth link configuration request sent by the base station, where the fourth link configuration request may include information, such as a routing rule of a downlink of the supportive user equipment, and a routing rule of an uplink of the supportive user equipment.

The supportive user equipment returns a fourth link configuration response to the base station after performing transmission configuration on the first-hop physical link according to the fourth link configuration request, so as to establish the support link.

The supportive user equipment may perform transmission configuration on the support link according to the second link configuration request by using a plurality of methods, which, for example, may be specifically as follows:

a. Perform configuration on a route forwarding manner of the downlink according to the routing rule of the downlink of the supportive user equipment.

b. Perform configuration on a route forwarding manner of the uplink according to the routing rule of the uplink of the supportive user equipment.

It should be noted that, if a plurality of supportive user equipments exists, these supportive user equipments may be configured one by one, or these supportive user equipments may be configured concurrently.

It should be noted that, in the foregoing transmission configuration, transmission configuration on the beneficial user equipment and the supportive user equipment may not be executed in particular order, unless a NAT manner is used during transmission configuration. In the NAT manner, transmission configuration on the beneficial user equipment needs to be first performed before transmission configuration on the supportive user equipment is performed.

In addition, after the step that "the terminal receives transmission configuration that is performed by the base station on the first-hop physical link, so as to establish the support link", a configured support link may be further used to transfer a data packet, which, for example, may be specifically as follows:

The terminal performs IP tunnel encapsulation on a data packet according to first-hop IP information of the support link, and uses the support to transfer the encapsulated data packet; or the terminal uses the support link to receive a data packet that is obtained by the base station by performing IP tunnel encapsulation according to first-hop IP information of the support link and delivered by the base station.

It should be noted that, before that, each terminal (including the supportive user equipment and the beneficial user equipment) needs to perform initial measurement on the first-hop physical link to obtain initial measurement information, and then report the initial measurement information to the base station. In this way, the base station may select the supportive user equipment of the beneficial user equipment from a pre-supportive user equipment according to the initial measurement information, that is, before step 203, the method further includes:

performing initial measurement on the first-hop physical link to obtain initial measurement information, and reporting the initial measurement information to the base station; where the initial measurement information is used, when the terminal includes one beneficial user equipment and at least one pre-supportive user equipment, by the base station to select the supportive user equipment of the beneficial user equipment from the pre-supportive user equipment according to the initial measurement information; or the initial measurement information is used, when the terminal includes at least one beneficial user equipment and one pre-supportive user equipment, by the base station to use the pre-supportive user equipment as a supportive user equipment, and select, according to the initial measurement information, a beneficial user equipment that needs to be supported by the supportive user equipment.

For selection of a supportive user equipment, reference may be specifically made to the description in Embodiment 1, and details are not repeatedly described herein.

It should be further noted that, in the embodiment of the present invention, an IP tunnel is mainly used as an example for description. It should be understood that it is not limited to the IP tunnel and another tunneling technology may also be used, and an implementation method thereof is similar to that of the IP tunnel, which is not repeatedly described herein.

204. The terminal performs measurement on the support link to obtain link measurement information.

A link measurement manner may be configured during initial measurement, or may be independently configured after initial measurement, that is, step 204 may be specifically as follows:

receiving independent configuration that is performed on a link measurement manner of the support link by the base station, or receiving configuration that is performed on a link measurement manner by the base station when the initial measurement is performed on the first-hop physical link, and performing measurement on the support link according to the link measurement manner, so as to obtain the link measurement information.

205. The terminal sends the link measurement information to the base station, so that the base station controls the support link according to the link measurement information.

A manner of reporting the link measurement information may be periodic reporting, or may be event-based reporting, which, for example, may be specifically as follows:

periodically reporting, by the terminal to the base station, information, such as measurement rate information and received signal strength indicator information of a cooperative link; and/or reporting, by the terminal, information, such as WiFi signal quality information, to the base station in an event-based manner.

It can be known from the foregoing that, in this embodiment, a terminal receives a first-hop link setup request sent by a base station; establishes a first-hop physical link according to the first-hop link setup request; establishes a support link based on the first-hop physical link; performs measurement on the support link to obtain link measurement information; and then sends the link measurement information to the base station, so that the base station controls the support link according to the link measurement information, thereby achieving an objective of performing control and management on a cooperative communication link, and improving the transmission efficiency and communication quality of cooperative communication.

In addition, in a scenario in which a supportive user equipment is used as an access point, the supportive user equipment usually uses some specific technologies (such as a directional antenna technology) to improve channel quality of the support link. Therefore, for a network algorithm, that a plurality of beneficial user equipments that can be supported by one supportive user equipment is selected for the supportive user equipment may also be considered, so as to improve a utilization rate of a network resource, and greatly improve a network capacity.

According to the methods described in Embodiment 1 and Embodiment 2, the following uses examples to further provide detailed description in Embodiment 3, Embodiment 4, Embodiment 5, and Embodiment 6.

Embodiment 3

In this embodiment, description is made by using an example in which the base station is specifically an evolved base station, a terminal A is a beneficial user equipment, and a terminal B and a terminal C are supportive user equipments.

Figure 3A:
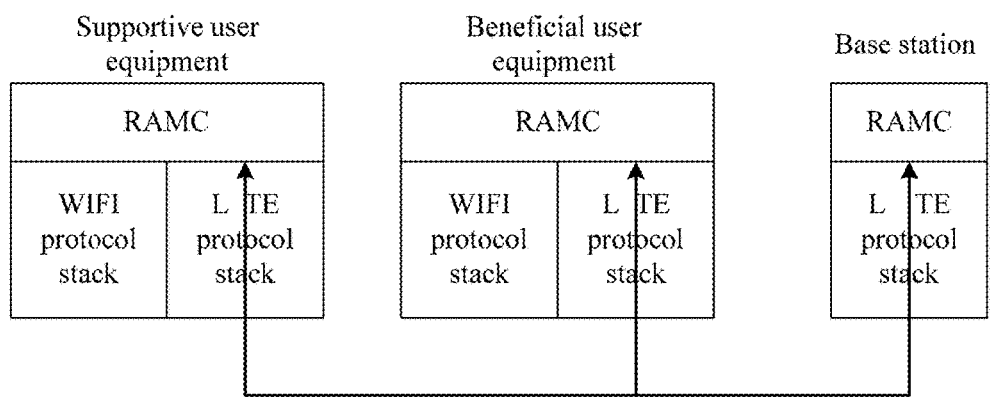
FIG. 3a is a schematic diagram of a cooperative communication protocol stack according to an embodiment of the present invention.

As shown in FIG. 3a, a protocol stack of the evolved base station includes an LTE protocol stack (Protocol Stack), and terminals (including the beneficial user equipment and the supportive user equipments) include an LIE protocol stack and a WiFi protocol stack. On a control plane, specifically, a terminal radio access mode control layer (RAMC, Radio Access Mode Control) may be established at an upper layer of a protocol stack of a cellular network, and separately deployed on the evolved base station and the terminals. For example, the RAMC may be specifically deployed at an operating system (OS, Operating System) layer, a communications protocol stack, or higher-layer application software of a terminal, and deployed in a main control module, an independent application control unit, an application server, or the like of the evolved base station; or, the RAMC may also be deployed in a protocol stack that is obtained after convergence of a mobile cellular technology and a wireless broadband technology, for example, at an RRC layer in the cellular network.

Information of the RAMC may be borne on a cellular network for transmission, and may be specifically transmitted by using a default bearer of a user, or may be transmitted by means of establishing a dedicated radio data transmission (DRB, Data Radio Bearer), or may be borne, as an application service, by a radio access network (RAN, Radio Access Network), or may be borne, for transmission, by means of adding a new signaling radio bearer (SRB, Signaling Radio Bearer) in a technology converged by a mobile cellular technology and a wireless broadband technology, and so on.

Main functions of the RAMC may be as follows:

(1) Implement control and management of a support link by using an LTE link, including establishing and releasing, based on WiFi, a support link for first-hop communication.

(2) Perform, based on WiFi, measurement configuration management and measurement reporting on first-hop communication.

(3) Perform route forwarding configuration management on a support link of a beneficial user equipment and a supportive user equipment Correspondingly, main functions of an evolved base station and a terminal may also be as follows:

1. Evolved Base Station (1) Confirm that a beneficial user equipment and a pre-supportive user equipment have a capability of performing cooperative communication, and separately send a first-hop link setup request to the beneficial user equipment and the pre-supportive user equipment, so that the beneficial user equipment and the pre-supportive user equipment establish first-hop physical links according to the first-hop link setup request.

(2) Separately receive initial measurement information reported by the pre-supportive user equipment and/or the beneficial user equipment, where the initial measurement information is sent by the pre-supportive user equipment and/or the beneficial user equipment after the pre-supportive user equipment and/or the beneficial user equipment performs initial measurement on the first-hop physical link.

(3) When there is one beneficial user equipment and there is at least one pre-supportive user equipment, select a supportive user equipment of the beneficial user equipment from the pre-supportive user equipment according to the initial measurement information; or when there is at least one beneficial user equipment and there is one pre-supportive user equipment, use the pre-supportive user equipment as a supportive user equipment, and select, according to the initial measurement information, a beneficial user equipment that is supported by the supportive user equipment.

(4) Establish, based on a first-hop physical link between the beneficial user equipment and the supportive user equipment, a support link.

(5) After receiving link measurement information of the support link reported by a terminal, control the support link according to the link measurement information.

(6) Initiate a release process of the support link after cooperative communication is complete.

2. Terminal (1) When receiving a first-hop link configuration request sent by an evolved base station, based on configuration information, enable a WiFi direct link/access point or access a specified WiFi direct link/access point, and return a first-hop link setup response to the evolved base station, so as to establish a first-hop physical link.

(2) Establish a support link based on the first-hop physical link.

(3) Perform link measurement on the support link according to a configured link measurement manner, and report link measurement information, for example, information such as first-hop link quality, to the base station, so that the base station controls the support link according to the link measurement information, where a beneficial user equipment can not only report link measurement information of the beneficial user equipment, but also report link measurement information of all supportive user equipments.

(4) Release a corresponding support link when the evolved base station initiates a release process of the support link.

Based on a structure of the foregoing protocol stack, the foregoing describes a control process thereof in detail.

Figure 3B:
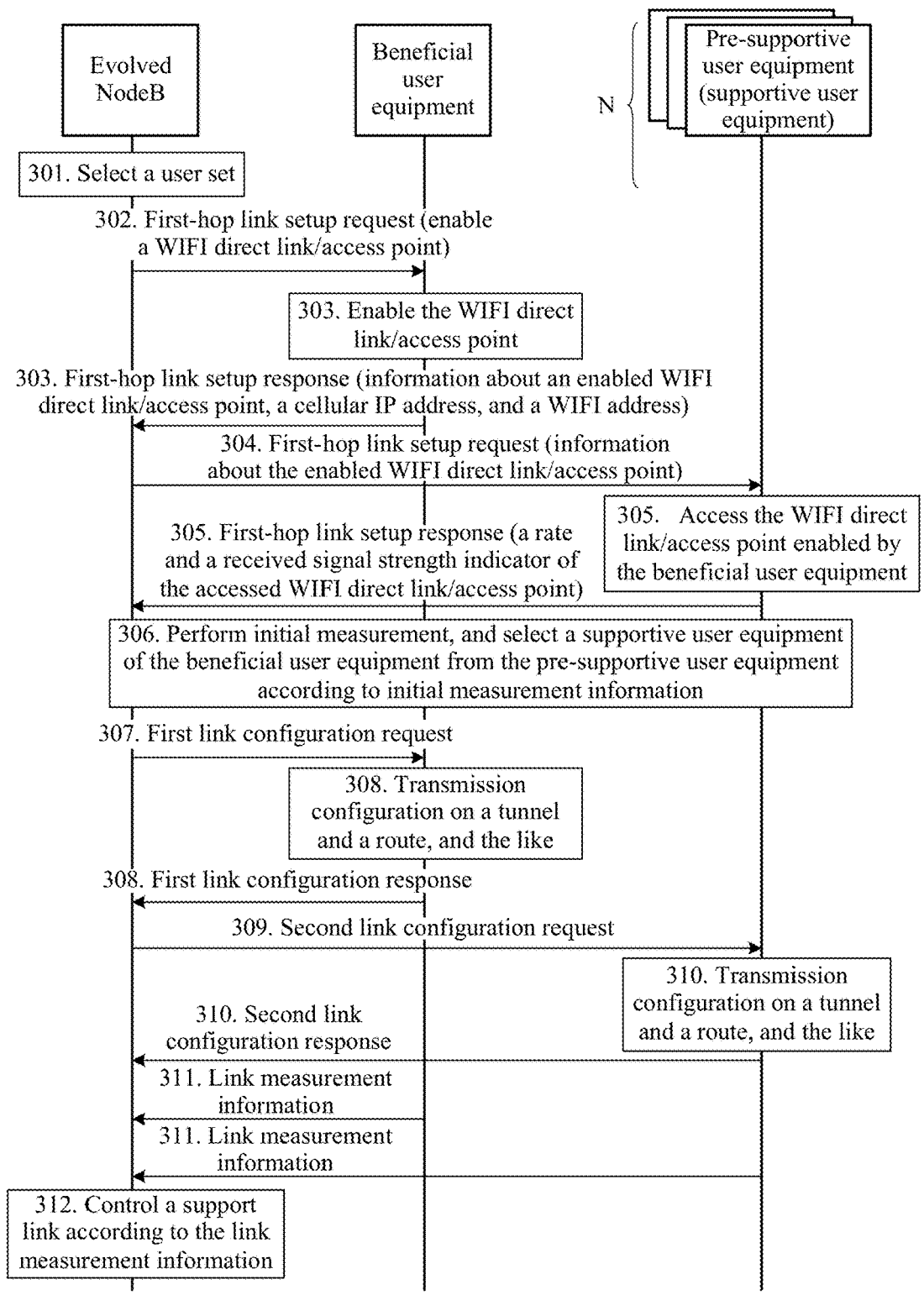
FIG. 3b is still another flowchart of a method for controlling a link in cooperative communication according to an embodiment of the present invention.

FIG. 3b shows a method for controlling a link in cooperative communication, and a specific process may be as follows:

301. An evolved base station selects a pre-supportive user set for a beneficial user equipment, where the pre-supportive user set includes at least one pre-supportive user equipment. For example, 301 may be specifically as follows:

obtaining air interface information of a mobile cellular network of each user, selecting, according to the air interface information of the mobile cellular network, terminals that meet a preset condition, and adding these terminals that meet the preset condition to the pre-supportive user set of the beneficial user equipment.

302. The evolved base station sends a first-hop link setup request to the beneficial user equipment when confirming that the pre-supportive user equipment and the beneficial user equipment have a capability of performing cooperative communication, where the first-hop link setup request carries information instructing the beneficial user equipment to enable a WiFi direct link/access point.

In addition, the first-hop link setup request may further carry information indicating a link measurement manner, so that the beneficial user equipment can perform measurement on a support link according to the link measurement manner subsequently.

303. The beneficial user equipment enables the WiFi direct link/access point according to the first-hop link setup request, and returns a first-hop link setup response to the evolved base station.

The first-hop link setup response carries information, such as information about the enabled WiFi direct link/access point, and a cellular IP address and a WiFi IP address of the beneficial user equipment, where the information about the WiFi direct link/access point may include information, such as an identifier and authentication key of the enabled WiFi.

304. The evolved base station sends a first-hop link setup request to the pre-supportive user equipment, where the first-hop link setup request carries the information about the enabled WiFi direct link/access point, and instructs the pre-supportive user equipment to access the WiFi direct link/access point enabled by the beneficial user equipment.

In addition, the first-hop link configuration request may further carry information indicating a link measurement manner, so that a supportive user equipment can perform measurement on a support link according to the link measurement manner subsequently.

305. The pre-supportive user equipment accesses, according to the first-hop link setup request, the WiFi direct link/access point enabled by the beneficial user equipment, and then the pre-supportive user equipment may further return a first-hop link setup response to the evolved base station.

The first-hop link setup response may carry information, such as a rate and a received signal strength indicator of the accessed WiFi direct link/access point.

In this case, establishment of a first-hop physical link is complete.

306. The evolved base station separately receives initial measurement information that is reported by the pre-supportive user equipment and/or the beneficial user equipment after the pre-supportive user equipment and/or the beneficial user equipment performs initial measurement on the first-hop physical link, and selects a supportive user equipment of the beneficial user equipment from the pre-supportive user equipment according to the initial measurement information.

For example, specifically, the pre-supportive user equipment and the beneficial user equipment may separately obtain link information of the first-hop physical link, such as information about a transmission rate and/or channel quality, and then separately report the link information to the evolved base station, and the evolved base station selects, from the pre-supportive user set according to the link information, a terminal meeting a preset condition as the supportive user equipment of the beneficial user equipment.

307. The evolved base station sends a first link configuration request (for example MUCC Link Setup Request) to the beneficial user equipment.

The first link configuration request may include information, such as IP tunnel information of a downlink of the beneficial user equipment, IP tunnel information of an uplink of the beneficial user equipment, and a routing rule of the beneficial user equipment.

308. The beneficial user equipment performs transmission configuration, such as tunnel and route configuration, on a support link according to the first link configuration request, and returns a first link configuration response (MUCC Link Setup Response) to the evolved base station.

The beneficial user equipment may perform transmission configuration on the support link according to the first link configuration request by using a plurality of methods, which, for example, may be specifically as follows:

a. Perform configuration on an IP tunnel parsing manner of the downlink according to the IP tunnel information of the downlink of the beneficial user equipment.

b. Perform configuration on an IP tunnel encapsulation manner of the uplink according to the IP tunnel information of the uplink of the beneficial user equipment.

c. Perform configuration on a route submitting manner of a WiFi direct link/access point for an upper-layer application according to the routing rule of the beneficial user equipment.

It should be noted that, if a plurality of supportive user equipments exists, the first link configuration request may simultaneously carry a plurality of sets of configuration information of the supportive user equipments, for example, carry information such as WiFi IP addresses of the plurality of supportive user equipments.

309. The evolved base station sends a second link configuration request to the supportive user equipment.

The second link configuration request may include information, such as a routing rule of a downlink of the supportive user equipment, IP tunnel information of the downlink of the supportive user equipment, a routing rule of an uplink of the supportive user equipment, and IP tunnel information of the uplink of the supportive user equipment.

310. The supportive user equipment performs transmission configuration on the support link according to the second link configuration request, and returns a second link configuration response to the evolved base station.

The supportive user equipment may perform transmission configuration on the support link according to the second link configuration request by using a plurality of methods, which, for example, may be specifically as follows:

a. Perform configuration on a route forwarding manner of the downlink according to the routing rule of the downlink of the supportive user equipment.

b. Perform configuration on an IP tunnel encapsulation manner of the downlink according to the IP tunnel information of the downlink of the supportive user equipment.

c. Perform configuration on a route forwarding manner of the uplink according to the routing rule of the uplink of the supportive user equipment.

d. Perform configuration on an IP tunnel parsing manner of the uplink according to the IP tunnel information of the uplink of the supportive user equipment.

It should be noted that, if a plurality of supportive user equipments exists, these supportive user equipments may be configured one by one, or these supportive user equipments may be configured concurrently.

So far, establishment of the support link is complete.

Figure 3C:
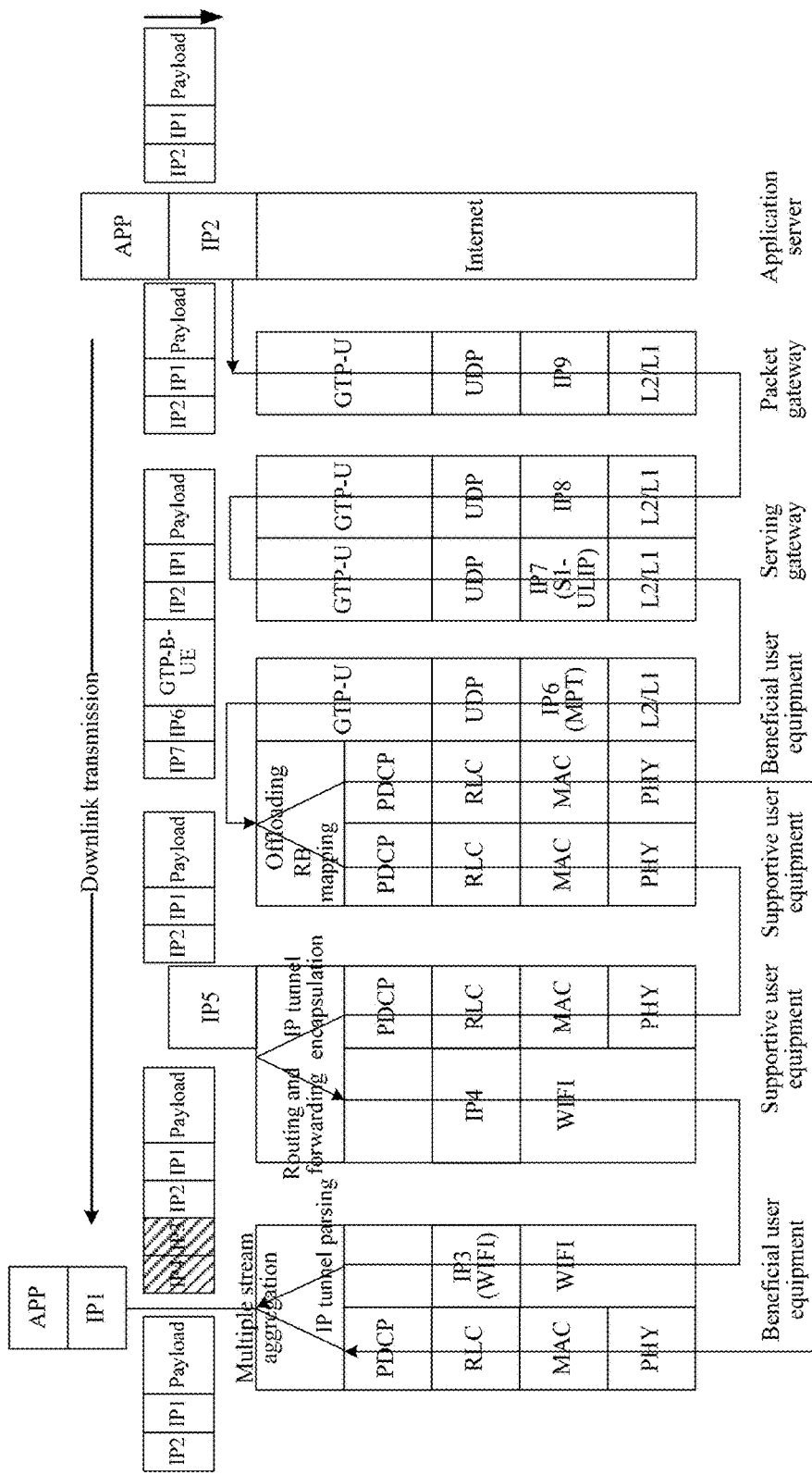
FIG. 3c is a schematic diagram of transmitting a data packet in a downlink.
Figure 3D:
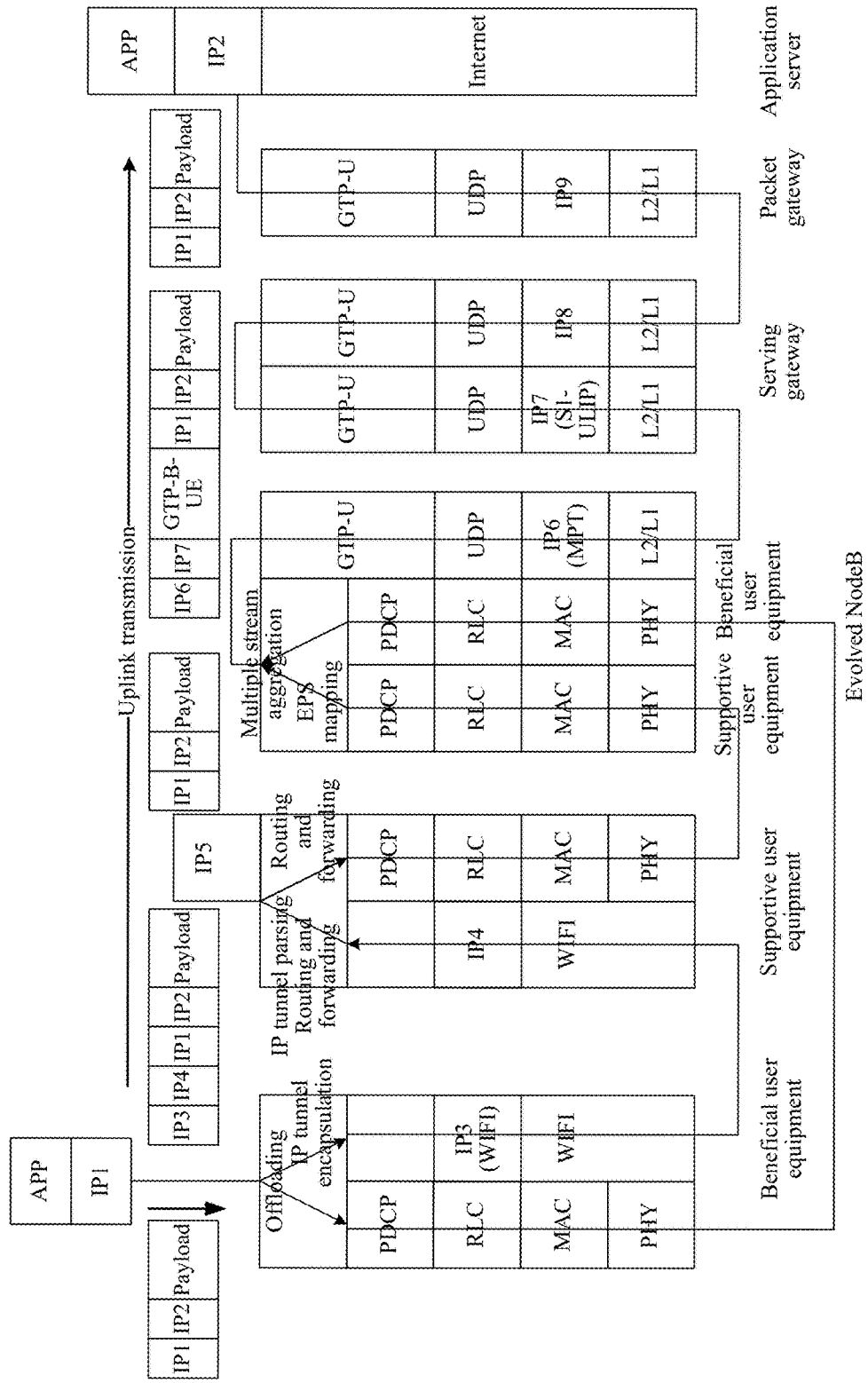
FIG. 3d is a schematic diagram of transmitting a data packet in an uplink.

Then, the support link may be used to transfer a data packet. IP tunnel encapsulation may be performed on the data packet (including an uplink data packet and a downlink data packet) by the beneficial user equipment or the supportive user equipment according to first-hop IP information of the support link. For example, as shown in FIG. 3c and FIG. 3d, FIG. 3c is a schematic diagram of transmitting a data packet in a downlink, FIG. 3d is a schematic diagram of transmitting a data packet in an uplink, and encapsulation of an IP3 and an IP4 is IP tunnel encapsulation.

It should be noted that, in the embodiment of the present invention, an IP tunnel is mainly used as an example for description. It should be understood that it is not limited to the IP tunnel and another tunneling technology may also be used, and an implementation method thereof is similar to that of the IP tunnel, which is not repeatedly described herein.

311. The beneficial user equipment and the supportive user equipment separately perform measurement on the support link to obtain link measurement information, and send the link measurement information to the evolved base station.

For example, if configuration on the link measurement manner has been performed in steps 302 to 305, the beneficial user equipment and the supportive user equipment may separately perform measurement on the support link according to the configured link measurement manner, to obtain the link measurement information, and send the link measurement information to the evolved base station, for example, send a link measurement information report (MUCC Link Measurement Report) to the evolved base station, where the link measurement information report may include measurement rate information and signal strength indicator information of the support link, and/or WiFi signal quality information, and the like.

A manner of reporting the link measurement information may be periodic reporting, or may be event-based reporting, which, for example, may be specifically as follows:

periodically reporting the measurement rate information and/or signal strength indicator information of the support link to the base station; and/or reporting the WiFi signal quality information to the base station in an event-based manner, for example, reporting the WiFi signal quality information if the WiFi is lower than a threshold, or reporting the WiFi signal quality information if neighboring WiFi is higher than a threshold, and so on.

312. The evolved base station controls the support link according to the link measurement information. For example, 312 may be specifically as follows:

(1) If the link measurement information indicates that a supportive user equipment exits from a user set, release a support link corresponding to the supportive user equipment that exits from the user set, where the releasing includes deleting a route, deleting a tunnel, disabling WiFi, and the like.

For example, the evolved base station may specifically send a first-hop link release request (MUCC Pairing Second Hop Release Request) to the supportive user equipment, so that the supportive user equipment deletes a corresponding route and tunnel and disables WiFi according to the first-hop link release request; and then the evolved base station may receive a first-hop link release response (MUCC Pairing Second Hop Release Response) returned by the supportive user equipment.

(2) If the link measurement information indicates that cooperative communication is complete, and all supportive user equipments have released corresponding support links, release a support link corresponding to the beneficial user equipment, where the releasing includes deleting a route, deleting a tunnel, disabling a WiFi direct link/access point, and the like.

For example, the evolved base station may specifically send a first-hop link release request to the beneficial user equipment, so that the beneficial user equipment deletes a corresponding route and tunnel and disables a WiFi direct link/access point according to the first-hop link release request; and then, the evolved base station may receive a first-hop link release response returned by the beneficial user equipment.

It should be noted that, if a sequence constraint relationship exists in a process of establishing first-hop links of the beneficial user equipment and the supportive user equipment by the evolved base station, this rule should also be followed when the links are released. For example, if the evolved base station enables the beneficial user equipment first when establishing a link, at the time of releasing, the evolved base station also needs to instruct the B-UE to disable a WiFi direct link/access point only after the supportive user equipment is allowed to exit, which is described herein.

It can be known from the foregoing that, in this embodiment, when it is confirmed that a beneficial user equipment and a supportive user equipment have a capability of performing cooperative communication, a first-hop link setup request is separately sent to the beneficial user equipment and a pre-supportive user equipment, so that the beneficial user equipment and the pre-supportive user equipment establish first-hop physical links according to the first-hop link setup request; then initial measurement information that is sent by the pre-supportive user equipment and/or the beneficial user equipment after the pre-supportive user equipment and/or the beneficial user equipment performs initial measurement on the first-hop physical link is separately received; and a supportive user equipment of the beneficial user equipment is selected from the pre-supportive user equipment according to the initial measurement information; and then, tunnel and route configuration is performed on a first-hop physical link between the beneficial user equipment and the supportive user equipment, so as to establish a support link; link measurement information of the support link reported by the beneficial user equipment and the supportive user equipment after the beneficial user equipment and the supportive user equipment perform measurement on the support link is received; and the support link is controlled according to the link measurement information, thereby achieving an objective of performing control and management on a link in cooperative communication, and improving the transmission efficiency and communication quality of cooperative communication.

Embodiment 4

Figure 4A:
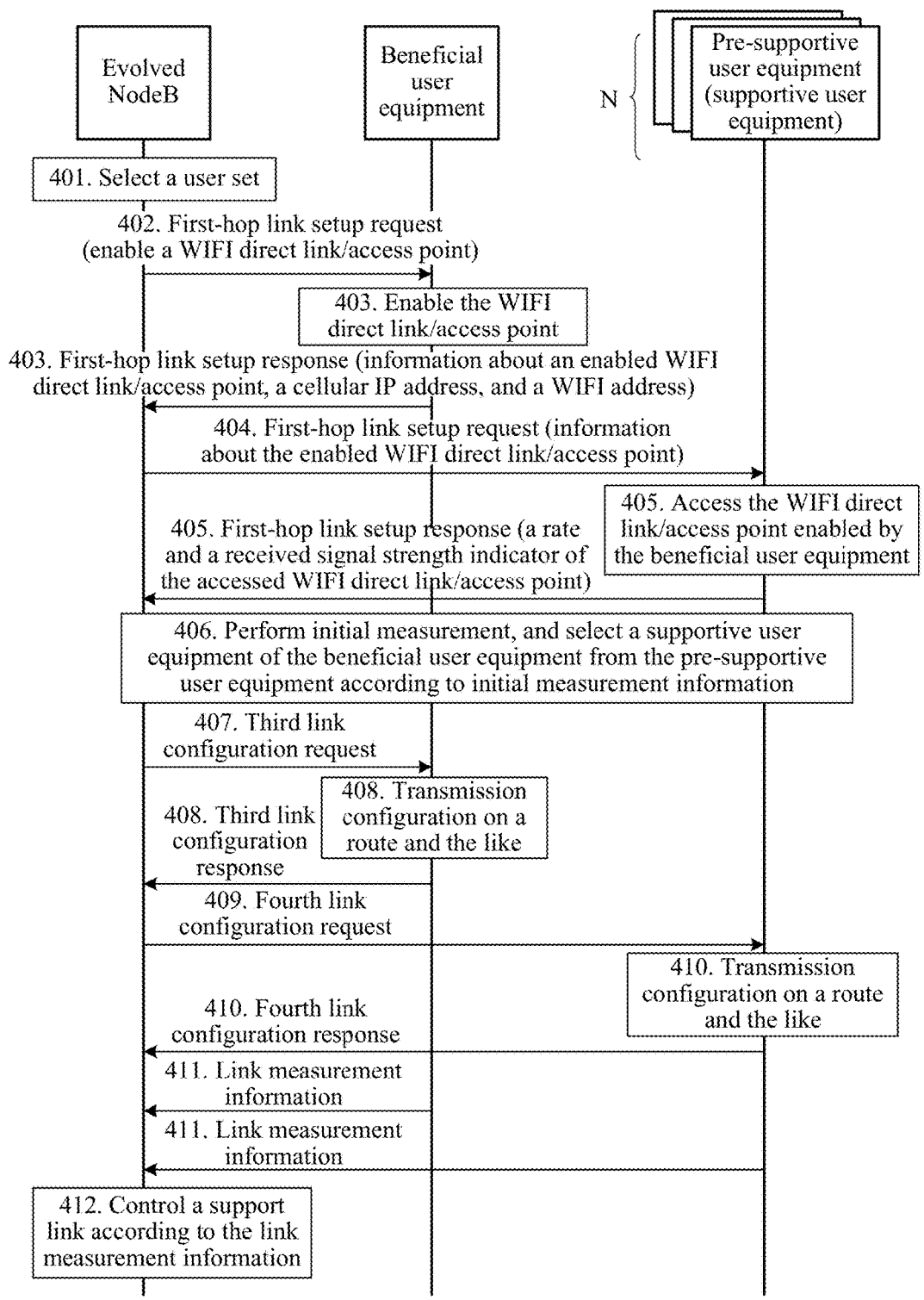
FIG. 4a is yet another flowchart of a method for controlling a link in cooperative communication according to an embodiment of the present invention.

Same as Embodiment 3, in this embodiment, a structure of a protocol stack shown in FIG. 3a is also used as an example for description. A difference from Embodiment 3 lies in that, in Embodiment 3, an evolved base station needs to perform configuration on a tunnel, a route, and the like when performing transmission configuration on a support link; however, in this embodiment, only configuration on a route needs to be performed, and no configuration on a tunnel is required. The following provides detailed description:

FIG. 4a shows a method for controlling a link in cooperative communication, and a specific process may be as follows:

401. An evolved base station selects a pre-supportive user set for a beneficial user equipment, where the pre-supportive user set includes at least one pre-supportive user equipment. For example, 401 may be specifically as follows:

obtaining air interface information of a mobile cellular network of each user, selecting, according to the air interface information of the mobile cellular network, terminals that meet a preset condition, and adding these terminals that meet the preset condition to the pre-supportive user set of the beneficial user equipment.

402. The evolved base station sends a first-hop link setup request to the beneficial user equipment when confirming that the pre-supportive user equipment and the beneficial user equipment have a capability of performing cooperative communication, where the first-hop link setup request carries information instructing the beneficial user equipment to enable a WiFi direct link/access point.

In addition, the first-hop link setup request may further carry information indicating a link measurement manner, so that the beneficial user equipment can perform measurement on a configured support link according to the link measurement manner subsequently.

403. The beneficial user equipment enables the WiFi direct link/access point according to the first-hop link setup request, and returns a first-hop link setup response to the evolved base station.

The first-hop link setup response carries information, such as information about the enabled WiFi direct link/access point, and a cellular IP address and a WiFi IP address of the beneficial user equipment, where the information about the WiFi direct link/access point may include information, such as an identifier and authentication key of the enabled WiFi.

404. The evolved base station sends a first-hop link setup request to the pre-supportive user equipment, where the first-hop link setup request carries the information about the enabled WiFi direct link/access point, and instructs the pre-supportive user equipment to access the WiFi direct link/access point enabled by the beneficial user equipment.

In addition, the first-hop link configuration request may further carry information indicating a link measurement manner, so that a supportive user equipment can perform measurement on a support link according to the link measurement manner subsequently.

405. The pre-supportive user equipment accesses, according to the first-hop link setup request, the WiFi direct link/access point enabled by the beneficial user equipment, and then the pre-supportive user equipment may further return a first-hop link setup response to the evolved base station.

The first-hop link setup response may carry information, such as a rate and a received signal strength indicator of the accessed WiFi direct link/access point.

In this case, establishment of a first-hop physical link is complete.

406. The evolved base station separately receives initial measurement information that is reported by the pre-supportive user equipment and/or the beneficial user equipment after the pre-supportive user equipment and/or the beneficial user equipment performs initial measurement on the first-hop physical link, and selects a supportive user equipment of the beneficial user equipment from the pre-supportive user equipment according to the initial measurement information.

For example, specifically, the pre-supportive user equipment and the beneficial user equipment may separately obtain link information of the first-hop physical link, such as information about a transmission rate and/or channel quality, and then separately report the link information to the evolved base station, and the evolved base station selects, from the pre-supportive user set according to the link information, a terminal meeting a preset condition as the supportive user equipment of the beneficial user equipment.

407. The evolved base station sends a third link configuration request to the beneficial user equipment.

The third link configuration request may include information, such as a routing rule of the beneficial user equipment.

408. The beneficial user equipment performs transmission configuration, such as route configuration, on a support link according to the third link configuration request, and returns a third link configuration response to the evolved base station.

The beneficial user equipment may perform transmission configuration on the support link according to the third link configuration request by using a plurality of methods, which, for example, may be specifically as follows:

Perform configuration on a route submitting manner of a WiFi direct link/access point for an upper-layer application according to the routing rule of the beneficial user equipment.

It should be noted that, if a plurality of supportive user equipments exists, the third link configuration request may simultaneously carry a plurality of sets of configuration information of the supportive user equipments.

409. The evolved base station sends a fourth link configuration request to the supportive user equipment.

The fourth link configuration request may include information, such as a routing rule of a downlink of the supportive user equipment, and a routing rule of an uplink of the supportive user equipment.

410. The supportive user equipment performs transmission configuration on the support link according to the fourth link configuration request, and returns a fourth link configuration response to the evolved base station.

The supportive user equipment may perform transmission configuration on the support link according to the fourth link configuration request by using a plurality of methods, which, for example, may be specifically as follows:

a. Perform configuration on a route forwarding manner of the downlink according to the routing rule of the downlink of the supportive user equipment.

b. Perform configuration on a route forwarding manner of the uplink according to the routing rule of the uplink of the supportive user equipment.

It should be noted that, if a plurality of supportive user equipments exists, these supportive user equipments may be configured one by one, or these supportive user equipments may be configured concurrently.

So far, establishment of the support link is complete.

Figure 4B:
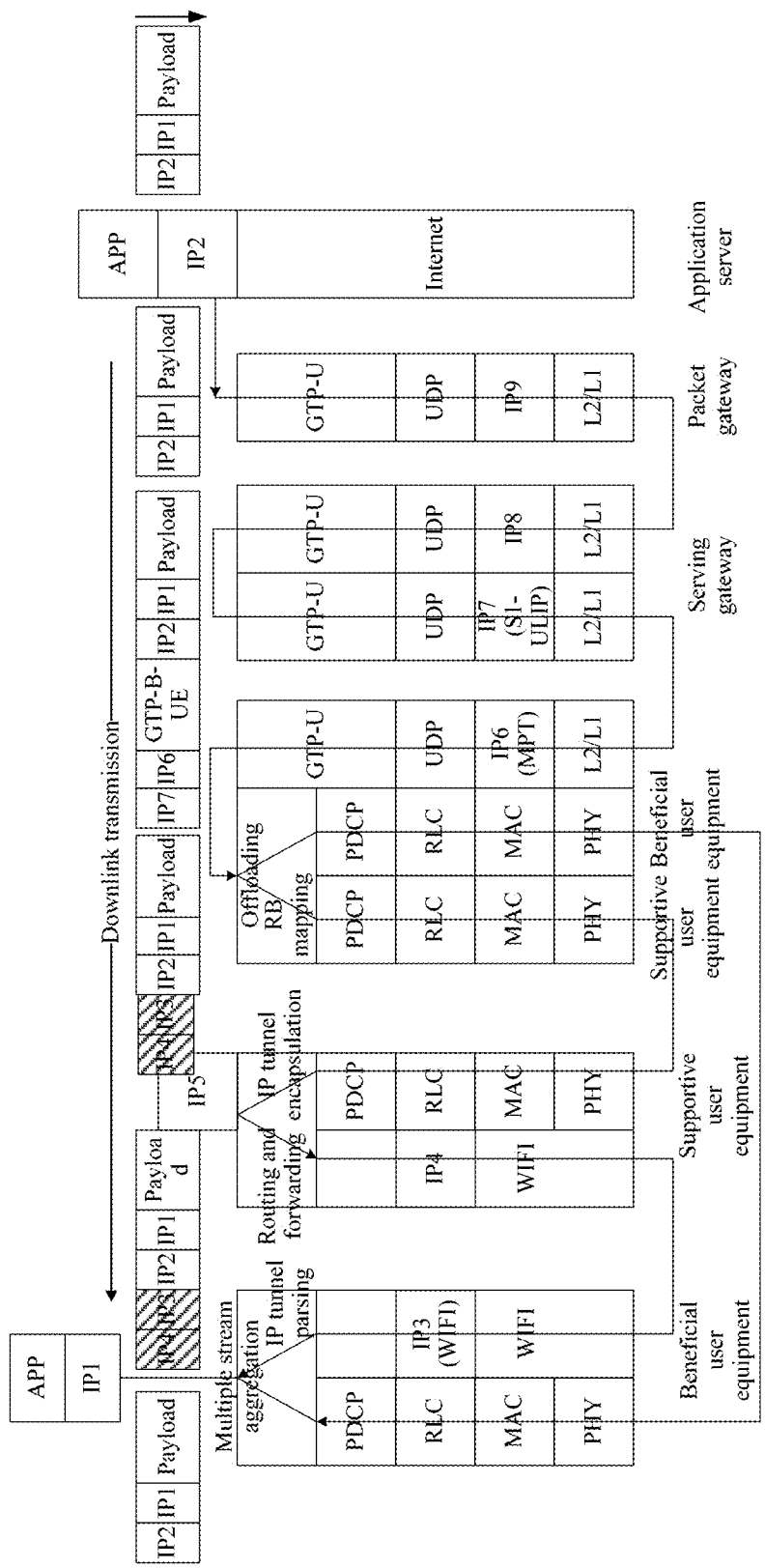
FIG. 4b is a schematic diagram of transmitting a data packet in a downlink.

Then, the support link may be used to transfer a data packet. Encapsulation of a tunnel of the downlink may be performed on an evolved base station side, which, for example, may be specifically as follows:

An RAMC of the evolved base station obtains first-hop IP information of the support link. At the time of offloading, IP tunnel encapsulation is performed on a downlink data packet according to the first-hop IP information of the support link. For example, as shown in FIG. 4b, FIG. 4b is a schematic diagram of transmitting a data packet in a downlink, and encapsulation of an IP3 and an IP4 is IP tunnel encapsulation. It can be seen that the IP tunnel encapsulation is performed in the evolved base station.

It should be noted that, in the embodiment of the present invention, an IP tunnel is mainly used as an example for description. It should be understood that it is not limited to the IP tunnel and another tunneling technology may also be used, and an implementation method thereof is similar to that of the IP tunnel, which is not repeatedly described herein.

411. The beneficial user equipment and the supportive user equipment separately perform measurement on the support link to obtain link measurement information, and send the link measurement information to the evolved base station.

For example, if configuration on the link measurement manner has been performed in steps 402 to 405, the beneficial user equipment and the supportive user equipment may separately perform measurement on the support link according to the configured link measurement manner, to obtain the link measurement information, and send the link measurement information to the evolved base station, for example, send a link measurement information report to the evolved base station, where the link measurement information report may include measurement rate information and signal strength indicator information of the support link, and/or WiFi signal quality information, and the like.

A manner of reporting the link measurement information may be periodic reporting, or may be event-based reporting, which, for example, may be specifically as follows:

periodically reporting the measurement rate information and/or signal strength indicator information of the support link to the base station; and/or reporting the WiFi signal quality information to the base station in an event-based manner, for example, reporting the WiFi signal quality information if the WiFi is lower than a threshold, or reporting the WiFi signal quality information if neighboring WiFi is higher than a threshold.

412. The evolved base station controls the support link according to the link measurement information. For example, 412 may be specifically as follows:

(1) If the link measurement information indicates that a supportive user equipment exits from a user set, release a support link corresponding to the supportive user equipment that exits from the user set, where the releasing includes deleting a route, deleting a tunnel, disabling WiFi, and the like.

For example, the evolved base station may specifically send a first-hop link release request to the supportive user equipment, so that the supportive user equipment deletes a corresponding route and tunnel and disables WiFi according to the first-hop link release request; and then, the evolved base station may receive a first-hop link release response returned by the supportive user equipment.

(2) If the link measurement information indicates that cooperative communication is complete, and all supportive user equipments have released corresponding support links, release a support link corresponding to the beneficial user equipment, where the releasing includes deleting a route, deleting a tunnel, disabling a WiFi direct link/access point, and the like.

For example, the evolved base station may specifically send a first-hop link release request to the beneficial user equipment, so that the beneficial user equipment deletes a corresponding route and tunnel and disables a WiFi direct link/access point according to the first-hop link release request; and then, the evolved base station may receive a first-hop link release response returned by the beneficial user equipment.

It should be noted that, if a sequence constraint relationship exists in a process of establishing first-hop links of the beneficial user equipment and the supportive user equipment by the evolved base station, this rule should also be followed when the links are released. For example, if the evolved base station enables the beneficial user equipment first when establishing a link, at the time of releasing, the evolved base station also needs to instruct the B-UE to disable a WiFi direct link/access point only after the supportive user equipment is allowed to exit, which is not repeatedly described herein.

It can be known from the foregoing that, in this embodiment, when it is confirmed that a pre-supportive user equipment and a beneficial user equipment have a capability of performing cooperative communication, a first-hop link setup request is separately sent to the beneficial user equipment and the pre-supportive user equipment, so that the beneficial user equipment and the pre-supportive user equipment establish first-hop physical links according to the first-hop link setup request; then initial measurement information that is reported by the pre-supportive user equipment and/or the beneficial user equipment after the pre-supportive user equipment and/or the beneficial user equipment performs initial measurement on the first-hop physical link is separately received; a supportive user equipment of the beneficial user equipment is selected from the pre-supportive user equipment according to the initial measurement information; route configuration is performed on a first-hop physical link between the beneficial user equipment and the supportive user equipment, so as to establish a support link; link measurement information of the support link reported by the beneficial user equipment and the supportive user equipment after the beneficial user equipment and the supportive user equipment perform measurement on the support link is received; and the support link is controlled according to the link measurement information, thereby achieving an objective of performing control and management on a link in cooperative communication, and improving the transmission efficiency and communication quality of cooperative communication.

Embodiment 5

Figure 5A:
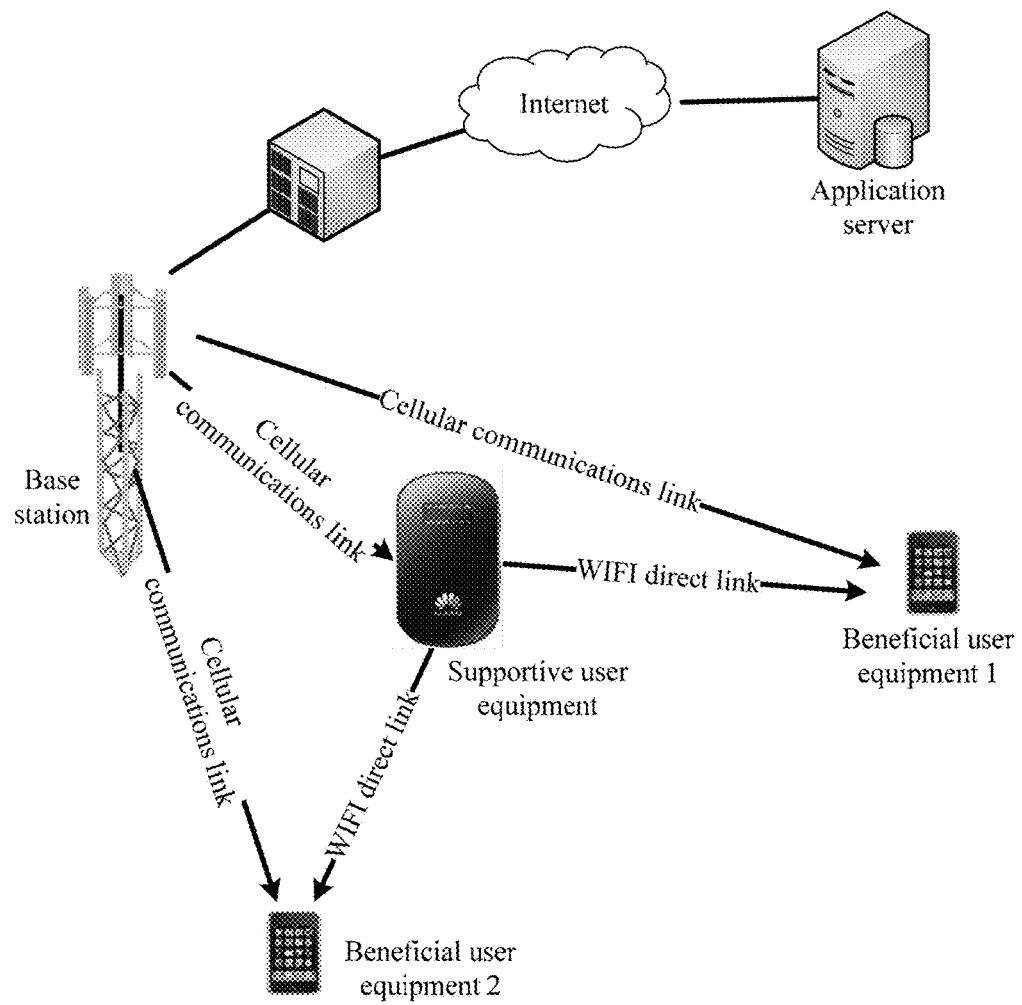
FIG. 5a is a schematic diagram of another scenario of cooperative communication according to an embodiment of the present invention.

Same as Embodiment 3 and Embodiment 4, in this embodiment, a structure of a protocol stack shown in FIG. 3a is also used as an example for description. A difference from Embodiment 3 and Embodiment 4 lies in that, in Embodiment 3 and Embodiment 4, description is mainly made by using an example in which a beneficial user equipment is used as an access point; however, in this embodiment, description is made by using an example in which a supportive user equipment is used as an access point, and a plurality of beneficial user equipments may be included. The supportive user equipment may be specifically a device, such as an E5. It should be noted that, because the device, such as an E5, is a wireless data card or a router, the device can support a translation function of network address translation (NAT, Network Address Translation). That is, in this embodiment, the supportive user equipment may be specifically an access point device using a NAT mechanism as a transmission configuration manner. For example, referring to FIG. 5a, in FIG. 5a, as a dedicated support device, a supportive user equipment may be an existing device, such as a CPE, an E5, a MIFI, or a more powerful super E5 (Super E5). In this scenario, one supportive user equipment may support a plurality of beneficial user equipments, for example, a plurality of handheld devices, such as mobile phones or tablet computers.

Figure 5B:
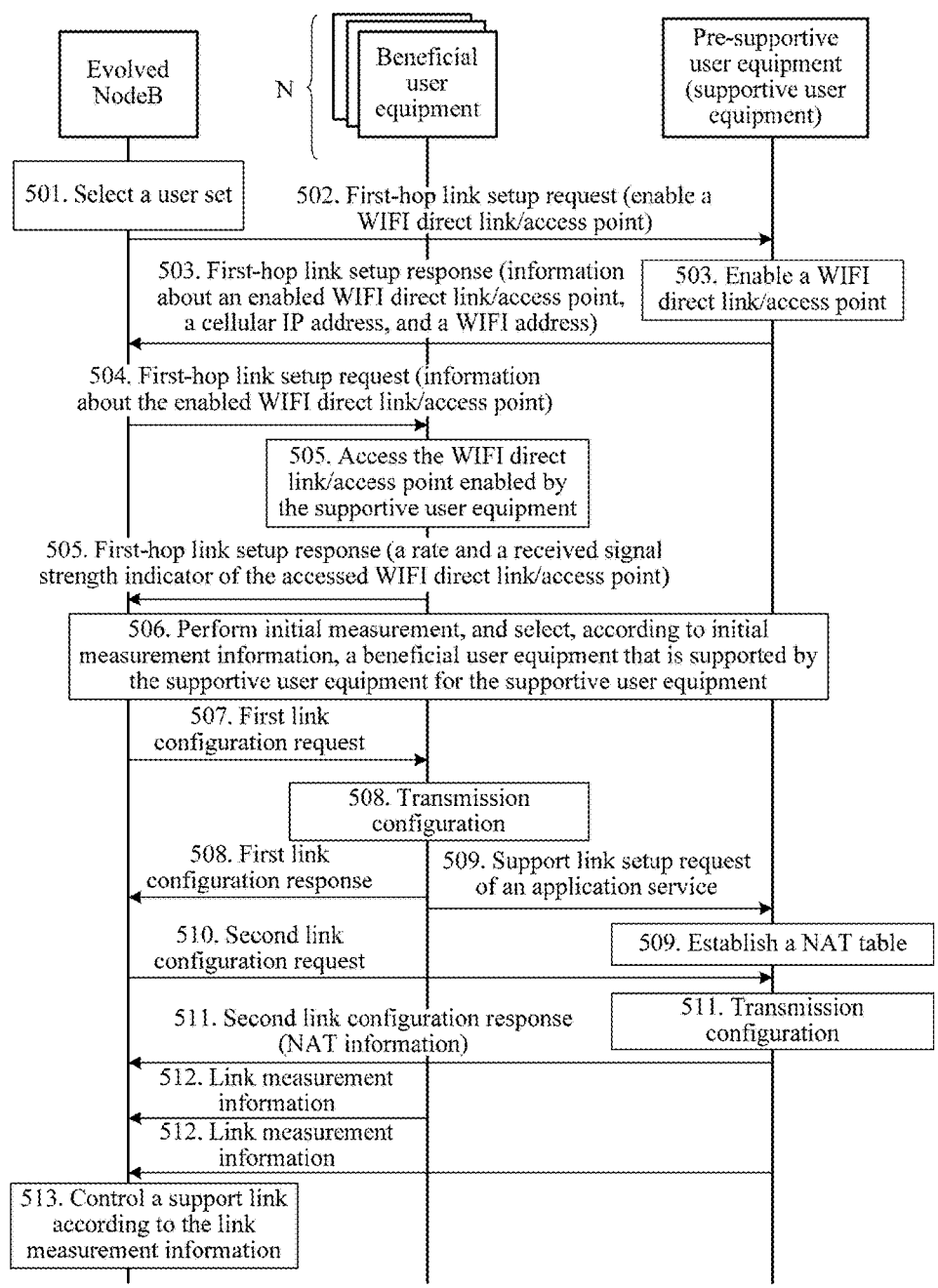
FIG. 5b is yet another flowchart of a method for controlling a link in cooperative communication according to an embodiment of the present invention.

FIG. 5b shows a method for controlling a link in cooperative communication, and a specific process may be as follows:

501. An evolved base station selects a beneficial user set for a pre-supportive user set. In this case, because there is only one pre-supportive user equipment, the pre-supportive user equipment is directly used as a supportive user equipment, where the beneficial user set includes at least one beneficial user equipment. For example, 501 may be specifically as follows:

obtaining air interface information of a mobile cellular network of each user, and selecting, according to the air interface information of the mobile cellular network, terminals that meet a preset condition, and adding these terminals that meet the preset condition to the beneficial user set of the supportive user equipment.

502. The evolved base station sends a first-hop link setup request to the supportive user equipment when confirming that the supportive user equipment and the beneficial user equipment have a capability of performing cooperative communication, where the first-hop link setup request carries information instructing the pre-supportive user equipment to enable a WiFi direct link/access point.

In addition, the first-hop link setup request may further carry information indicating a link measurement manner, so that the supportive user equipment can perform measurement on a support link according to the link measurement manner subsequently.

503. The supportive user equipment enables the WiFi direct link/access point according to the first-hop link setup request, and returns a first-hop link setup response to the evolved base station.

The first-hop link setup response carries information about the enabled WiFi direct link/access point and a cellular IP address of the pre-supportive user equipment. In addition, information, such as a WiFi IP address, may be further included, where the information about the WiFi direct link/access point may include information, such as an identifier and authentication key of the enabled WiFi.

504. The evolved base station sends a first-hop link setup request to the beneficial user equipment, where the first-hop link setup request carries the information about the enabled WiFi direct link/access point, and instructs the beneficial user equipment to access the WiFi direct link/access point enabled by the pre-supportive user equipment.

In addition, the first-hop link configuration request may further carry information indicating a link measurement manner, so that the beneficial user equipment can perform measurement on a support link according to the link measurement manner subsequently.

505. The beneficial user equipment accesses, according to the first-hop link setup request, the WiFi direct link/access point enabled by the pre-supportive user equipment, and then the beneficial user equipment may further return a first-hop link setup response to the evolved base station.

The first-hop link setup response may carry information, such as a rate and a received signal strength indicator of the accessed WiFi direct link/access point.

In this case, establishment of a first-hop physical link is complete.

506. The evolved base station separately receives initial measurement information that is reported by the supportive user equipment and/or the beneficial user equipment after the supportive user equipment and/or the beneficial user equipment performs initial measurement on the first-hop physical link, and selects, according to the initial measurement information, a beneficial user equipment that is supported by the supportive user equipment.

For example, specifically, the supportive user equipment and the beneficial user equipment may separately obtain link information of the first-hop physical link, such as information about a transmission rate and/or channel quality, and then separately report the link information to the evolved base station, and then the evolved base station selects, from the beneficial user set according to the link information, a terminal meeting a preset condition as a beneficial user equipment that is supported by the supportive user equipment.

507. The evolved base station sends a first link configuration request (MUCC Link Setup Request) to the beneficial user equipment.

The first link configuration request may include information, such as IP tunnel information of a downlink of the beneficial user equipment, IP tunnel information of an uplink of the beneficial user equipment, and a routing rule of the beneficial user equipment.

508. The beneficial user equipment performs transmission configuration, such as tunnel and route configuration, on a support link according to the first link configuration request, and returns a first link configuration response (MUCC Link Setup Response) to the evolved base station.

The beneficial user equipment may perform transmission configuration on the support link according to the first link configuration request by using a plurality of methods, which, for example, may be specifically as follows:

a. Perform configuration on an IP tunnel parsing manner of the downlink according to the IP tunnel information of the downlink of the beneficial user equipment.

b. Perform configuration on an IP tunnel encapsulation manner of the uplink according to the IP tunnel information of the uplink of the beneficial user equipment.

c. Perform configuration on a route forwarding manner according to the routing rule of the beneficial user equipment, including performing configuration on a route forwarding manner of the uplink according to a routing rule of the uplink of the beneficial user equipment, and performing configuration on a route forwarding manner of the downlink according to a routing rule of the downlink of the beneficial user equipment.

It should be noted that, if a plurality of beneficial user equipments exists, these beneficial user equipments may be configured one by one, or these beneficial user equipments may be configured concurrently.

509. The beneficial user equipment sends a support link request of an application service to the supportive user equipment, to trigger the supportive user equipment to establish a NAT translation table which is briefly referred to as a NAT table.

In this case, the supportive user equipment may send NAT information to the evolved base station, for example, send the NAT information to the evolved base station by using an independent massage; or, the supportive user equipment may also carry the NAT information to the evolved base station when returning a second link configuration response subsequently, where the NAT information includes information such as the NAT translation table.

In this way, when the evolved base station delivers a data packet subsequently, a destination IP and a port (port) of data of the beneficial user equipment can be replaced, according to the NAT translation table, with "an IP that is in the NAT translation table and generated for the beneficial user equipment by translation via NAT of the supportive user equipment", so as to achieve an objective of sending the data packet to the beneficial user equipment by using the supportive user equipment. That is, after the data packet reaches the supportive user equipment, NAT translation is performed on the data packet, and then a data packet obtained by translation is sent to the beneficial user equipment.

It should be noted that, step 509 may be executed in any period of time between step 507 and step 510. In this embodiment, that step 509 is executed after step 508 is merely used as an example for description, to which it is not limited as it should be understood.

510. The evolved base station sends a second link configuration request to the supportive user equipment.

The second link configuration request may include information, such as a routing rule of a downlink of the supportive user equipment, IP tunnel information of the downlink of the supportive user equipment, a routing rule of an uplink of the supportive user equipment, and IP tunnel information of the uplink of the supportive user equipment.

511. The supportive user equipment performs transmission configuration on the support link according to the second link configuration request, and returns a second link configuration response to the evolved base station.

If before that, the supportive user equipment does not report the NAT information to the base station, the supportive user equipment may add the NAT information, for example, information of the NAT translation table, to the second link configuration response.

The supportive user equipment may perform transmission configuration on the support link according to the second link configuration request by using a plurality of methods, which, for example, may be specifically as follows:

a. Perform configuration on a route submitting manner of a WiFi direct link/access point for an upper-layer application according to the routing rule of the supportive user equipment.

b. Perform configuration on an IP tunnel encapsulation manner of the downlink according to the IP tunnel information of the downlink of the supportive user equipment.

c. Perform configuration on an IP tunnel parsing manner of the uplink according to the IP tunnel information of the uplink of the supportive user equipment.

It should be noted that, if a plurality of beneficial user equipments exists, the second link configuration request may simultaneously carry a plurality of sets of configuration information.

So far, establishment of the support link is complete.

Then, the support link may be used to transfer a data packet. IP tunnel encapsulation may be performed on the data packet (including an uplink data packet and a downlink data packet) by the beneficial user equipment or the supportive user equipment according to first-hop IP information of the support link. For example, as shown in FIG. 3c and FIG. 3d, FIG. 3c is a schematic diagram of transmitting a data packet in a downlink, FIG. 3d is a schematic diagram of transmitting a data packet in an uplink, and encapsulation of an IP3 and an IP4 is IP tunnel encapsulation.

It should be noted that, in the embodiment of the present invention, an IP tunnel is mainly used as an example for description. It should be understood that it is not limited to the IP tunnel and another tunneling technology may also be used, and an implementation method thereof is similar to that of the IP tunnel, which is not repeatedly described herein.

It should be further noted that, in addition to the example in this embodiment in which tunnel encapsulation is performed on a data packet by the beneficial user equipment and the supportive user equipment, IP tunnel encapsulation may also be performed on the data packet by the evolved base station according to the first-hop IP information of the support link at the time of offloading. If the evolved base station performs tunnel encapsulation on the data packet, only route configuration needs to be performed, and no tunnel configuration of the supportive user equipment and the beneficial user equipment is required. For a manner of route configuration, reference may be made to the foregoing embodiments, and details are not repeatedly described herein.

512. The beneficial user equipment and the supportive user equipment separately perform measurement on the support link to obtain link measurement information, and send the link measurement information to the evolved base station.

For example, if configuration on the link measurement manner has been performed in steps 502 to 505, the beneficial user equipment and the supportive user equipment may separately perform measurement on the support link according to the configured link measurement manner, to obtain the link measurement information, and send the link measurement information to the evolved base station, for example, send a link measurement information report to the evolved base station, where the link measurement information report may include measurement rate information and signal strength indicator information of the support link, and/or WiFi signal quality information, and the like.

A manner of reporting the link measurement information may be periodic reporting, or may be event-based reporting, which, for example, may be specifically as follows:

periodically reporting the measurement rate information and/or signal strength indicator information of the support link to the base station; and/or reporting the WiFi signal quality information to the base station in an event-based manner, for example, reporting the WiFi signal quality information if the WiFi is lower than a threshold, or reporting the WiFi signal quality information if neighboring WiFi is higher than a threshold.

513. The evolved base station controls the support link according to the link measurement information. For example, 513 may be specifically as follows:

(1) If the link measurement information indicates that a supportive user equipment exits from a user set, release a support link corresponding to the supportive user equipment that exits from the user set, where the releasing includes deleting a route, deleting a tunnel, disabling WiFi, and the like.

For example, the evolved base station may specifically send a first-hop link release request to the supportive user equipment, so that the supportive user equipment deletes a corresponding route and tunnel and disables WiFi according to the first-hop link release request; and then, the evolved base station may receive a first-hop link release response returned by the supportive user equipment.

(2) If the link measurement information indicates that cooperative communication is complete, and all supportive user equipments have released corresponding support links, release a support link corresponding to the beneficial user equipment, where the releasing includes deleting a route, deleting a tunnel, disabling a WiFi direct link/access point, and the like.

For example, the evolved base station may specifically send a first-hop link release request to the beneficial user equipment, so that the beneficial user equipment deletes a corresponding route and tunnel and disables a WiFi direct link/access point according to the first-hop link release request; and then, the evolved base station may receive a first-hop link release response returned by the beneficial user equipment.

It should be noted that, if a sequence constraint relationship exists in a process of establishing first-hop links of the beneficial user equipment and the supportive user equipment by the evolved base station, this rule should also be followed when the links are released. For example, if the evolved base station enables the beneficial user equipment first when establishing a link, at the time of releasing, the evolved base station also needs to instruct the B-UE to disable a WiFi direct link/access point only after the supportive user equipment is allowed to exit, which is not repeatedly described herein.

It can be known from the foregoing that, in this embodiment, when it is confirmed that a beneficial user equipment and a supportive user equipment have a capability of performing cooperative communication, a first-hop link setup request is separately sent to the beneficial user equipment and a pre-supportive user equipment, so that the beneficial user equipment and the pre-supportive user equipment establish first-hop physical links according to the first-hop link setup request; then initial measurement information that is returned by the pre-supportive user equipment and/or the beneficial user equipment after the pre-supportive user equipment and/or the beneficial user equipment performs initial measurement on the first-hop physical link is separately received; a beneficial user equipment that is supported by the supportive user equipment is selected for the supportive user equipment according to the initial measurement information; then, tunnel and route configuration is performed on a first-hop physical link between the beneficial user equipment and the supportive user equipment, so as to establish a support link; link measurement information of the support link reported by the beneficial user equipment and the supportive user equipment after the beneficial user equipment and the supportive user equipment perform measurement on the support link is received; and the support link is controlled according to the link measurement information, thereby achieving an objective of performing control and management on a link in cooperative communication, and improving the transmission efficiency and communication quality of cooperative communication.

In addition, in a scenario in which a supportive user equipment is used as an access point, the supportive user equipment usually uses some specific technologies (such as a directional antenna technology) to improve channel quality of the support link. Therefore, for a network algorithm, that a plurality of beneficial user equipments that can be supported by one supportive user equipment is selected for the supportive user equipment may also be considered, so as to improve a utilization rate of a network resource, and greatly improve a network capacity.

Embodiment 6

Same as Embodiment 5, in this embodiment, similarly, description is made by using an example in which a supportive user equipment is used as an access point. A difference from Embodiment 5 lies in that, in Embodiment 5, information about a WiFi direct link/access point of the supportive user equipment is not enabled; however, in this embodiment, description is made by using an example in which information about the WiFi direct link/access point of the supportive user equipment is enabled.

Figure 6:
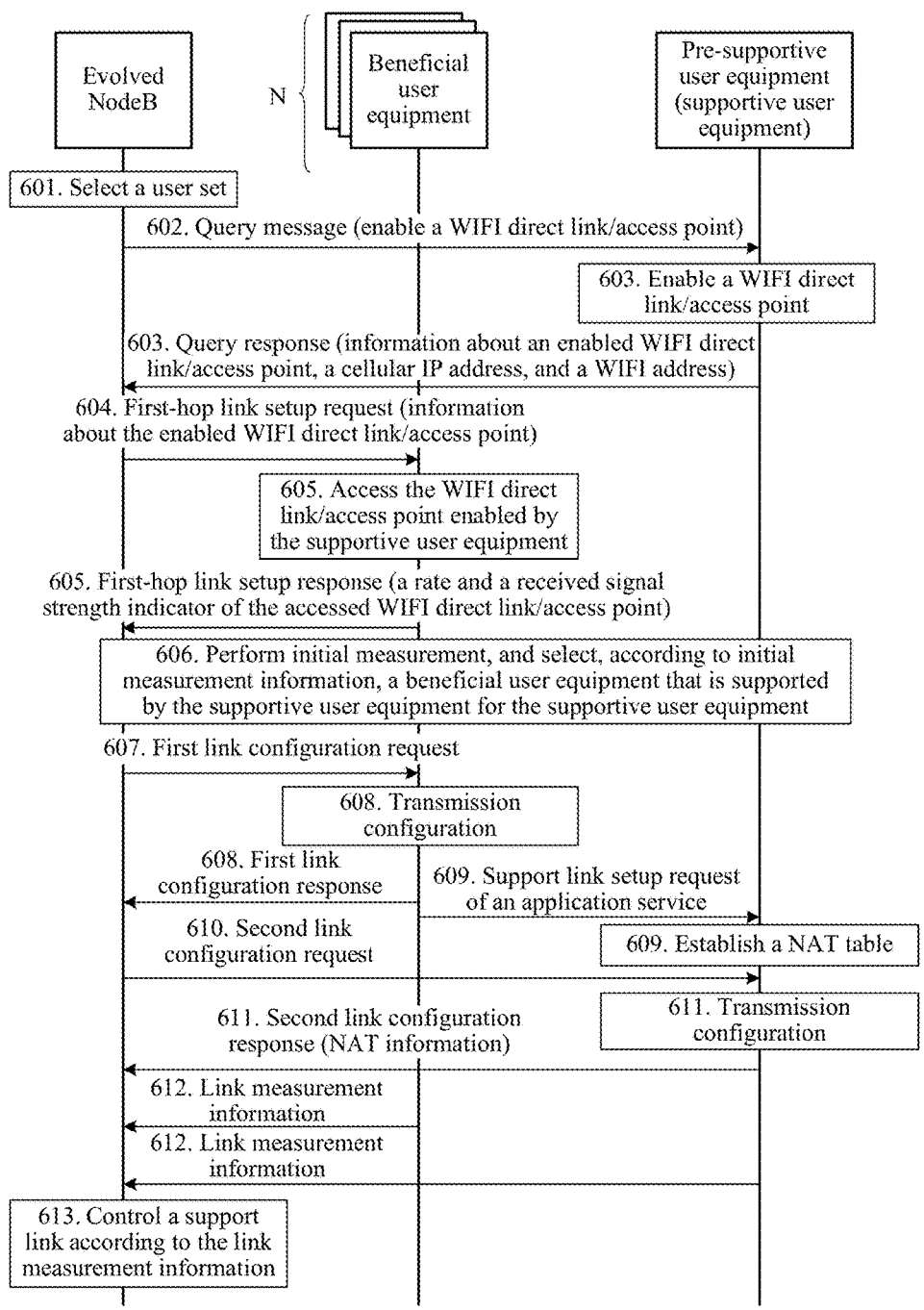
FIG. 6 is yet another flowchart of a method for controlling a link in cooperative communication according to an embodiment of the present invention.

Links between a base station and a supportive user equipment, between the base station and a beneficial user equipment 1, and between the base station and a beneficial user equipment 2 are referred to as cellular communication links. A link between the supportive user equipment and the beneficial user equipment 1, and a link between the supportive user equipment and the beneficial user equipment 2 are referred to as WiFi direct links. A link for reaching the beneficial user equipment 1 by using the supportive user equipment by the base station and a link for reaching the beneficial user equipment 2 by using the supportive user equipment by the base station are referred to as support links, that is, a support link may include a cellular communications link and a WiFi direct link. The following provides detailed description:

FIG. 6 shows a method for controlling a link in cooperative communication, and a specific process may be as follows:

601. An evolved base station selects a beneficial user set for a pre-supportive user set. In this case, because there is only one pre-supportive user equipment, the pre-supportive user equipment is directly used as a supportive user equipment, where the beneficial user set includes at least one beneficial user equipment. For example, 601 may be specifically as follows:

obtaining air interface information of a mobile cellular network of each user, and selecting, according to the air interface information of the mobile cellular network, terminals that meet a preset condition, and adding these terminals that meet the preset condition to the beneficial user set of the supportive user equipment.

602. The evolved base station sends a query message about a WiFi direct link/access point to the supportive user equipment when confirming that the supportive user equipment and the beneficial user equipment have a capability of performing cooperative communication.

In addition, the query message may further carry information indicating a link measurement manner, so that the pre-supportive user equipment can perform measurement on a support link according to the link measurement manner subsequently.

603. The pre-supportive user equipment returns a query response to the evolved base station according to the query message.

The query response carries information, such as information about an enabled WiFi direct link/access point, and a cellular IP address and a WiFi IP address of the pre-supportive user equipment, where the information about the WiFi direct link/access point may include information, such as an identifier and authentication key of the enabled WiFi.

604. The evolved base station sends a first-hop link setup request to the beneficial user equipment, where the first-hop link setup request carries the information about the enabled WiFi direct link/access point, and instructs the beneficial user equipment to access the WiFi direct link/access point enabled by the pre-supportive user equipment.

In addition, the first-hop link configuration request may further carry information indicating a link measurement manner, so that the beneficial user equipment can perform measurement on a support link according to the link measurement manner subsequently.

605. The beneficial user equipment accesses, according to the first-hop link setup request, the WiFi direct link/access point enabled by the pre-supportive user equipment, and then the beneficial user equipment may further return a first-hop link setup response to the evolved base station.

The first-hop link setup response may carry information, such as a rate and a received signal strength indicator of the accessed WiFi direct link/access point.

In this case, establishment of a first-hop physical link is complete.

606. The evolved base station separately receives initial measurement information that is returned by the pre-supportive user equipment and/or the beneficial user equipment after the pre-supportive user equipment and/or the beneficial user equipment performs initial measurement on the first-hop physical link, and selects, according to the initial measurement information, a beneficial user equipment for the pre-supportive user equipment.

For example, specifically, the pre-supportive user equipment and the beneficial user equipment may separately obtain link information of the first-hop physical link, such as information about a transmission rate and/or channel quality, and then the pre-supportive user equipment and the beneficial user equipment separately report the link information to the evolved base station, and then the evolved base station selects, from the beneficial user set according to the link information, a terminal meeting a preset condition as a beneficial user equipment that is supported by the supportive user equipment.

607. The evolved base station sends a first link configuration request (MUCC Link Setup Request) to the beneficial user equipment.

The first link configuration request may include information, such as IP tunnel information of a downlink of the beneficial user equipment, IP tunnel information of an uplink of the beneficial user equipment, and a routing rule of the beneficial user equipment.

608. The beneficial user equipment performs transmission configuration, such as tunnel and route configuration, on a support link according to the first link configuration request, and returns a first link configuration response (MUCC Link Setup Response) to the evolved base station.

The beneficial user equipment may perform transmission configuration on the support link according to the first link configuration request by using a plurality of methods, which, for example, may be specifically as follows:

a. Perform configuration on an IP tunnel parsing manner of the downlink according to the IP tunnel information of the downlink of the beneficial user equipment.

b. Perform configuration on an IP tunnel encapsulation manner of the uplink according to the IP tunnel information of the uplink of the beneficial user equipment.

c. Perform configuration on a route forwarding manner according to the routing rule of the beneficial user equipment, including performing configuration on a route forwarding manner of the uplink according to a routing rule of the uplink of the beneficial user equipment, and performing configuration on a route forwarding manner of the downlink according to a routing rule of the downlink of the beneficial user equipment.

It should be noted that, if a plurality of beneficial user equipments exists, these beneficial user equipments may be configured one by one, or these beneficial user equipments may be configured concurrently.

609. The beneficial user equipment sends a support link request of an application service to the supportive user equipment, to trigger the supportive user equipment to establish a NAT translation table which is briefly referred to as a NAT table.

In this case, the supportive user equipment may send NAT information to the evolved base station, for example, send the NAT information to the evolved base station by using an independent massage; or, the supportive user equipment may also carry the NAT information to the evolved base station when returning a second link configuration response subsequently, where the NAT information includes information such as the NAT translation table.

In this way, when the evolved base station delivers a data packet subsequently, a destination IP and a port of data of the beneficial user equipment can be replaced, according to the NAT translation table, with "an IP that is in the NAT translation table and generated for the beneficial user equipment by translation via NAT of the supportive user equipment", so as to achieve an objective of sending the data packet to the beneficial user equipment by using the supportive user equipment. That is, after the data packet reaches the supportive user equipment, NAT translation is performed on the data packet, and then a data packet obtained by translation is sent to the beneficial user equipment.

It should be noted that, step 609 may be executed in any period of time between step 607 and step 610. In this embodiment, that step 609 is executed after step 608 is merely used as an example for description, to which it is not limited as it should be understood.

610. The evolved base station sends a second link configuration request to the supportive user equipment.

The second link configuration request may include information, such as a routing rule of a downlink of the supportive user equipment, IP tunnel information of the downlink of the supportive user equipment, a routing rule of an uplink of the supportive user equipment, and IP tunnel information of the uplink of the supportive user equipment.

611. The supportive user equipment performs transmission configuration on the support link according to the second link configuration request, and returns a second link configuration response to the evolved base station.

If before that, the supportive user equipment does not report the NAT information to a base station, the supportive user equipment may add the NAT information, for example, information of the NAT translation table, to the second link configuration response.

The supportive user equipment may perform transmission configuration on the support link according to the second link configuration request by using a plurality of methods, which, for example, may be specifically as follows:

a. Perform configuration on a route submitting manner of a WiFi direct link/access point for an upper-layer application according to the routing rule of the supportive user equipment.

b. Perform configuration on an IP tunnel encapsulation manner of the downlink according to the IP tunnel information of the downlink of the supportive user equipment.

c. Perform IP tunnel configuration on an IP tunnel parsing manner of the uplink according to the IP tunnel information of the uplink of the supportive user equipment.

It should be noted that, if a plurality of beneficial user equipments exists, the second link configuration request may simultaneously carry a plurality of sets of configuration information.

So far, establishment of the support link is complete.

Then, the support link may be used to transfer a data packet. IP tunnel encapsulation may be performed on the data packet (including an uplink data packet and a downlink data packet) by the beneficial user equipment or the supportive user equipment according to first-hop IP information of the support link. For example, as shown in FIG. 3c and FIG. 3d, FIG. 3c is a schematic diagram of transmitting a data packet in a downlink, FIG. 3d is a schematic diagram of transmitting a data packet in an uplink, and encapsulation of an IP3 and an IP4 is IP tunnel encapsulation.

It should be noted that, in the embodiment of the present invention, an IP tunnel is mainly used as an example for description. It should be understood that it is not limited to the IP tunnel and another tunneling technology may also be used, and an implementation method thereof is similar to that of the IP tunnel, which is not repeatedly described herein.

It should be further noted that, in addition to the example in this embodiment in which tunnel encapsulation is performed on a data packet by the beneficial user equipment and the supportive user equipment, IP tunnel encapsulation may also be performed on the data packet by the evolved base station according to the first-hop IP information of the support link at the time of offloading. If the evolved base station performs tunnel encapsulation on the data packet, only route configuration needs to be performed, and no tunnel configuration of the supportive user equipment and the beneficial user equipment is required. For a manner of route configuration, reference may be made to the foregoing embodiments, and details are not repeatedly described herein.

612. The beneficial user equipment and the supportive user equipment separately perform measurement on the support link to obtain link measurement information, and send the link measurement information to the evolved base station.

For example, if configuration on the link measurement manner has been performed in steps 602 to 605, the beneficial user equipment and the supportive user equipment may separately perform measurement on the support link according to the configured link measurement manner, to obtain the link measurement information, and send the link measurement information to the evolved base station, for example, send a link measurement information report to the evolved base station, where the link measurement information report may include measurement rate information and signal strength indicator information of the support link, and/or WiFi signal quality information, and the like.

A manner of reporting the link measurement information may be periodic reporting, or may be event-based reporting, which, for example, may be specifically as follows:

periodically reporting the measurement rate information and/or signal strength indicator information of the support link to the base station; and/or reporting the WiFi signal quality information to the base station in an event-based manner, for example, reporting the WiFi signal quality information if the WiFi is lower than a threshold, or reporting the WiFi signal quality information if neighboring WiFi is higher than a threshold.

613. The evolved base station controls the support link according to the link measurement information. For example, 613 may be specifically as follows:

(1) If the link measurement information indicates that a supportive user equipment exits from a user set, release a support link corresponding to the supportive user equipment that exits from the user set, where the releasing includes deleting a route, deleting a tunnel, disabling WiFi, and the like.

For example, the evolved base station may specifically send a first-hop link release request to the supportive user equipment, so that the supportive user equipment deletes a corresponding route and tunnel and disables WiFi according to the first-hop link release request; and then, the evolved base station may receive a first-hop link release response returned by the supportive user equipment.

(2) If the link measurement information indicates that cooperative communication is complete, and all supportive user equipments have released corresponding support links, release a support link corresponding to the beneficial user equipment, where the releasing includes deleting a route, deleting a tunnel, disabling a WiFi direct link/access point, and the like.

For example, the evolved base station may specifically send a first-hop link release request to the beneficial user equipment, so that the beneficial user equipment deletes a corresponding route and tunnel and disables a WiFi direct link/access point according to the first-hop link release request; and then, the evolved base station may receive a first-hop link release response returned by the beneficial user equipment.

It should be noted that, if a sequence constraint relationship exists in a process of establishing first-hop links of the beneficial user equipment and the supportive user equipment by the evolved base station, this rule should also be followed when the links are released. For example, if the evolved base station enables the beneficial user equipment first when establishing a link, at the time of releasing, the evolved base station also needs to instruct the B-UE to disable a WiFi direct link/access point only after the supportive user equipment is allowed to exit, which is not repeatedly described herein.

It can be known from the foregoing that, in this embodiment, when it is confirmed that a beneficial user equipment and a supportive user equipment have a capability of performing cooperative communication, a first-hop link setup request is separately sent to the beneficial user equipment and a pre-supportive user equipment, so that the beneficial user equipment and the pre-supportive user equipment establish first-hop physical links according to the first-hop link setup request; then initial measurement information that is reported by the pre-supportive user equipment and/or the beneficial user equipment after the pre-supportive user equipment and/or the beneficial user equipment performs initial measurement on the first-hop physical link is separately received; and a beneficial user equipment that is supported by the pre-supportive user equipment is selected for the pre-supportive user equipment according to the initial measurement information; then, tunnel and route configuration is performed on a first-hop physical link between the beneficial user equipment and the supportive user equipment, so as to establish a support link; link measurement information of the support link reported by the beneficial user equipment and the supportive user equipment after the beneficial user equipment and the supportive user equipment perform measurement on the support link is received; and the support link is controlled according to the link measurement information, thereby achieving an objective of performing control and management on a link in cooperative communication, and improving the transmission efficiency and communication quality of cooperative communication.

In addition, in a scenario in which a supportive user equipment is used as an access point, the supportive user equipment usually uses some specific technologies (such as a directional antenna technology) to improve channel quality of the support link. Therefore, for a network algorithm, that a plurality of beneficial user equipments that can be supported by one supportive user equipment is selected for the supportive user equipment may also be considered, so as to improve a utilization rate of a network resource, and greatly improve a network capacity.

Embodiment 7

In Embodiment 3, Embodiment 4, Embodiment 5, and Embodiment 6, a link measurement manner of a support link is mainly performed during initial measurement. That is, a first-hop link configuration request carries information indicating the link measurement manner, so that a supportive user equipment and a beneficial user equipment can perform measurement on the support link according to the link measurement manner subsequently. In addition, the link measurement manner may also be separately configured, that is, before step 310, 410, 510 or 610, the method further includes:

performing, by the evolved base station, independent configuration on the link measurement manner of the support link.

In addition, when link measurement information that is measured is reported, in addition to that the beneficial user equipment and the supportive user equipment may separately report the link measurement information, the beneficial user equipment or the supportive user equipment may also perform measurement on another terminal, and report the link measurement information to the base station, which is described herein.

In this embodiment, in addition to the foregoing two points, implementation of other steps is the same as that in Embodiment 3, Embodiment 4, Embodiment 5, and Embodiment 6. For details, reference may be made to Embodiment 3, Embodiment 4, Embodiment 5, and Embodiment 6, and details are not repeatedly described herein.

This embodiment can implement a beneficial effect the same as Embodiment 3, Embodiment 4, Embodiment 5, and Embodiment 6.

Embodiment 8

Figure 7:
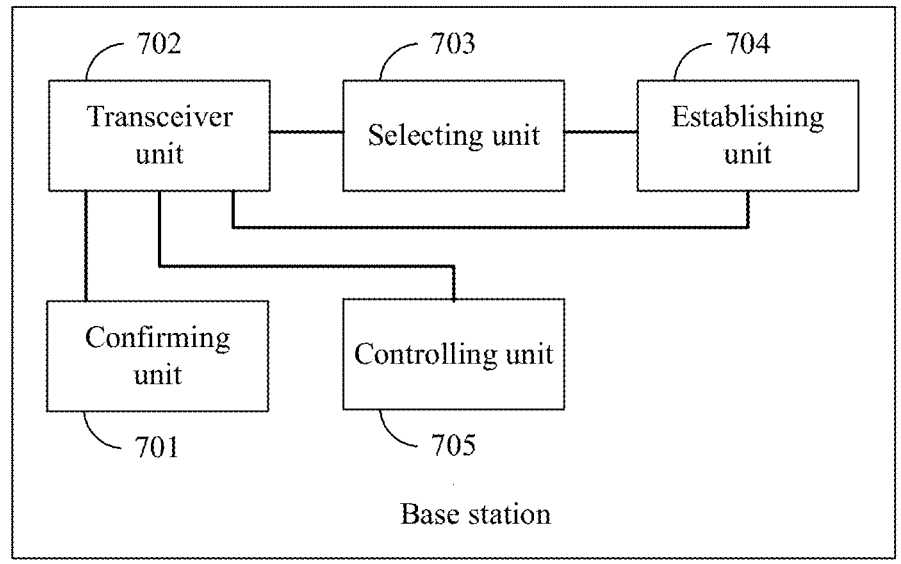
FIG. 7 is a schematic structural diagram of a base station according to an embodiment of the present invention.

To better implement the foregoing method, an embodiment of the present invention further provides a base station. As shown in FIG. 7, the base station includes a confirming unit 701, a transceiver unit 702, a selecting unit 703, an establishing unit 704, and a control unit 705.

The confirming unit 701 is configured to confirm that a beneficial user equipment and a pre-supportive user equipment have a capability of performing cooperative communication.

The capability of performing cooperative communication refers to whether the beneficial user equipment and the pre-supportive user equipment can perform cooperative communication. That is, the pre-supportive user equipment can assist the beneficial user equipment to perform communication.

Whether the beneficial user equipment and the pre-supportive user equipment have a cooperative communication capability may be determined according to neighbor relationship information. The neighbor relationship information may include that: one beneficial user equipment corresponds to a plurality of pre-supportive user equipments, or a plurality of beneficial user equipments corresponds to one pre-supportive user equipment.

The transceiver unit 702 is configured to: when the neighbor relationship information of the beneficial user equipment or the pre-supportive user equipment is obtained, or when it is sensed that the beneficial user equipment has a capability of performing cooperative communication, separately send a first-hop link setup request to the beneficial user equipment and the pre-supportive user equipment, so that the beneficial user equipment and the pre-supportive user equipment establish first-hop physical links according to the first-hop link setup request; and separately receive initial measurement information sent by the pre-supportive user equipment and/or the beneficial user equipment, where the initial measurement information is sent after initial measurement is performed on the first-hop physical link.

The selecting unit 703 is configured to: when there is one beneficial user equipment and there is at least one pre-supportive user equipment, select a supportive user equipment of the beneficial user equipment from the pre-supportive user equipment according to the initial measurement information that is received by the transceiver unit 702; or when there is at least one beneficial user equipment and there is one pre-supportive user equipment, use the pre-supportive user equipment as a supportive user equipment, and select, according to the initial measurement information, a beneficial user equipment that is supported by the supportive user equipment.

For example, the selecting unit 703 may be specifically configured to separately receive link information of the first-hop physical link reported by the pre-supportive user equipment and/or the beneficial user equipment, where the link information may include information, such as a transmission rate and/or channel quality; and select, from the pre-supportive user equipment according to the link information, a terminal meeting a preset condition as the supportive user equipment of the beneficial user equipment; or select, according to the link information, the beneficial user equipment that is supported by the supportive user equipment.

The establishing unit 704 is configured to establish, based on a first-hop physical link between the beneficial user equipment and the supportive user equipment, a support link.

The transceiver unit 702 is further configured to separately receive link measurement information of the support link established by the establishing unit 704, which is reported by the beneficial user equipment and/or the supportive user equipment, where the link measurement information is obtained by the beneficial user equipment and/or the supportive user equipment by performing measurement on the support link.

The control unit 705 is configured to control the support link according to the link measurement information that is received by the transceiver unit 702.

In cooperative communication, in addition to an originally established cellular link between a base station and a terminal, a direct link also needs to be established between terminals, for example, a direct link between a beneficial user equipment and a supportive user equipment, or a direct link between a beneficial user equipment and a pre-supportive user equipment, or the like. For ease of description, in the embodiment of the present invention, a direct link between terminals is referred to as a first hop. Therefore, the first-hop link setup request refers to a link setup request that is used to indicate "establishing a direct link between terminals".

The first-hop link setup request may be specifically in a plurality of message forms, and the first-hop link setup request may carry a different indication message according to a different target terminal, for example, if a beneficial user equipment needs to be used as an access point, information instructing the beneficial user equipment "to enable a WiFi direct link/access point" may be carried in a first-hop link setup request that is sent to the beneficial user equipment, and information instructing a pre-supportive user equipment "to access the WiFi direct link/access point enabled by the beneficial user equipment" is carried in a first-hop link setup request that is sent to the pre-supportive user equipment; conversely, if a supportive user equipment needs to be used as an access point, information instructing a pre-supportive user equipment "to enable a WiFi direct link/access point" may be carried in a first-hop link setup request that is sent to the pre-supportive user equipment, and information instructing a beneficial user equipment "to access the WiFi direct link/access point enabled by the pre-supportive user equipment" is carried in a first-hop link setup request that is sent to the beneficial user equipment. That is, according to a different application scenario, the transceiver unit 702 may be specifically in any one of the following manners:

(1) In a scenario in which a beneficial user equipment is used as an access point:

The transceiver unit 702 may be specifically configured to:

send a first-hop link setup request to the beneficial user equipment, so that the beneficial user equipment enables a WiFi direct link/access point according to the first-hop link setup request;

receive a first-hop link setup response returned by the beneficial user equipment, where the first-hop link setup response returned by the beneficial user equipment carries information about the enabled WiFi direct link/access point, and a cellular IP address and a WiFi IP address of the beneficial user equipment;

send, to the pre-supportive user equipment, a first-hop link setup request that carries the information about the enabled WiFi direct link/access point, so that the pre-supportive user equipment accesses, according to the first-hop link setup request, the WiFi direct link/access point enabled by the beneficial user equipment; and receive a first-hop link setup response returned by the pre-supportive user equipment, where the first-hop link setup response returned by the pre-supportive user equipment carries a rate and a received signal strength indicator of the accessed WiFi direct link/access point.

(2) In a scenario in which a supportive user equipment is used as an access point:

This scenario may be mainly classified into two cases: One case is that a WiFi direct link/access point is not enabled, and the other case is that a WiFi direct link/access point is enabled, which may be specifically as follows:

A. In the case in which a WiFi direct link/access point of a pre-supportive user equipment is not enabled:

The transceiver unit 702 may be specifically configured to:

send a first-hop link setup request to the pre-supportive user equipment, so that the pre-supportive user equipment enables a WiFi direct link/access point according to the first-hop link setup request;

receive a first-hop link setup response returned by the pre-supportive user equipment, where the first-hop link setup response returned by the pre-supportive user equipment carries information about the enabled WiFi direct link/access point, and a cellular IP address and a WiFi IP address of the pre-supportive user equipment;

send, to a beneficial user equipment, a first-hop link setup request that carries the information about the enabled WiFi direct link/access point, so that the beneficial user equipment accesses, according to the first-hop link setup request, the WiFi direct link/access point enabled by the pre-supportive user equipment; and;

receive a first-hop link setup response returned by the beneficial user equipment, where the first-hop link setup response returned by the beneficial user equipment carries a rate and a received signal strength indicator of the accessed WiFi direct link/access point.

B. In the case in which a WiFi direct link/access point of a pre-supportive user equipment is enabled:

send a query message about a WiFi direct link/access point to the pre-supportive user equipment;

receive a query response returned by the pre-supportive user equipment, where the query response carries information about an enabled WiFi direct link/access point, and a cellular IP address and a WiFi IP address of the pre-supportive user equipment;

send, to a beneficial user equipment, a first-hop link setup request that carries the information about the enabled WiFi direct link/access point, so that the beneficial user equipment accesses, according to the first-hop link setup request, the WiFi direct link/access point enabled by the pre-supportive user equipment; and;

receive a first-hop link setup response returned by the beneficial user equipment, where the first-hop link setup response returned by the beneficial user equipment carries a rate and a received signal strength indicator of the accessed WiFi direct link/access point.

The pre-supportive user equipment refers to a terminal that possibly becomes a supportive user equipment of the beneficial user equipment, that is, a candidate terminal of the supportive user equipment. Therefore, before separately sending a first-hop link setup request to the beneficial user equipment and the pre-supportive user equipment, if there is one beneficial user equipment and there is at least one pre-supportive user equipment, a pre-supportive user set may be further selected for the beneficial user equipment, so that an appropriate terminal may be further selected as the supportive user equipment from the pre-supportive user set subsequently; or if there is at least one beneficial user equipment and there is one pre-supportive user equipment, a beneficial user set may be selected for the pre-supportive user equipment (because there is only one pre-supportive user equipment in this case, the pre-supportive user equipment is also the supportive user equipment), that is, the base station may further include a user set selecting unit.

The user set selecting unit may be configured to select a pre-supportive user set for the beneficial user equipment, where the pre-supportive user set includes at least one pre-supportive user equipment.

For example, the user set selecting unit may be specifically configured to obtain air interface information of a mobile cellular network of each user, and select, according to the air interface information of the mobile cellular network, a terminal that meets a preset condition; and add the terminal that meets the preset condition to the pre-supportive user set of the beneficial user equipment.

Alternatively, the user set selecting unit is configured to: when there is at least one beneficial user equipment and there is one pre-supportive user equipment, select a beneficial user set for the pre-supportive user equipment, where the beneficial user set includes at least one beneficial user equipment.

For example, the user set selecting unit is specifically configured to obtain air interface information of a mobile cellular network of each user; select, according to the air interface information of the mobile cellular network, a terminal that meets a preset condition; and add the terminal to the beneficial user set of the pre-supportive user equipment.

The "preset condition" may be set according to an actual application requirement, which is not repeatedly described herein.

The establishing unit may be specifically configured to perform transmission configuration on the first-hop physical link between the beneficial user equipment and the supportive user equipment, so as to establish the support link.

The transmission configuration may include configuration that is performed on a tunnel, a route, and the like, where tunnel configuration is optional, and whether the tunnel configuration is performed may be specifically determined according to an actual application requirement. For example, if first-hop Internet Protocol tunnel encapsulation is mainly performed on a data packet by a network side such as the base station, tunnel configuration may not be performed, and if first-hop Internet Protocol tunnel encapsulation is performed on a data packet by a beneficial user equipment/supportive user equipment, tunnel configuration may be performed, which may be specifically as follows:

(1) First scenario: Tunnel and route configuration is performed.

The establishing unit 704 may be specifically configured to send a first link configuration request to the beneficial user equipment, where the first link configuration request includes IP tunnel information of a downlink of the beneficial user equipment, IP tunnel information of an uplink of the beneficial user equipment, and a routing rule of the beneficial user equipment; receive a first link configuration response that is returned by the beneficial user equipment after the beneficial user equipment performs transmission configuration on the first-hop physical link between the beneficial user equipment and the supportive user equipment according to the first link configuration request; send a second link configuration request to the supportive user equipment, where the second link configuration request includes a routing rule of a downlink of the supportive user equipment, IP tunnel information of the downlink of the supportive user equipment, a routing rule of an uplink of the supportive user equipment, and IP tunnel information of the uplink of the supportive user equipment; and receive a second link configuration response that is returned by the supportive user equipment after the supportive user equipment performs transmission configuration on the first-hop physical link between the beneficial user equipment and the supportive user equipment according to the second link configuration request.

The beneficial user equipment may perform transmission configuration on the support link according to the first link configuration request by using a plurality of methods, which, for example, may be specifically as follows:

a. Perform configuration on an IP tunnel parsing manner of the downlink according to the IP tunnel information of the downlink of the beneficial user equipment.

b. Perform configuration on an IP tunnel encapsulation manner of the uplink according to the IP tunnel information of the uplink of the beneficial user equipment.

c. Perform configuration on a route submitting manner of a WiFi direct link/access point for an upper-layer application according to the routing rule of the beneficial user equipment.

It should be noted that, if a plurality of supportive user equipments exists, the first link configuration request may simultaneously carry a plurality of sets of configuration information of the supportive user equipments, for example, carry information such as WiFi IP addresses of the plurality of supportive user equipments.

The supportive user equipment may perform transmission configuration on the support link according to the second link configuration request by using a plurality of methods, which, for example, may be specifically as follows:

a. Perform configuration on a route forwarding manner of the downlink according to the routing rule of the downlink of the supportive user equipment.

b. Perform configuration on an IP tunnel encapsulation manner of the downlink according to the IP tunnel information of the downlink of the supportive user equipment.

c. Perform configuration on a route forwarding manner of the uplink according to the routing rule of the uplink of the supportive user equipment.

d. Perform configuration on an IP tunnel parsing manner of the uplink according to the IP tunnel information of the uplink of the supportive user equipment.

It should be noted that, if a plurality of supportive user equipments exists, these supportive user equipments may be configured one by one, or these supportive user equipments may be configured concurrently.

(2) Second scenario: Only route configuration is performed, and tunnel configuration is not performed.

The establishing unit 704 may be specifically configured to send a third link configuration request to the beneficial user equipment, where the third link configuration request includes a routing rule of the beneficial user equipment; receive a third link configuration response that is returned by the beneficial user equipment after the beneficial user equipment performs transmission configuration on the first-hop physical link between the beneficial user equipment and the supportive user equipment according to the third link configuration request; send a fourth link configuration request to the supportive user equipment, where the fourth link configuration request includes a routing rule of a downlink of the supportive user equipment, and a routing rule of an uplink of the supportive user equipment; and receive a fourth link configuration response that is returned by the supportive user equipment after the supportive user equipment performs transmission configuration on the first-hop physical link between the beneficial user equipment and the supportive user equipment according to the fourth link configuration request.

A method for performing, by the beneficial user equipment, transmission configuration on the support link according to the first link configuration request may be specifically as follows:

Perform configuration on a route submitting manner of a WiFi direct link/access point for an upper-layer application according to the routing rule of the beneficial user equipment.

It should be noted that, if a plurality of supportive user equipments exists, the first link configuration request may simultaneously carry a plurality of sets of configuration information of the supportive user equipments.

A method for performing, by the supportive user equipment, transmission configuration on the support link according to the second link configuration request may be specifically as follows:

a. Perform configuration on a route forwarding manner of the downlink according to the routing rule of the downlink of the supportive user equipment.

b. Perform configuration on a route forwarding manner of the uplink according to the routing rule of the uplink of the supportive user equipment.

It should be noted that, if a plurality of supportive user equipments exists, these supportive user equipments may be configured one by one, or these supportive user equipments may be configured concurrently.

It should be noted that, in the foregoing transmission configuration, transmission configuration on the beneficial user equipment and the supportive user equipment may not be executed in particular order, unless that a NAT manner is used during transmission configuration.

It should be noted that, in the embodiment of the present invention, an IP tunnel is mainly used as an example for description. It should be understood that it is not limited to the IP tunnel and another tunneling technology may also be used, and an implementation method thereof is similar to that of the IP tunnel, which is not repeatedly described herein.

In addition, after the establishing unit 704 establishes, based on the first-hop physical link between the beneficial user equipment and the supportive user equipment, the support link, a configured support link may be further used to transfer a data packet. IP tunnel encapsulation may be performed on the data packet (including an uplink data packet and a downlink data packet) by the beneficial user equipment or the supportive user equipment according to first-hop IP information of the support link; or IP tunnel encapsulation may also be performed on a downlink data packet by the base station according to first-hop IP information of the support link at the time of offloading, that is, the base station may further include a transmitting unit.

The transmitting unit is configured to use the support link to transfer a data packet, where the data packet undergoes Internet Protocol tunnel encapsulation that is performed according to first-hop Internet Protocol information of the support link by the beneficial user equipment or the supportive user equipment; or a downlink data packet undergoes Internet Protocol tunnel encapsulation that is performed according to first-hop Internet Protocol information of the support link by the base station at the time of offloading.

Optionally, a manner of reporting the link measurement information may be periodic reporting, or may be event-based reporting, that is:

The transceiver unit 702 may be specifically configured to separately receive measurement rate information and/or received signal strength indicator information of a cooperative link periodically reported by the beneficial user equipment and/or the supportive user equipment; and/or, the transceiver unit 702 may be specifically configured to separately receive WiFi signal quality information that is reported by the beneficial user equipment and/or the supportive user equipment in an event-based manner.

A link measurement manner may be configured during initial measurement, or may be independently configured after initial measurement, that is, the base station may further include a configuring unit.

The configuring unit is configured to perform independent configuration on a link measurement manner of the support link, or perform configuration on a link measurement manner when the initial measurement is performed on the first-hop physical link, so that the beneficial user equipment and the supportive user equipment perform measurement on the support link according to the link measurement manner.

Controlling the support link by the control unit 705 may be in a plurality of forms, which, for example, may be specifically as follows:

(1) If the link measurement information indicates that a supportive user equipment exits from a user set, release a support link corresponding to the supportive user equipment that exits from the user set, where the releasing includes deleting a route, deleting a tunnel, disabling WiFi, and the like.

(2) If the link measurement information indicates that cooperative communication is complete, and all supportive user equipments have released corresponding support links, release a support link corresponding to the beneficial user equipment, where the releasing includes deleting a route, deleting a tunnel, disabling a WiFi direct link/access point, and the like.

That is, the control unit 705 may be specifically configured to: when the link measurement information indicates that a supportive user equipment exits, release a support link corresponding to the supportive user equipment that exits from a supportive user set; and when the link measurement information indicates that cooperative communication is complete, and all supportive user equipments have released corresponding support links, release a support link corresponding to the beneficial user equipment.

The base station may be specifically a device, such as an evolved base station or another transmitting station.

In specific implementation, the units described above may be implemented as independent entities, or may be randomly combined and implemented as one or several entities. For the specific implementation of the units described above, reference may be made to the foregoing method embodiments, and details are not repeatedly described herein.

It can be known from the foregoing that, when a confirming unit 701 of a base station in this embodiment confirms that a beneficial user equipment or a pre-supportive user equipment has a capability of performing cooperative communication, a transceiver unit 702 may separately send a first-hop link setup request to the beneficial user equipment and the pre-supportive user equipment, so that the beneficial user equipment and the pre-supportive user equipment establish first-hop physical links according to the first-hop link setup request; and separately receive initial measurement information that is reported by the pre-supportive user equipment and/or the beneficial user equipment after the pre-supportive user equipment and/or the beneficial user equipment performs initial measurement on the first-hop physical link; a selecting unit 703 selects a supportive user equipment of the beneficial user equipment from the pre-supportive user equipment according to the initial measurement information; or selects, for the supportive user equipment and according to the initial measurement information, a beneficial user equipment that is supported by the supportive user equipment; an establishing unit 704 establishes, based on a first-hop physical link between the beneficial user equipment and the supportive user equipment, a support link; the transceiver unit 702 receives link measurement information of the support link reported by the beneficial user equipment and the supportive user equipment after the beneficial user equipment and the supportive user equipment perform measurement on the support link; and then a control unit 705 controls the support link according to the link measurement information, thereby achieving an objective of performing control and management on a link in cooperative communication, and improving the transmission efficiency and communication quality of cooperative communication.

In addition, in a scenario in which a supportive user equipment is used as an access point, the supportive user equipment usually uses some specific technologies (such as a directional antenna technology) to improve channel quality of the support link. Therefore, for a network algorithm, that a plurality of beneficial user equipments that can be supported by one supportive user equipment is selected for the supportive user equipment may also be considered, so as to improve a utilization rate of a network resource, and greatly improve a network capacity.

Embodiment 9

Figure 8:
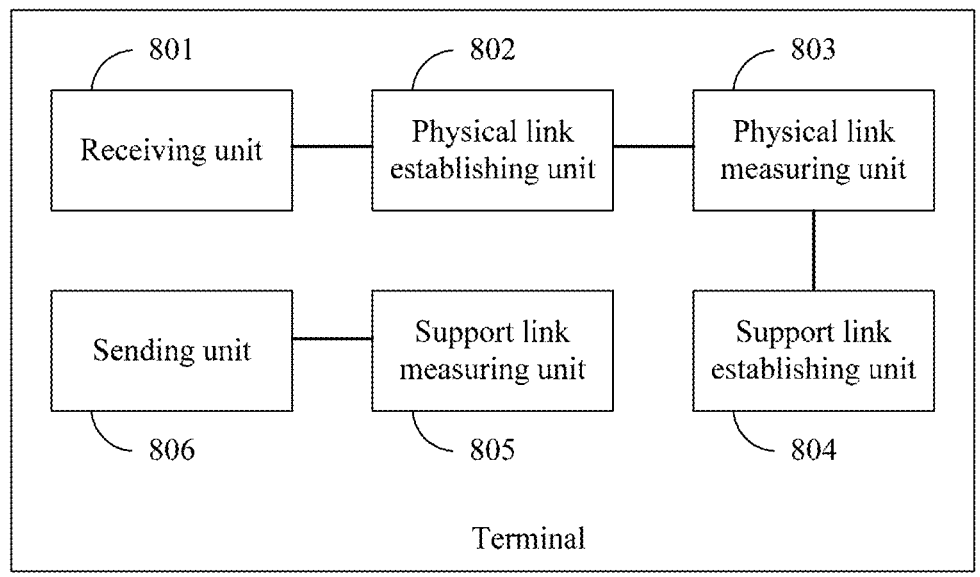
FIG. 8 is a schematic structural diagram of a terminal according to an embodiment of the present invention.

Correspondingly, an embodiment of the present invention further provides a terminal. As shown in FIG. 8, the terminal includes a receiving unit 801, a physical link establishing unit 802, a physical link measuring unit 803, a support link establishing unit 804, a support link measuring unit 805, and a sending unit 806.

The receiving unit 801 is configured to receive a first-hop link setup request sent by a base station.

The physical link establishing unit 802 is configured to establish a first-hop physical link according to the first-hop link setup request.

The physical link measuring unit 803 is configured to perform initial measurement on the first-hop physical link established by the physical link establishing unit 802, and send the initial measurement information to the base station.

In this way, after receiving the initial measurement information, the base station may select, from a pre-supportive user equipment according to the initial measurement information, a supportive user equipment for a beneficial user equipment; or select, for a supportive user equipment, a beneficial user equipment that is supported by the supportive user equipment. For example, the initial measurement information may be used, when there is one beneficial user equipment and at least one pre-supportive user equipment, by the base station to select a supportive user equipment of the beneficial user equipment from the pre-supportive user equipment according to the initial measurement informa-tion; or the initial measurement information is used, when there is at least one beneficial user equipment and one pre-supportive user equipment, by the base station to use the pre-supportive user equipment as a supportive user equipment, and select, according to the initial measurement information, a beneficial user equipment that needs to be supported by the supportive user equipment. For details, reference may be made to the foregoing embodiments, and details are not repeatedly described herein.

The support link establishing unit 804 is configured to establish a support link based on the first-hop physical link.

The support link measuring unit 805 is configured to perform measurement on the support link established by the support link establishing unit 804, so as to obtain link measurement information.

The sending unit 806 is configured to send the link measurement information measured by the support link measuring unit 805 to the base station, so that the base station controls the support link according to the link measurement information.

The first-hop link setup request may be specifically in a plurality of message forms, for example, may be a query message. The first-hop link setup request may carry a different indication message according to a different role that the terminal plays, for example, in a scenario in which a beneficial user equipment is used as an access point, if the terminal is used as the beneficial user equipment, information instructing the beneficial user equipment "to enable a WiFi direct link/access point" may be carried in the first-hop link setup request, and if the terminal is used as a supportive user equipment, information instructing a pre-supportive user equipment "to access the WiFi direct link/access point enabled by the beneficial user equipment" may be carried in the first-hop link setup request; conversely, in a scenario in which a supportive user equipment is used as an access point, if the terminal is used as the supportive user equipment, information instructing a pre-supportive user equipment "to enable a WiFi direct link/access point" may be carried in the first-hop link setup request, and if the terminal is used as a beneficial user equipment, information instructing the beneficial user equipment "to access the WiFi direct link/access point enabled by the pre-supportive user equipment" may be carried in the first-hop link setup request; and so on. That is, according to a different specific scenario, implementation of the receiving unit 801 may be specifically as follows:

(1) In a scenario in which a beneficial user equipment is used as an access point:

A. If the terminal is used as the beneficial user equipment, the receiving unit 801 may be specifically configured to: when the terminal is the beneficial user equipment, receive the first-hop link setup request sent by the base station, where the first-hop link setup request carries information instructing the beneficial user equipment to enable a WiFi direct link/access point, and the like.

In this case, the physical link establishing unit 802 may be specifically configured to enable a WiFi direct link/access point according to the first-hop link setup request, and return a first-hop link setup response to the base station, so as to establish the first-hop physical link.

The first-hop link setup response may carry information, such as information about the enabled WiFi direct link/access point, and a cellular IP address and a WiFi IP address of the beneficial user equipment.

B. If the terminal is used as a supportive user equipment, the receiving unit 801 may be specifically configured to: when the terminal is used as the supportive user equipment, receive the first-hop link setup request sent by the base station, where the first-hop link setup request carries information about an enabled WiFi direct link/access point.

In this case, the physical link establishing unit 802 may be specifically configured to access, according to the first-hop link setup request, a WiFi direct link/access point enabled by the beneficial user equipment, and return a first-hop link setup response to the base station, so as to establish the first-hop physical link.

The first-hop link setup response may carry information, such as a rate and a received signal strength indicator of the accessed WiFi direct link/access point.

(2) In a scenario in which a supportive user equipment is used as an access point:

A. If the terminal is used as the supportive user equipment, the receiving unit 801 may be specifically configured to: when the terminal is used as the supportive user equipment, receive a query message that is about a WiFi direct link/access point and is sent by the base station.

In this case, the physical link establishing unit 802 is specifically configured to return a query response to the base station, so as to establish the first-hop physical link.

The query response may carry information, such as information about an enabled WiFi direct link/access point, and a cellular IP address and a WiFi IP address of the pre-supportive user equipment.

B. If the terminal is used as a beneficial user equipment, the receiving unit 801 may be specifically configured to: when the terminal is used as the beneficial user equipment, receive the first-hop link setup request sent by the base station, where the first-hop link setup request carries information, such as information about an enabled WiFi direct link/access point.

In this case, the physical link establishing unit 802 may be specifically configured to access, according to the first-hop link setup request, a WiFi direct link/access point enabled by the pre-supportive user equipment, and return a first-hop link setup response to the base station, so as to establish the first-hop physical link.

The first-hop link setup response may carry information, such as a rate and a received signal strength indicator of the accessed WiFi direct link/access point.

The support link establishing unit 804 may be specifically configured to receive transmission configuration that is performed by the base station on the first-hop physical link, so as to establish the support link.

The transmission configuration may include configuration that is performed on a tunnel, a route, and the like, where tunnel configuration is optional, and whether the tunnel configuration is performed may be specifically determined according to an actual application requirement. For example, if first-hop Internet Protocol tunnel encapsulation is mainly performed on a data packet by a network side such as the base station, tunnel configuration may not be performed, and if first-hop Internet Protocol tunnel encapsulation is performed on a data packet by a beneficial user equipment/supportive user equipment, tunnel configuration may be performed, which may be specifically as follows:

(1) First scenario: Tunnel and route configuration is performed.

In this scenario, transmission configuration may differ according to a different role that the terminal plays, which may be specifically as follows:

A. Configuration on the Beneficial User Equipment:

The support link establishing unit 804 may be specifically configured to receive a first link configuration request sent by the base station, where the first link configuration request includes information, such as IP tunnel information of a downlink of the beneficial user equipment, IP tunnel information of an uplink of the beneficial user equipment, and a routing rule of the beneficial user equipment; and return a first link configuration response to the base station after performing transmission configuration on the first-hop physical link according to the first link configuration request, so as to establish the support link.

A manner for performing, by the beneficial user equipment, transmission configuration on the support link according to the first link configuration request may be specifically as follows:

a. Perform configuration on an IP tunnel parsing manner of the downlink according to the IP tunnel information of the downlink of the beneficial user equipment.

b. Perform configuration on an IP tunnel encapsulation manner of the uplink according to the IP tunnel information of the uplink of the beneficial user equipment.

c. Perform configuration on a route submitting manner of a WiFi direct link/access point for an upper-layer application according to the routing rule of the beneficial user equipment.

It should be noted that, if a plurality of supportive user equipments exists, the first link configuration request may simultaneously carry a plurality of sets of configuration information of the supportive user equipments, for example, carry information such as WiFi IP addresses of the plurality of supportive user equipments.

B. Configuration on the Supportive User Equipment:

The support link establishing unit 804 may be specifically configured to receive a second link configuration request sent by the base station, where the second link configuration request may include information, such as a routing rule of a downlink of the supportive user equipment, IP tunnel information of the downlink of the supportive user equipment, a routing rule of an uplink of the supportive user equipment, and IP tunnel information of the uplink of the supportive user equipment; and return a second link configuration response to the base station after performing transmission configuration on the first-hop physical link according to the second link configuration request, so as to establish the support link.

A manner for performing, by the supportive user equipment, transmission configuration on the support link according to the second link configuration request may be specifically as follows:

a. Perform configuration on a route forwarding manner of the downlink according to the routing rule of the downlink of the supportive user equipment.

b. Perform configuration on an IP tunnel encapsulation manner of the downlink according to the IP tunnel information of the downlink of the supportive user equipment.

c. Perform configuration on a route forwarding manner of the uplink according to the routing rule of the uplink of the supportive user equipment.

d. Perform configuration on an IP tunnel parsing manner of the uplink according to the IP tunnel information of the uplink of the supportive user equipment.

It should be noted that, if a plurality of supportive user equipments exists, these supportive user equipments may be configured one by one, or these supportive user equipments may be configured concurrently.

(2) Second scenario: Only route configuration is performed, and tunnel configuration is not performed.

A. Configuration on the Beneficial User Equipment:

The support link establishing unit 804 may be specifically configured to receive a third link configuration request sent by the base station, where the third link configuration request may include information, such as a routing rule of the beneficial user equipment; and return a third link configuration response to the base station after performing transmission configuration on the first-hop physical link according to the third link configuration request, so as to establish the support link.

A manner for performing, by the beneficial user equipment, transmission configuration on the support link according to the third link configuration request may be specifically as follows:

Perform configuration on a route submitting manner of a WiFi direct link/access point for an upper-layer application according to the routing rule of the beneficial user equipment.

It should be noted that, if a plurality of supportive user equipments exists, the first link configuration request may simultaneously carry a plurality of sets of configuration information of the supportive user equipments.

B. Configuration on the Supportive User Equipment:

The support link establishing unit 804 may be specifically configured to receive a fourth link configuration request sent by the base station, where the fourth link configuration request may include information, such as a routing rule of a downlink of the supportive user equipment, and a routing rule of an uplink of the supportive user equipment; and return a fourth link configuration response to the base station after performing transmission configuration on the first-hop physical link according to the fourth link configuration request, so as to establish the support link.

A manner for performing, by the supportive user equipment, transmission configuration on the support link according to the fouth link configuration request may be specifically as follows:

a. Perform configuration on a route forwarding manner of the downlink according to the routing rule of the downlink of the supportive user equipment.

b. Perform configuration on a route forwarding manner of the uplink according to the routing rule of the uplink of the supportive user equipment.

It should be noted that, if a plurality of supportive user equipments exists, these supportive user equipments may be configured one by one, or these supportive user equipments may be configured concurrently.

It should be further noted that, in the embodiment of the present invention, an IP tunnel is mainly used as an example for description. It should be understood that it is not limited to the IP tunnel and another tunneling technology may also be used, and an implementation method thereof is similar to that of the IP tunnel, which is not repeatedly described herein.

In addition, after transmission configuration that is performed by the base station on the first-hop physical link is received to establish the support link, a configured support link may be further used to transfer a data packet, that is, the terminal may further include a transmitting unit, which is as follows:

The transmitting unit may be configured to perform Internet Protocol tunnel encapsulation on a data packet according to first-hop Internet Protocol information of the support link, and use the support to transfer the encapsulated data packet; or the transmitting unit may be configured to use the support link to receive a data packet that is delivered by the base station, where Internet Protocol tunnel encapsulation is performed on the data packet by the base station according to first-hop Internet Protocol information of the support link.

A manner of reporting the link measurement information may be periodic reporting, or may be event-based reporting, which, for example, may be specifically as follows:

The sending unit 806 may be specifically configured to periodically report measurement rate information and received signal strength indicator information of a cooperative link to the base station; and/or report WiFi signal quality information to the base station in an event-based manner.

Optionally, a link measurement manner may be configured during initial measurement, or may be independently configured after initial measurement, which, for example, may be specifically as follows:

The support link measuring unit 805 may be specifically configured to receive independent configuration that is performed on a link measurement manner of the support link by the base station, or receive configuration that is performed on a link measurement manner by the base station when the initial measurement is performed on the first-hop physical link, and perform measurement on the support link according to the link measurement manner, so as to obtain the link measurement information.

The terminal may be used as a supportive user equipment, or may be used as a beneficial user equipment. The terminal may be specifically a device, such as a mobile phone, a tablet computer, or a personal computer. When used as a supportive user equipment, the terminal may also be an existing device such as an E5, for example, a device such as a CPE, an E5, a MIFI, or more powerful super E5 (Super E5).

In specific implementation, the units described above may be implemented as independent entities, or may be randomly combined and implemented as one or several entities. For the specific implementation of the units described above, reference may be made to the foregoing method embodiments, and details are not repeatedly described herein.

It can be known from the foregoing that, in this embodiment, a receiving unit 801 of a terminal receives a first-hop link setup request sent by a base station; a physical link establishing unit 802 establishes a first-hop physical link according to the first-hop link setup request; a support link establishing unit 804 establishes a support link based on the first-hop physical link; then a support link measuring unit 805 performs measurement on the support link to obtain link measurement information; and a sending unit 806 sends the link measurement information to the base station, so that the base station controls the support link according to the link measurement information, thereby achieving an objective of performing control and management on a cooperative communication link, and improving the transmission efficiency and communication quality of cooperative communication.

In addition, in a scenario in which a supportive user equipment is used as an access point, the supportive user equipment usually uses some specific technologies (such as a directional antenna technology) to improve channel quality of the support link. Therefore, for a network algorithm, that a plurality of beneficial user equipments that can be supported by one supportive user equipment is selected for the supportive user equipment may also be considered, so as to improve a utilization rate of a network resource, and greatly improve a network capacity.

Embodiment 10

Figure 9:
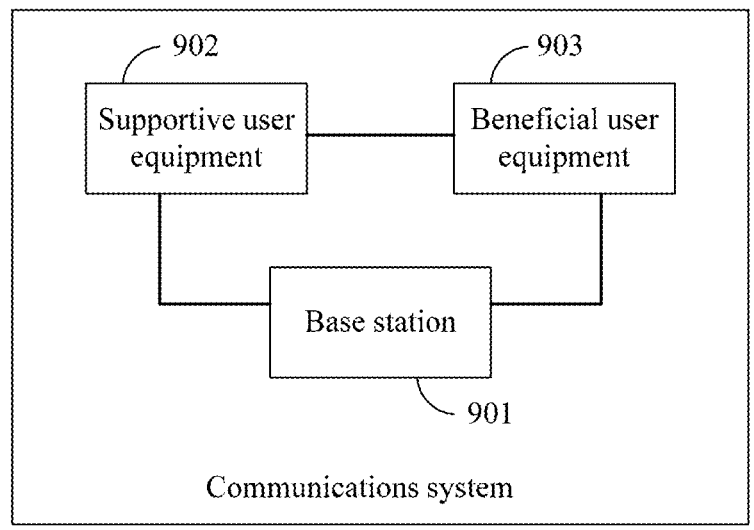
FIG. 9 is a schematic structural diagram of a communications system according to an embodiment of the present invention.
Figure 10:
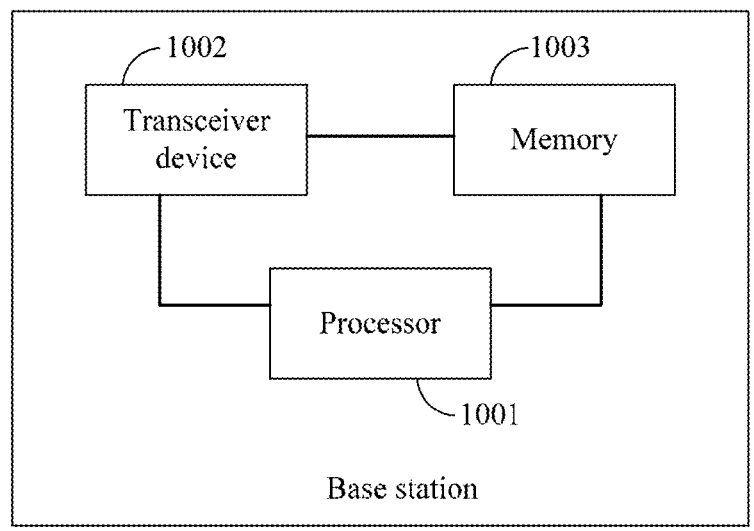
FIG. 10 is another schematic structural diagram of a base station according to an embodiment of the present invention.
Figure 11:
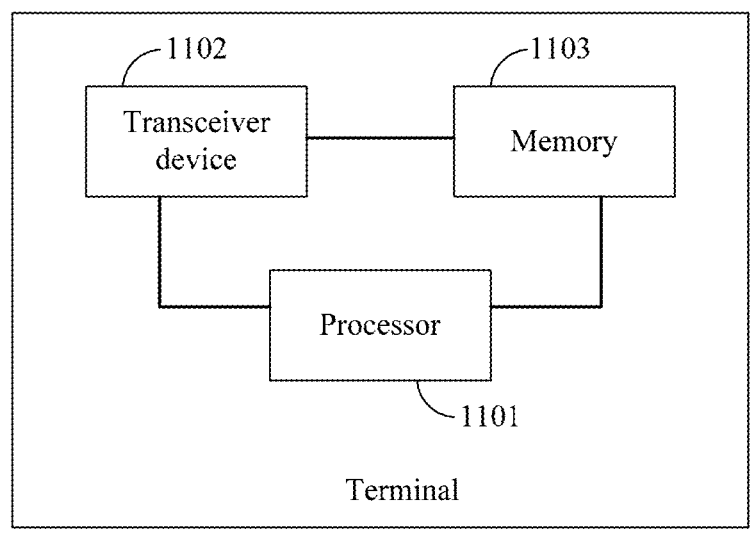
FIG. 11 is another schematic structural diagram of a terminal according to an embodiment of the present invention.

Correspondingly, an embodiment of the present invention further provides a communications system, including any base station provided in the embodiments of the present invention and any terminal provided in the embodiments of the present invention, where the terminal may include a beneficial user equipment and at least one supportive user equipment, for example, as shown in FIG. 9, the communications system may include a base station 901, a supportive user equipment 902, and a beneficial user equipment 903, which may be specifically as follows:

The base station 901 is configured to confirm that the beneficial user equipment 903 or a pre-supportive user equipment has a capability of performing cooperative communication; separately send a first-hop link setup request to the beneficial user equipment 903 and the pre-supportive user equipment, so that the beneficial user equipment 903 and the pre-supportive user equipment establish first-hop physical links according to the first-hop link setup request; separately receive initial measurement information that is reported by the pre-supportive user equipment and/or the beneficial user equipment 903 after the pre-supportive user equipment and/or the beneficial user equipment 903 performs initial measurement on the first-hop physical link; when there is one beneficial user equipment and there is at least one pre-supportive user equipment, select the supportive user equipment 902 of the beneficial user equipment 903 from the pre-supportive user equipment according to the initial measurement information; or when there is at least one beneficial user equipment and there is one pre-supportive user equipment, use the pre-supportive user equipment as the supportive user equipment 902, and select, according to the initial measurement information, the beneficial user equipment 903 that is supported by the supportive user equipment 902; establish, based on a first-hop physical link between the beneficial user equipment 903 and the supportive user equipment 902, a support link; and separately receive link measurement information that is reported by the beneficial user equipment 903 and/or the pre-supportive user equipment 902.

The supportive user equipment 902 is configured to receive a first-hop link setup request that is sent by the base station 901; establish a first-hop physical link according to the first-hop link setup request; perform initial measurement on the first-hop physical link to obtain initial measurement information, and report the initial measurement information to the base station, so that the base station selects the supportive user equipment 902 of the beneficial user equipment 903 from the pre-supportive user equipment according to the initial measurement information; or select, according to the initial measurement information, the beneficial user equipment 903 that is supported by the supportive user equipment 902; establish a support link based on the first-hop physical link; and perform measurement on the support link to obtain link measurement information, and send the link measurement information to the base station 901.

The beneficial user equipment 903 is configured to receive a first-hop link setup request that is sent by the base station 901; establish a first-hop physical link according to the first-hop link setup request; perform initial measurement on the first-hop physical link to obtain initial measurement information, and report the initial measurement information to the base station, so that the base station selects the supportive user equipment 902 of the beneficial user equipment 903 from the pre-supportive user equipment according to the initial measurement information; or select, according to the initial measurement information, the beneficial user equipment 903 that is supported by the supportive user equipment 902; establish a support link based on the first-hop physical link; and perform measurement on the support link to obtain link measurement information, and send the link measurement information to the base station 901.

For example, the base station 901 may be specifically configured to separately receive measurement rate information and/or received signal strength indicator information of a cooperative link periodically reported by the beneficial user equipment 903 and/or the supportive user equipment 902; and/or separately receive WiFi signal quality information that is reported by the beneficial user equipment 903 and/or the supportive user equipment 902 in an event-based manner.

A link measurement manner may be configured during initial measurement, or may be independently configured after initial measurement. For details, reference may be made to the foregoing embodiments.

The first-hop link setup request may be specifically in a plurality of message forms, for example, the first-hop link setup request may carry a different indication message according to a different target terminal, for example, if the beneficial user equipment 903 needs to be used as an access point, information instructing the beneficial user equipment 903 "to enable a WiFi direct link/access point" may be carried in a first-hop link setup request that is sent to the beneficial user equipment 903, and information instructing the pre-supportive user equipment "to access the WiFi direct link/access point enabled by the beneficial user equipment 903" is carried in a first-hop link setup request that is sent to the pre-supportive user equipment; conversely, if the supportive user equipment 902 needs to be used as an access point, information instructing the pre-supportive user equipment "to enable a WiFi direct link/access point" may be carried in a first-hop link setup request that is sent to the pre-supportive user equipment, and information instructing the beneficial user equipment 903 "to access the WiFi direct link/access point enabled by the pre-supportive user equipment" is carried in a first-hop link setup request that is sent to the beneficial user equipment, which may be specifically as follows:

(1) In a scenario in which the beneficial user equipment 903 is used as an access point:

The base station 901 is specifically configured to: when obtaining neighbor relationship information of the beneficial user equipment 903 or the pre-supportive user equipment, or when sensing that the beneficial user equipment 903 has a capability of performing cooperative communication, send a first-hop link setup request to the beneficial user equipment 903, so that the beneficial user equipment 903 enables a WiFi direct link/access point according to the first-hop link setup request; receive a first-hop link setup response returned by the beneficial user equipment 903, where the first-hop link setup response returned by the beneficial user equipment 903 may carry information, such as information about the enabled WiFi direct link/access point (for example, information such as an identifier and authentication key of the enabled WiFi), and a cellular IP address and a WiFi IP address of the beneficial user equipment 903; send, to the pre-supportive user equipment, a first-hop link setup request that carries the information about the enabled WiFi direct link/access point, so that the pre-supportive user equipment accesses, according to the first-hop link setup request, the WiFi direct link/access point enabled by the beneficial user equipment; receive a first-hop link setup response returned by the pre-supportive user equipment, so as to complete establishment of a first-hop physical link; separately receive initial measurement information that is reported by the pre-supportive user equipment and/or the beneficial user equipment 903 after the pre-supportive user equipment and/or the beneficial user equipment 903 performs initial measurement on the first-hop physical link, and select the supportive user equipment 902 of the beneficial user equipment 903 from the pre-supportive user equipment according to the initial measurement information; establish, based on a first-hop physical link between the beneficial user equipment 903 and the supportive user equipment 902, a support link; and separately receive link measurement information of the support link reported by the beneficial user equipment 903 and/or the supportive user equipment 902.

The beneficial user equipment 903 is specifically configured to receive a first-hop link setup request that is sent by the base station 901, where the first-hop link setup request carries information instructing the beneficial user equipment 903 to enable a WiFi direct link/access point, and the like; enable the WiFi direct link/access point according to the first-hop link setup request, and return a first-hop link setup response to the base station 901, so as to establish a first-hop physical link, where the first-hop link setup response carries information, such as information about the enabled WiFi direct link/access point, and a cellular IP address and a WiFi IP address of the beneficial user equipment 903.

The supportive user equipment 902 is specifically configured to receive a first-hop link setup request that is sent by the base station 901, where the first-hop link setup request carries information about an enabled WiFi direct link/access point; access, according to the first-hop link setup request, a WiFi direct link/access point enabled by the beneficial user equipment 903, and return a first-hop link setup response to the base station 901, so as to establish a first-hop physical link, where the first-hop link setup response carries information, such as a rate and a received signal strength indicator of the accessed WiFi direct link/access point.

(2) In a scenario in which the supportive user equipment 902 is used as an access point:

This scenario may be mainly classified into two cases: One case is that a WiFi direct link/access point of a pre-supportive user equipment is not enabled, and the other case is that a WiFi direct link/access point of a pre-supportive user equipment is enabled, which may be specifically as follows:

A. In the case in which a WiFi direct link/access point of a pre-supportive user equipment is not enabled:

The base station 901 is specifically configured to send a first-hop link setup request to the pre-supportive user equipment, so that the pre-supportive user equipment may enable a WiFi direct link/access point according to the first-hop link setup request; receive a first-hop link setup response returned by the pre-supportive user equipment, where the first-hop link setup response returned by the pre-supportive user equipment may carry information, such as information about the enabled WiFi direct link/access point (for example, information such as an identifier and authentication key of the enabled WiFi), and a cellular IP address and a WiFi IP address of the pre-supportive user equipment; send, to the beneficial user equipment 903, a first-hop link setup request that carries the information about the enabled WiFi direct link/access point, so that the beneficial user equipment 903 may access, according to the first-hop link setup request, the WiFi direct link/access point enabled by the pre-supportive user equipment; receive a first-hop link setup response returned by the beneficial user equipment 903, where the first-hop link setup response returned by the beneficial user equipment 903 may carry information, such as a rate and a received signal strength indicator of the accessed WiFi direct link/access point.

The supportive user equipment 902 is specifically configured to receive a first-hop link setup request that is sent by the base station 901, where the first-hop link setup request carries information instructing the supportive user equipment to enable a WiFi direct link/access point, and the like; and return a first-hop link setup response to the base station 901, so as to establish a first-hop physical link, where the first-hop link setup response carries information, such as information about the enabled WiFi direct link/access point, and a cellular IP address and a WiFi IP address of the pre-supportive user equipment.

The beneficial user equipment 903 is specifically configured to receive a first-hop link setup request that is sent by the base station 901, where the first-hop link setup request carries information, such as information about an enabled WiFi direct link/access point; and access, according to the first-hop link setup request, a WiFi direct link/access point enabled by the pre-supportive user equipment; and return a first-hop link setup response to the base station 901, so as to establish a first-hop physical link.

B. In the case in which a WiFi direct link/access point of a pre-supportive user equipment is enabled:

The base station 901 is specifically configured to send a query message about a WiFi direct link/access point to the pre-supportive user equipment; receive a query response returned by the pre-supportive user equipment, where the query response may carry information, such as information about an enabled WiFi direct link/access point (for example, information such as an identifier and authentication key of the enabled WiFi), and a cellular IP address and a WiFi IP address of the pre-supportive user equipment; send, to the beneficial user equipment 903, a first-hop link setup request that carries the information about the enabled WiFi direct link/access point and the like, so that the beneficial user equipment 903 may access, according to the first-hop link setup request, the WiFi direct link/access point enabled by the pre-supportive user equipment; receive a first-hop link setup response returned by the beneficial user equipment 903, where the first-hop link setup response returned by the beneficial user equipment 903 may carry information, such as a rate and a received signal strength indicator of the accessed WiFi direct link/access point.

The supportive user equipment 902 is specifically configured to receive a query message that is about a WiFi direct link/access point and sent by the base station 901; and return a query response to the base station 901, so as to establish a first-hop physical link, where the query response carries information, such as information about an enabled WiFi direct link/access point, and a cellular IP address and a WiFi IP address of the pre-supportive user equipment.

The beneficial user equipment 903 is specifically configured to receive a first-hop link setup request that is sent by the base station 901, where the first-hop link setup request carries information, such as information about an enabled WiFi direct link/access point; access, according to the first-hop link setup request, a WiFi direct link/access point enabled by the pre-supportive user equipment, and return a first-hop link setup response to the base station 901, so as to establish a first-hop physical link, where the first-hop link setup response returned by beneficial user equipment 903 carries information, such as a rate and a received signal strength indicator of the accessed WiFi direct link/access point.

The base station 901 may be specifically configured to perform transmission configuration on the first-hop physical link between the beneficial user equipment 903 and the supportive user equipment 902, so as to establish a support link.

The transmission configuration may include configuration that is performed on a tunnel, a route, and the like, where tunnel configuration is optional, and whether the tunnel configuration is performed may be specifically determined according to an actual application requirement. For example, if first-hop Internet Protocol tunnel encapsulation is mainly performed on a data packet by a network side such as the base station 901, tunnel configuration may not be performed, and if first-hop Internet Protocol tunnel encapsulation is performed on a data packet by the beneficial user equipment 903/supportive user equipment 902, tunnel configuration may be performed, which may be specifically as follows:

(1) First scenario: Tunnel and route configuration is performed.

In this scenario, configuration may be divided into two aspects: configuration on the beneficial user equipment 903 and configuration on the supportive user equipment 902, which may be specifically as follows:

A. Configuration on the Beneficial User Equipment 903:

The base station 901 is specifically configured to send a first link configuration request to the beneficial user equipment 903, where the first link configuration request may include IP tunnel information of a downlink of the beneficial user equipment 903, IP tunnel information of an uplink of the beneficial user equipment 903, and a routing rule of the beneficial user equipment 903; and receive a first link configuration response that is returned by the beneficial user equipment 903 after the beneficial user equipment 903 performs transmission configuration on the first-hop physical link between the beneficial user equipment 903 and the supportive user equipment 902 according to the first link configuration request.

That the beneficial user equipment 903 performs route transmission configuration on the support link according to the first link configuration request may be specifically as follows:

a. Perform configuration on an IP tunnel parsing manner of the downlink according to the IP tunnel information of the downlink of the beneficial user equipment 903.

b. Perform configuration on an IP tunnel encapsulation manner of the uplink according to the IP tunnel information of the uplink of the beneficial user equipment 903.

c. Perform configuration on a route submitting manner of a WiFi direct link/access point for an upper-layer application according to the routing rule of the beneficial user equipment 903.

It should be noted that, if a plurality of supportive user equipments 902 exists, in this case, the first link configuration request may simultaneously carry a plurality of sets of configuration information of the supportive user equipments 902, for example, carry information such as WiFi IP addresses of the plurality of supportive user equipments 902.

B. Configuration on the Supportive User Equipment 902:

The base station 901 is specifically configured to send a second link configuration request to the supportive user equipment 902, where the second link configuration request may include a routing rule of a downlink of the supportive user equipment 902, IP tunnel information of the downlink of the supportive user equipment 902, a routing rule of an uplink of the supportive user equipment 902, IP tunnel information of the uplink of the supportive user equipment 902, and the like; and receive a second link configuration response that is returned by the supportive user equipment 902 after the supportive user equipment 902 performs transmission configuration on the first-hop physical link between the beneficial user equipment and the supportive user equipment according to the second link configuration request.

That the supportive user equipment 902 performs route transmission configuration on the support link according to the second link configuration request may be specifically as follows:

a. Perform configuration on a route forwarding manner of the downlink according to the routing rule of the downlink of the supportive user equipment 902.

b. Perform configuration on an IP tunnel encapsulation manner of the downlink according to the IP tunnel information of the downlink of the supportive user equipment 902.

c. Perform configuration on a route forwarding manner of the uplink according to the routing rule of the uplink of the supportive user equipment 902.

d. Perform configuration on an IP tunnel parsing manner of the uplink according to the IP tunnel information of the uplink of the supportive user equipment 902.

It should be noted that, if a plurality of supportive user equipments 902 exists, these supportive user equipments 902 may be configured one by one, or these supportive user equipments 902 may be configured concurrently.

(2) Second scenario: Only route configuration is performed, and tunnel configuration is not performed.

In this scenario, configuration may be divided into two aspects: configuration on the beneficial user equipment 903 and configuration on the supportive user equipment 902, which may be specifically as follows:

A. Configuration on the Beneficial User Equipment 903:

The base station 901 is specifically configured to send a third link configuration request to the beneficial user equipment 903, where the third link configuration request may include a routing rule of the beneficial user equipment 903; and receive a third link configuration response that is returned by the beneficial user equipment 903 after the beneficial user equipment 903 performs transmission configuration on the first-hop physical link between the beneficial user equipment 903 and the supportive user equipment 902 according to the third link configuration request.

That the beneficial user equipment 903 performs route transmission configuration on the support link according to the third link configuration request may be specifically as follows:

Perform configuration on a route submitting manner of a WiFi direct link/access point for an upper-layer application according to the routing rule of the beneficial user equipment 903.

It should be noted that, if a plurality of supportive user equipments 902 exists, in this case, the first link configuration request may simultaneously carry a plurality of sets of configuration information of the supportive user equipments 902.

B. Configuration on the Supportive User Equipment 902:

The base station 901 is specifically configured to send a fourth link configuration request to the supportive user equipment 902, where the fourth link configuration request may include information, such as a routing rule of a downlink of the supportive user equipment 902 and a routing rule of an uplink of the supportive user equipment 902; and receive a fourth link configuration response that is returned by the supportive user equipment 902 after the supportive user equipment 902 performs transmission configuration on the first-hop physical link between the beneficial user equipment 902 and the supportive user equipment 903 according to the fourth link configuration request.

That the supportive user equipment 902 performs route transmission configuration on the support link according to the fourth link configuration request may be specifically as follows:

a. Perform configuration on a route forwarding manner of the downlink according to the routing rule of the downlink of the supportive user equipment 902.

b. Perform configuration on a route forwarding manner of the uplink according to the routing rule of the uplink of the supportive user equipment 902.

It should be noted that, if a plurality of supportive user equipments 902 exists, these supportive user equipments may be configured one by one, or these supportive user equipments 902 may be configured concurrently.

It should be further noted that, in the embodiment of the present invention, an IP tunnel is mainly used as an example for description. It should be understood that it is not limited to the IP tunnel and another tunneling technology may also be used, and an implementation method thereof is similar to that of the IP tunnel, which is not repeatedly described herein.

Optionally, before separately sending a first-hop link setup request to the beneficial user equipment 903 and the pre-supportive user equipment, the base station 901 may further select a pre-supportive user set for the beneficial user equipment 903, where the pre-supportive user set may include at least one pre-supportive user equipment, which, for example, may be specifically as follows:

The base station 901 is further configured to obtain air interface information of a mobile cellular network of each user, and select, according to the air interface information of the mobile cellular network, terminals that meet a preset condition, and add these terminals that meet the preset condition to the pre-supportive user set of the beneficial user equipment.

Alternatively, the base station 901 may further select a beneficial user set for the supportive user equipment 902, where the beneficial user set may include at least one beneficial user equipment, which, for example, may be specifically as follows:

The base station 901 is further configured to obtain air interface information of a mobile cellular network of each user, and select, according to the air interface information of the mobile cellular network, terminals that meet a preset condition, and add these terminals that meet the preset condition to the beneficial user set of the pre-supportive user equipment (which is also the supportive user equipment 902 in this case).

The "preset condition" may be set according to an actual application requirement, which is not repeatedly described herein.

Optionally, after a support link is established, a configured support link may be further used to transfer a data packet. IP tunnel encapsulation may be performed on the data packet (including an uplink data packet and a downlink data packet) by the beneficial user equipment 903 or the supportive user equipment 902 according to first-hop IP information of the support link; or IP tunnel encapsulation may also be performed on a downlink data packet by the base station 901 according to first-hop IP information of the support link at the time of offloading, which is not repeatedly described herein.

For specific implementation of the devices described above, reference may be made to the foregoing embodiments, and details are not repeatedly described herein.

It can be known from the foregoing that, when confirming that a beneficial user equipment 903 or a supportive user equipment has a capability of performing cooperative communication, a base station 901 of a communications system in this embodiment may separately send a first-hop link setup request to the beneficial user equipment 903 and a pre-supportive user equipment, so that the beneficial user equipment 903 and the pre-supportive user equipment establish first-hop physical links according to the first-hop link setup request; separately receive initial measurement information that is reported by the pre-supportive user equipment and/or the beneficial user equipment 903 after the pre-supportive user equipment and/or the beneficial user equipment 903 performs initial measurement on the first-hop physical link; select a supportive user equipment 902 of the beneficial user equipment 903 from the pre-supportive user equipment according to the initial measurement information; or select, according to the initial measurement information, the beneficial user equipment 903 that is supported by the supportive user equipment 902; then establish, based on a first-hop physical link between the beneficial user equipment 903 and the supportive user equipment 902, a support link; receive link measurement information of the support link reported by the beneficial user equipment 903 and the supportive user equipment 902 after the beneficial user equipment 903 and the supportive user equipment 902 perform measurement on the support link; and control the support link according to the link measurement information, thereby achieving an objective of performing control and management on a link in cooperative communication, and improving the transmission efficiency and communication quality of cooperative communication.

In addition, in a scenario in which a supportive user equipment is used as an access point, the supportive user equipment usually uses some specific technologies (such as a directional antenna technology) to improve channel quality of the support link. Therefore, for a network algorithm, that a plurality of beneficial user equipments that can be supported by one supportive user equipment is selected for the supportive user equipment may also be considered, so as to improve a utilization rate of a network resource, and greatly improve a network capacity.

Embodiment 11

In addition, an embodiment of the present invention further provides a base station, including a processor 1001, a transceiver device 1002, and a memory 1003 configured to store data, where the transceiver device 1002 is configured to: under control of the processor 1001, separately send a first-hop link setup request to a beneficial user equipment and a pre-supportive user equipment, so that the beneficial user equipment and the pre-supportive user equipment establish first-hop physical links according to the first-hop link setup request; and separately receive link measurement information of a support link reported by the beneficial user equipment and/or a supportive user equipment, where the link measurement information is obtained by the beneficial user equipment and/or the supportive user equipment by performing measurement on the support link; and the processor 1001 is configured to confirm that the beneficial user equipment and the pre-supportive user equipment have a capability of performing cooperative communication; control the transceiver device 1002 to separately send the first-hop link setup request to the beneficial user equipment and the pre-supportive user equipment, so that the beneficial user equipment and the pre-supportive user equipment establish the first-hop physical links according to the first-hop link setup request; separately receive initial measurement information that is reported by the pre-supportive user equipment and/or the beneficial user equipment after the pre-supportive user equipment and/or the beneficial user equipment performs initial measurement on the first-hop physical link; when there is one beneficial user equipment and there is at least one pre-supportive user equipment, select a supportive user equipment of the beneficial user equipment from the pre-supportive user equipment according to the initial measurement information; or when there is at least one beneficial user equipment and there is one pre-supportive user equipment, use the pre-supportive user equipment as a supportive user equipment, and select, according to the initial measurement information, a beneficial user equipment that is supported by the supportive user equipment; establish, based on a first-hop physical link between the beneficial user equipment and the supportive user equipment, the support link; and control the support link according to the link measurement information that is received by the transceiver device 1002.

The transceiver device 1002 may be specifically configured to separately receive measurement rate information and/or received signal strength indicator information of a cooperative link periodically reported by the beneficial user equipment and/or the supportive user equipment; and/or separately receive WiFi signal quality information that is reported by the beneficial user equipment and/or the supportive user equipment in an event-based manner.

A link measurement manner may be configured during initial measurement, or may be independently configured after initial measurement. For details, reference may be made to the foregoing embodiments.

The first-hop link setup request may be specifically in a plurality of message forms. For example, the first-hop link setup request may carry a different indication message according to a different target terminal. For example, if a beneficial user equipment needs to be used as an access point, information instructing the beneficial user equipment "to enable a WiFi direct link/access point" may be carried in a first-hop link setup request that is sent to the beneficial user equipment, and information instructing a pre-supportive user equipment "to access the WiFi direct link/access point enabled by the beneficial user equipment" is carried in a first-hop link setup request that is sent to the pre-supportive user equipment; conversely, if a supportive user equipment needs to be used as an access point, information instructing a pre-supportive user equipment "to enable a WiFi direct link/access point" may be carried in a first-hop link setup request that is sent to the pre-supportive user equipment, and information instructing a beneficial user equipment "to access the WiFi direct link/access point enabled by the pre-supportive user equipment" is carried in a first-hop link setup request that is sent to the beneficial user equipment.

In addition, the processor 1001 may specifically perform transmission configuration on the first-hop physical link between the beneficial user equipment and the supportive user equipment, so as to establish the support link.

The transmission configuration may include configuration that is performed on a tunnel, a route, and the like, where tunnel configuration is optional, and whether the tunnel configuration is performed may be specifically determined according to an actual application requirement. For example, if first-hop Internet Protocol tunnel encapsulation is mainly performed on a data packet by a network side such as the base station, tunnel configuration may not be performed, and if first-hop Internet Protocol tunnel encapsulation is performed on a data packet by a beneficial user equipment/supportive user equipment, tunnel configuration may be performed. For details, reference may be made to the foregoing embodiments, and details are not repeatedly described herein.

Optionally, before the transceiver device 1002 separately sends a first-hop link setup request to the beneficial user equipment and the pre-supportive user equipment, the processor 1001 may further select a pre-supportive user set for a beneficial user equipment 903, where the pre-supportive user set may include at least one pre-supportive user equipment, which, for example, may be specifically as follows:

The processor 1001 is further configured to obtain air interface information of a mobile cellular network of each user, and select, according to the air interface information of the mobile cellular network, terminals that meet a preset condition, and add these terminals that meet the preset condition to the pre-supportive user set of the beneficial user equipment.

Alternatively, the processor 1001 may further select a beneficial user set for the supportive user equipment, where the beneficial user set may include at least one beneficial user equipment, which, for example, may be specifically as follows:

The base station is further configured to obtain air interface information of a mobile cellular network of each user, and select, according to the air interface information of the mobile cellular network, terminals that meet a preset condition, and add these terminals that meet the preset condition to the beneficial user set of the pre-supportive user equipment (which is also the supportive user equipment in this case).

The "preset condition" may be set according to an actual application requirement, which is not repeatedly described herein.

Optionally, after a support link is established, the processor 1001 may further use a configured support link to transfer a data packet. IP tunnel encapsulation may be performed on the data packet (including an uplink data packet and a downlink data packet) by the beneficial user equipment or the supportive user equipment according to first-hop IP information of the support link; or IP tunnel encapsulation may also be performed on a downlink data packet by the base station according to first-hop IP information of the support link at the time of offloading, which is not repeatedly described herein.

The base station may be specifically a device, such as an evolved base station or another transmitting station.

For specific implementation of the units described above, reference may be made to the foregoing embodiments, and details are not repeatedly described herein.

It can be known from the foregoing that, when confirming that a beneficial user equipment and a supportive user equipment have a capability of performing cooperative communication, a base station in this embodiment separately sends a first-hop link setup request to the beneficial user equipment and a pre-supportive user equipment, so that the beneficial user equipment and the pre-supportive user equipment establish first-hop physical links according to the first-hop link setup request; separately receives initial measurement information that is reported by the pre-supportive user equipment and/or the beneficial user equipment after the pre-supportive user equipment and/or the beneficial user equipment performs initial measurement on the first-hop physical link; selects a supportive user equipment of the beneficial user equipment from the pre-supportive user equipment according to the initial measurement information; or selects, according to the initial measurement information, a beneficial user equipment that is supported by the supportive user equipment; then establishes, based on a first-hop physical link between the beneficial user equipment and the supportive user equipment, a support link; receives link measurement information of the support link reported by the beneficial user equipment and the supportive user equipment after the beneficial user equipment and the supportive user equipment perform measurement on the support link; and controls the support link according to the link measurement information, thereby achieving an objective of performing control and management on a link in cooperative communication, and improving the transmission efficiency and communication quality of cooperative communication.

In addition, in a scenario in which a supportive user equipment is used as an access point, the supportive user equipment usually uses some specific technologies (such as a directional antenna technology) to improve channel quality of the support link. Therefore, for a network algorithm, that a plurality of beneficial user equipments that can be supported by one supportive user equipment is selected for the supportive user equipment may also be considered, so as to improve a utilization rate of a network resource, and greatly improve a network capacity.

Embodiment 12

Correspondingly, an embodiment of the present invention further provides a terminal, including a processor 1101, a transceiver device 1102, and a memory 1103 configured to store data, where the transceiver device 1102 is configured to receive a first-hop link setup request sent by a base station, and send a link measurement information to the base station under control of the processor 1101; and the processor 1101 is configured to establish a first-hop physical link according to the first-hop link setup request received by the transceiver device 1102; establish a support link based on the first-hop physical link; perform measurement on the support link to obtain the link measurement information; control the transceiver device 1102 to send the link measurement information to the base station, so that the base station controls the support link according to the link measurement information.

The first-hop link setup request may be specifically in a plurality of message forms, for example, may be a query message. The first-hop link setup request may carry a different indication message according to a different role that the terminal plays, for example, in a scenario in which a beneficial user equipment is used as an access point, if the terminal is used as the beneficial user equipment, information instructing the beneficial user equipment "to enable a WiFi direct link/access point" may be carried in the first-hop link setup request, and if the terminal is used as a supportive user equipment, information instructing a pre-supportive user equipment "to access the WiFi direct link/access point enabled by the beneficial user equipment" may be carried in the first-hop link setup request; conversely, in a scenario in which a supportive user equipment is used as an access point, if the terminal is used as the supportive user equipment, information instructing a pre-supportive user equipment "to enable a WiFi direct link/access point" may be carried in the first-hop link setup request, and if the terminal is used as a beneficial user equipment, information instructing the beneficial user equipment "to access the WiFi direct link/access point enabled by the pre-supportive user equipment" may be carried in the first-hop link setup request; and so on. For details, reference may be made to the foregoing embodiments, and details are not repeatedly described herein.

The processor 1101 may be specifically configured to receive transmission configuration that is performed by the base station on the first-hop physical link, so as to establish the support link.

The transmission configuration may include configuration that is performed on a tunnel, a route, and the like, where tunnel configuration is optional, and whether the tunnel configuration is performed may be specifically determined according to an actual application requirement. For example, if first-hop Internet Protocol tunnel encapsulation is mainly performed on a data packet by a network side such as the base station, tunnel configuration may not be performed, and if first-hop Internet Protocol tunnel encapsulation is performed on a data packet by a beneficial user equipment/supportive user equipment, tunnel configuration may be performed. For details, reference may be made to the foregoing embodiments, and details are not repeatedly described herein.

In addition, after "the terminal receives transmission configuration that is performed by the base station on the first-hop physical link, so as to establish the support link", a configured support link may be further used to transfer a data packet, that is:

The processor 1101 is further configured to perform IP tunnel encapsulation on a data packet according to first-hop IP information of the support link, and use the support to transfer the encapsulated data packet; or use the support link to receive a data packet that is obtained by the base station by performing IP tunnel encapsulation according to first-hop IP information of the support link and delivered by the base station.

In addition, the processor 1101 is further configured to perform initial measurement on the first-hop physical link to obtain initial measurement information, and control the transceiver device 1102 to report the initial measurement information to the base station.

The terminal may be used as a supportive user equipment, or may be used as a beneficial user equipment. The terminal may be specifically a device, such as a mobile phone, a tablet computer, or a personal computer, or may be an existing device such as an E5, for example, a device such as a CPE, an E5, a MIFI, or a more powerful super E5 when used as a supportive user equipment.

For specific implementation of the units described above, reference may be made to the foregoing embodiments, and details are not repeatedly described herein.

It can be known from the foregoing that, a terminal in this embodiment receives a first-hop link setup request sent by a base station; establishes a first-hop physical link according to the first-hop link setup request; establishes a support link based on the first-hop physical link; performs measurement on the support link to obtain link measurement information; and then sends the link measurement information to the base station, so that the base station controls the support link according to the link measurement information, thereby achieving an objective of performing control and management on a cooperative communication link, and improving the transmission efficiency and communication quality of cooperative communication.

In addition, in a scenario in which a supportive user equipment is used as an access point, the supportive user equipment usually uses some specific technologies (such as a directional antenna technology) to improve channel quality of the support link. Therefore, for a network algorithm, that a plurality of beneficial user equipments that can be supported by one supportive user equipment is selected for the supportive user equipment may also be considered, so as to improve a utilization rate of a network resource, and greatly improve a network capacity.

A person of ordinary skill in the art may understand that all or a part of the steps of the methods in the embodiments may be implemented by a program instructing relevant hardware. The program may be stored in a computer readable storage medium. The storage medium may include: a read-only memory (ROM, Read-Only Memory), a random access memory (RAM, Random Access Memory), a magnetic disk, or an optical disc.

A method, an apparatus, and a system for controlling a link in cooperative communication according to embodiments of the present invention are described in detail above. The principle and implementation manners of the present invention are described by using specific examples herein and the description of the foregoing embodiments are merely intended to help understand the method and core idea of the present invention. In addition, a person of ordinary skill in the art may make modifications to the specific implementation manner and application scope according to the ideas of the embodiments of the present invention. In conclusion, the content of this specification shall not be construed as a limitation to the present invention.

What is claimed is:

1. A method for controlling a link in cooperative communication, comprising:
    confirming, by a base station, that at least one beneficial user equipment and at least one pre-supportive user equipment are capable of performing cooperative communication;
    separately sending, by the base station, a first-hop link setup request to each beneficial user equipment and each pre-supportive user equipment for each beneficial user equipment and each pre-supportive user equipment to establish first-hop physical links according to the first-hop link setup request;
    receiving, by the base station, initial measurement information relating to one or more of the first-hop physical links from the at least one pre-supportive user equipment and/or the at least one beneficial user equipment;
    when there is one beneficial user equipment and there are multiple pre-supportive user equipments, selecting, by the base station, a supportive user equipment for the beneficial user equipment from the multiple pre-supportive user equipments according to the initial measurement information; or when there are multiple beneficial user equipments and there is one pre-supportive user equipment, using the pre-supportive user equipment as a supportive user equipment, and selecting, according to the initial measurement information, a beneficial user equipment from the multiple beneficial user equipments to be supported by the supportive user equipment;
    establishing, by the base station, based on a first-hop physical link between the beneficial user equipment and the supportive user equipment, a support link;
    receiving, by the base station, link measurement information of the support link reported by the beneficial user equipment and/or the supportive user equipment; and
    controlling, by the base station, the support link according to the link measurement information;
    wherein establishing the support link further comprises:
    performing transmission configuration on the first-hop physical link between the beneficial user equipment and the supportive user equipment, and establishing the support link according to the transmission configuration;
    wherein separately sending the first-hop link setup request to each beneficial user equipment and each pre-supportive user equipment further comprises:
    sending a first-hop link setup request to the at least one beneficial user equipment, so that the at least one beneficial user equipment enables a Wireless Fidelity direct link/access point according to the first-hop link setup request;
    receiving a first-hop link setup response returned by the at least one beneficial user equipment, wherein the first-hop link setup response returned by the at least one beneficial user equipment carries information about the enabled Wireless Fidelity direct link/access point, and a cellular Internet Protocol address and a Wireless Fidelity Internet Protocol address of the at least one beneficial user equipment;
    sending, to the at least one pre-supportive user equipment, a first-hop link setup request that carries the information about the enabled Wireless Fidelity direct link/access point to facilitate the pre-supportive user equipment accessing, according to the first-hop link setup request, the Wireless Fidelity direct link/access point enabled by the at least one beneficial user equipment; and
    receiving a first-hop link setup response returned by the at least one pre-supportive user equipment, wherein the first-hop link setup response returned by the at least one pre-supportive user equipment carries a rate and a received signal strength indicator of the accessed Wireless Fidelity direct link/access point.

2. The method according to claim 1, wherein before separately sending a first-hop link setup request to each beneficial user equipment and each pre-supportive user equipment, the method further comprises:
    when there is one beneficial user equipment and there are multiple pre-supportive user equipments, selecting a pre-supportive user set for the beneficial user equipment, wherein the pre-supportive user set comprises at least one pre-supportive user equipment; or
    when there are multiple beneficial user equipments and there is one pre-supportive user equipment, selecting a beneficial user set for the pre-supportive user equipment, wherein the beneficial user set comprises at least one beneficial user equipment.

3. The method according to claim 2, wherein selecting the pre-supportive user set for the beneficial user equipment comprises:
    obtaining air interface information of a mobile cellular network of each user;
    selecting, according to the air interface information of the mobile cellular network, a terminal that meets a preset condition; and
    adding the terminal to the pre-supportive user set of the beneficial user equipment; and
    wherein selecting the beneficial user set for the pre-supportive user equipment comprises:
    obtaining air interface information of a mobile cellular network of each user;
    selecting, according to the air interface information of the mobile cellular network, a terminal that meets a preset condition; and
    adding the terminal to the beneficial user set of the pre-supportive user equipment.

4. The method according to claim 1, wherein performing transmission configuration on the first-hop physical link between the beneficial user equipment and the supportive user equipment comprises:
- sending a first link configuration request to the beneficial user equipment, wherein the first link configuration request comprises Internet Protocol tunnel information of a downlink of the beneficial user equipment, Internet Protocol tunnel information of an uplink of the beneficial user equipment, and a routing rule of the beneficial user equipment;
- receiving a first link configuration response that is returned by the beneficial user equipment after the beneficial user equipment performs transmission configuration on the first-hop physical link between the beneficial user equipment and the supportive user equipment according to the first link configuration request;
- sending a second link configuration request to the supportive user equipment, wherein the second link configuration request comprises a routing rule of a downlink of the supportive user equipment, Internet Protocol tunnel information of the downlink of the supportive user equipment, a routing rule of an uplink of the supportive user equipment, and Internet Protocol tunnel information of the uplink of the supportive user equipment; and
- receiving a second link configuration response that is returned by the supportive user equipment after the supportive user equipment performs transmission configuration on the first-hop physical link between the beneficial user equipment and the supportive user equipment according to the second link configuration request.

5. The method according to claim 1, wherein performing transmission configuration on the first-hop physical link between the beneficial user equipment and the supportive user equipment comprises:
- sending a third link configuration request to the beneficial user equipment, wherein the third link configuration request comprises a routing rule of the beneficial user equipment;
- receiving a third link configuration response that is returned by the beneficial user equipment after the beneficial user equipment performs transmission configuration on the first-hop physical link between the beneficial user equipment and the supportive user equipment according to the third link configuration request;
- sending a fourth link configuration request to the supportive user equipment, wherein the fourth link configuration request comprises a routing rule of a downlink of the supportive user equipment, and a routing rule of an uplink of the supportive user equipment; and
- receiving a fourth link configuration response that is returned by the supportive user equipment after the supportive user equipment performs transmission configuration on the first-hop physical link between the beneficial user equipment and the supportive user equipment according to the fourth link configuration request.

6. A base station, comprising:
- a non-transitory, computer-readable memory having processor-executable instructions stored thereon; and
- a processor, configured to execute the processor-executable instructions to facilitate:
  - confirming that at least one beneficial user equipment and at least one pre-supportive user equipment are capable of performing cooperative communication;
  - separately sending a first-hop link setup request to each beneficial user equipment and each pre-supportive user equipment for each beneficial user equipment and each pre-supportive user equipment to establish first-hop physical links according to the first-hop link setup request;
  - receiving initial measurement information relating to one or more of the first-hop physical links from the at least one pre-supportive user equipment and/or the at least one beneficial user equipment;
  - when there is one beneficial user equipment and there are multiple pre-supportive user equipments, selecting a supportive user equipment for the beneficial user equipment from the multiple pre-supportive user equipments according to the initial measurement information; or
  - when there are multiple beneficial user equipments and there is one pre-supportive user equipment, using the pre-supportive user equipment as a supportive user equipment, and selecting, according to the initial measurement information, a beneficial user equipment from the multiple beneficial user equipments to be supported by the supportive user equipment;
  - establishing based on a first-hop physical link between the beneficial user equipment and the supportive user equipment, a support link;
  - receiving link measurement information of the support link reported by the beneficial user equipment and/or the supportive user equipment; and
  - controlling the support link according to the link measurement information;
- wherein the processor is further configured to execute the processor-executable instructions to facilitate: performing transmission configuration on the first-hop physical link between the beneficial user equipment and the supportive user equipment, so as to establish the support link;
- wherein the processor is further configured to execute the processor-executable instructions to facilitate:
  - sending a first-hop link setup request to the at least one beneficial user equipment to facilitate the at least one beneficial user equipment enabling a Wireless Fidelity direct link/access point according to the first-hop link setup request;
  - receiving a first-hop link setup response that is returned by the at least one beneficial user equipment, wherein the first-hop link setup response returned by the at least one beneficial user equipment carries information about the enabled Wireless Fidelity direct link/access point, and a cellular Internet Protocol address and a Wireless Fidelity Internet Protocol address of the at least one beneficial user equipment;
  - sending, to the at least one pre-supportive user equipment, a first-hop link setup request carrying the information that is about the enabled Wireless Fidelity direct link/access point to facilitate the at least one pre-supportive user equipment accessing, according to the first-hop link setup request, the Wireless Fidelity direct link/access point enabled by the at least one beneficial user equipment; and
  - receiving a first-hop link setup response that is returned by the at least one pre-supportive user equipment, wherein the first-hop link setup response returned by the at least one pre-supportive user equipment carries a rate and a received signal strength indicator of the accessed Wireless Fidelity direct link/access point.

7. The base station according to claim 6, wherein the processor is further configured to execute the processor-executable instructions to facilitate:
when there is one beneficial user equipment and there are multiple pre-supportive user equipments, selecting a pre-supportive user set for the beneficial user equipment, wherein the pre-supportive user set comprises at least one pre-supportive user equipment; or
when there are multiple beneficial user equipments and there is one pre-supportive user equipment, selecting a beneficial user set for the pre-supportive user equipment, wherein the beneficial user set comprises at least one beneficial user equipment.

8. The base station according to claim 7, wherein the processor is further configured to execute the processor-executable instructions to facilitate:
obtaining air interface information of a mobile cellular network of each user; selecting, according to the air interface information of the mobile cellular network, a terminal that meets a preset condition; and adding the terminal to the pre-supportive user set of the beneficial user equipment; or
obtaining air interface information of a mobile cellular network of each user; selecting, according to the air interface information of the mobile cellular network, a terminal that meets a preset condition; and adding the terminal to the beneficial user set of the pre-supportive user equipment.

9. The base station according to claim 6, wherein the processor is further configured to execute the processor-executable instructions to facilitate:
sending a first link configuration request to the beneficial user equipment, wherein the first link configuration request comprises Internet Protocol tunnel information of a downlink of the beneficial user equipment, Internet Protocol tunnel information of an uplink of the beneficial user equipment, and a routing rule of the beneficial user equipment;
receiving a first link configuration response that is returned by the beneficial user equipment after the beneficial user equipment performs transmission configuration on the first-hop physical link between the beneficial user equipment and the supportive user equipment according to the first link configuration request;
sending a second link configuration request to the supportive user equipment, wherein the second link configuration request comprises a routing rule of a downlink of the supportive user equipment, Internet Protocol tunnel information of the downlink of the supportive user equipment, a routing rule of an uplink of the supportive user equipment, and Internet Protocol tunnel information of the uplink of the supportive user equipment; and
receiving a second link configuration response that is returned by the supportive user equipment after the supportive user equipment performs transmission configuration on the first-hop physical link between the beneficial user equipment and the supportive user equipment according to the second link configuration request.

10. The base station according to claim 6, wherein the processor is further configured to execute the processor-executable instructions to facilitate:
sending a third link configuration request to the beneficial user equipment, wherein the third link configuration request comprises a routing rule of the beneficial user equipment;
receiving a third link configuration response that is returned by the beneficial user equipment after the beneficial user equipment performs transmission configuration on the first-hop physical link between the beneficial user equipment and the supportive user equipment according to the third link configuration request;
sending a fourth link configuration request to the supportive user equipment, wherein the fourth link configuration request comprises a routing rule of a downlink of the supportive user equipment, and a routing rule of an uplink of the supportive user equipment; and
receiving a fourth link configuration response that is returned by the supportive user equipment returns after the supportive user equipment performs transmission configuration on the first-hop physical link between the beneficial user equipment and the supportive user equipment according to the fourth link configuration request.

11. A base station, comprising:
a non-transitory, computer-readable memory having processor-executable instructions stored thereon; and
a processor, configured to execute the processor-executable instructions to facilitate:
confirming that at least one beneficial user equipment and at least one pre-supportive user equipment are capable of performing cooperative communication;
separately sending a first-hop link setup request to each beneficial user equipment and each pre-supportive user equipment for each beneficial user equipment and each pre-supportive user equipment to establish first-hop physical links according to the first-hop link setup request;
receiving initial measurement information relating to one or more of the first-hop physical links from the at least one pre-supportive user equipment and/or the at least one beneficial user equipment;
when there is one beneficial user equipment and there are multiple pre-supportive user equipments, selecting a supportive user equipment for the beneficial user equipment from the multiple pre-supportive user equipments according to the initial measurement information; or
when there are multiple beneficial user equipments and there is one pre-supportive user equipment, using the pre-supportive user equipment as a supportive user equipment, and selecting, according to the initial measurement information, a beneficial user equipment from the multiple beneficial user equipments to be supported by the supportive user equipment;
establishing based on a first-hop physical link between the beneficial user equipment and the supportive user equipment, a support link;
receiving link measurement information of the support link reported by the beneficial user equipment and/or the supportive user equipment; and
controlling the support link according to the link measurement information;
wherein the processor is further configured to execute the processor-executable instructions to facilitate:
sending a first-hop link setup request to the at least one pre-supportive user equipment, so that the at least one pre-supportive user equipment enables a Wireless Fidelity direct link/access point according to the first-hop link setup request;

receiving a first-hop link setup response returned by the at least one pre-supportive user equipment, wherein the first-hop link setup response returned by the at least one pre-supportive user equipment carries information about the enabled Wireless Fidelity direct link/access point, and a cellular Internet Protocol address and a Wireless Fidelity Internet Protocol address of the at least one pre-supportive user equipment;

sending, to the at least one beneficial user equipment, a first-hop link setup request that carries the information about the enabled Wireless Fidelity direct link/access point to facilitate the at least one beneficial user equipment accessing, according to the first-hop link setup request, the Wireless Fidelity direct link/access point enabled by the at least one pre-supportive user equipment; and receiving a first-hop link setup response returned by the at least one beneficial user equipment, wherein the first-hop link setup response returned by the at least one beneficial user equipment carries a rate and a received signal strength indicator of the accessed Wireless Fidelity direct link/access point.

12. A terminal, comprising:
a non-transitory, computer-readable memory having processor-executable instructions stored thereon; and
a processor, configured to execute the processor-executable instructions to facilitate:
receiving a first-hop link setup request sent by a base station;
establishing a first-hop physical link according to the first-hop link setup request;
performing initial measurement on the first-hop physical link;
sending the initial measurement information to the base station for the base station to use in selecting a supportive user equipment of a beneficial user equipment or selecting a beneficial user equipment that needs to be supported by a supportive user equipment;
establishing a support link based on the physical link;
performing measurement on the support link to obtain link measurement information; and
sending the link measurement information to the base station to facilitate the base station controlling the support link according to the link measurement information;

wherein the processor is further configured to execute the processor-executable instructions to facilitate: receiving transmission configuration that is performed by the base station on the first-hop physical link, so as to establish the support link;

wherein the processor is further configured to execute the processor-executable instructions to facilitate:
when the terminal is a beneficial user equipment, receiving the first-hop link setup request sent by the base station;
enabling a Wireless Fidelity direct link/access point according to the first-hop link setup request and
returning a first-hop link setup response to the base station, so as to establish the first-hop physical link, wherein the first-hop link setup response carries information about the enabled Wireless Fidelity direct link/access point, and a cellular Internet Protocol address and a Wireless Fidelity Internet Protocol address of the terminal.

13. The terminal according to claim 12, wherein the processor is further configured to execute the processor-executable instructions to facilitate:
receiving a first link configuration request sent by the base station, wherein the first link configuration request comprises Internet Protocol tunnel information of a downlink of the terminal, Internet Protocol tunnel information of an uplink of the terminal, and a routing rule of the terminal; and
returning a first link configuration response to the base station after performing transmission configuration on the first-hop physical link according to the first link configuration request, so as to establish the support link.

14. The terminal according to claim 12, wherein the processor is further configured to execute the processor-executable instructions to facilitate:
receiving a third link configuration request sent by the base station, wherein the third link configuration request comprises a routing rule of the beneficial user equipment; and
returning a third link configuration response to the base station after performing transmission configuration on the first-hop physical link according to the third link configuration request, so as to establish the support link.

* * * * *